US012809367B1

(12) United States Patent
Hansen et al.

(10) Patent No.: US 12,809,367 B1

(45) **Date of Patent: *Nov. 24, 2026**

(54) PHYSICS-INFORMED STRUCTURAL HEALTH MONITORING WITH REINFORCEMENT LEARNING AND AUTONOMOUS MAINTENANCE RESPONSE

(71) Applicants: Scott Robert Hansen, Irvine, CA (US); Louisa Hansen, Irvine, CA (US); Robert Edwin Hansen, Bigfork, MT (US)

(72) Inventors: Scott Robert Hansen, Irvine, CA (US); Louisa Hansen, Irvine, CA (US); Robert Edwin Hansen, Bigfork, MT (US)

(73) Assignee: Viking Discoveries LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/553,416

(22) Filed: Mar. 1, 2026

Related U.S. Application Data

(63) Continuation of application No. 19/387,184, filed on Nov. 12, 2025, which is a continuation of application (Continued)

(51) Int. Cl.

*G05B 23/02* (2006.01)
*G01M 5/00* (2006.01)
*G06N 3/09* (2023.01)

(52) U.S. Cl.

CPC ....... *G05B 23/0283* (2013.01); *G01M 5/0041* (2013.01); *G06N 3/09* (2023.01)

(58) Field of Classification Search

CPC ............ H01Q 13/0208; H01Q 13/0283; H01P 1/211; G05B 23/0283; G01M 5/0041; G06N 3/09

See application file for complete search history.

(56) References Cited

U.S. PATENT DOCUMENTS

| | | | |
|---|---|---|---|
| 5,774,376 | A | 6/1998 | Manning |
| 9,267,862 | B1 | 2/2016 | Kavars et al. |

(Continued)

FOREIGN PATENT DOCUMENTS

| | | | |
|---|---|---|---|
| CN | 102944416 | B | 4/2015 |
| CN | 117387559 | B | 12/2020 |

(Continued)

OTHER PUBLICATIONS

Chen et al., Automated facility inspection using robotics and BIM: A knowledge-driven approach, Dec. 2022, Advanced Engineering Informatics, vol. 55, pp. 1-16 (Year: 2022).*

(Continued)

*Primary Examiner* — Kidest Worku

(74) *Attorney, Agent, or Firm* — Scott R. Hansen; Viking IP Law

(57) ABSTRACT

A structural-health-monitoring system is disclosed for real-time detection and autonomous maintenance of physical structures. The system includes a sensor network comprising at least one strain gauge and one tri-axial accelerometer mounted on the structure to generate real-time sensor signals. A perception module filters and normalizes the signals and extracts numerical features such as peak amplitude and dominant frequency. A digital-twin module maintains a finite-element model updated in response to the extracted features. A data-driven surrogate model predicts sensor behavior and refines itself using machine-learning techniques. An anomaly-detection module computes an anomaly score from model residuals or classifier outputs. Upon exceeding a threshold, a maintenance module initiates a maintenance action, including generating an inspection schedule or issuing a control signal to an autonomous inspection or repair device. A learning module continuously improves system performance using reinforcement learning (Continued)

based on historical outcomes. The system supports predictive diagnostics, robotic repair, and automated optimization for long-term structural integrity.

26 Claims, 19 Drawing Sheets

Related U.S. Application Data

No. 19/218,317, filed on May 25, 2025, now Pat. No. 12,572,142.

(60) Provisional application No. 63/652,016, filed on May 26, 2024, provisional application No. 63/652,076, filed on May 27, 2024, provisional application No. 63/653,072, filed on May 29, 2024, provisional application No. 63/655,083, filed on Jun. 3, 2024, provisional application No. 63/656,052, filed on Jun. 4, 2024, provisional application No. 63/660,502, filed on Jun. 15, 2024, provisional application No. 63/663,111, filed on Jun. 22, 2024, provisional application No. 63/663,742, filed on Jun. 25, 2024, provisional application No. 63/735,449, filed on Dec. 18, 2024, provisional application No. 63/737,662, filed on Dec. 21, 2024.

(56) References Cited

U.S. PATENT DOCUMENTS

| | | | | |
|---|---|---|---|---|
| 10,592,821 | B2 | 3/2020 | Denton et al. | |
| 11,644,212 | B2 | 5/2023 | Ba et al. | |
| 2018/0329433 | A1 | 11/2018 | Zhao et al. | |
| 2019/0017911 | A1 | 1/2019 | Kiranyaz et al. | |
| 2020/0019167 | A1* | 1/2020 | Alshamrani | G05D 1/101 |
| 2021/0191378 | A1 | 6/2021 | Amores et al. | |
| 2021/0318191 | A1* | 10/2021 | Okulov | G06F 1/1656 |
| 2023/0100515 | A1* | 3/2023 | Du | G06N 3/08 382/106 |

FOREIGN PATENT DOCUMENTS

| | | | |
|---|---|---|---|
| CN | 112720534 | A | 4/2021 |
| CN | 116448764 | A | 7/2023 |
| EP | 3596449 | A1 | 1/2020 |
| EP | 4392842 | A1 | 7/2024 |

OTHER PUBLICATIONS

Chen et al., Development of Robotics for Building Exterior Inspection: A Literature Review, 2024, 41st International Symposium on Automation and Robotics in Construction (ISARC 2024), p. s1073-1080. (Year: 2024).*

Tawakuli et al., Synchronized Preprocessing of Sensor Data, 2020, IEEE, p. 3522-3531. (Year: 2020).*

Spandana et all., Real-Time Structure Health Monitoring System using IOT, 2023, IIP series, vol. 3, ISSN: 3070-7617, p. 259—(Year: 2023).*

Lazic, N., Boutilier, C., Lu, T., Wong, E., Roy, B., Ryu, M.K., and Imwalle, G. “Data center cooling using model-predictive control.” Advances in Neural Information Processing Systems 31 (NeurIPS 2018), pp. 3818-3827, Montreal, QC, 2018.

Wei, T., Wang, Y., and Zhu, Q. “Deep reinforcement learning for building HVAC control.” Proceedings of the 54th Annual Design Automation Conference 2017 (DAC ’17), ACM, New York, NY, Article 22, pp. 1-6, Jun. 2017. DOI: 10.1145/3061639.3062224.

Katipamula, S. and Brambley, M.R. “Methods for fault detection, diagnostics, and prognostics for building systems—A review, Part I.” HVAC&R Research, vol. 11, No. 1, pp. 3-25, Jan. 2005. DOI: 10.1080/10789669.2005.10391123.

Katipamula, S. and Brambley, M.R. “Methods for fault detection, diagnostics, and prognostics for building systems—A review, Part II.” HVAC&R Research, vol. 11, No. 2, pp. 169-187, Apr. 2005. DOI: 10.1080/10789669.2005.10391133.

Khazaeli, S., Nguyen, L.H., and Goulet, J.-A. “Anomaly detection with the switching Kalman filter for structural health monitoring.” Structural Control and Health Monitoring, vol. 28, No. 12, 2021, e2720. DOI: 10.1002/stc.2720.

Khazaeli, S. “Probabilistic methods for anomaly detection and remaining useful life assessment of civil infrastructure.” Ph.D. Dissertation, Polytechnique Montréal, 2022. Available: https://publications.polymtl.ca/10744/1/2022_ShervinKhazaeli.pdf.

Dias, G.M., Nurchis, M., and Bellalta, B. “Adapting sampling interval of sensor networks using on-line reinforcement learning.” Proc. IEEE 3rd World Forum on Internet of Things (WF-IoT), 2016, pp. 544-549. DOI: 10.1109/WF-IoT.2016.7845391.

Yang, X., Howley, E., and Schukat, M. “ADT: Time series anomaly detection for cyber-physical systems via deep reinforcement learning.” Computers & Security, vol. 141, p. 103825, 2024. DOI: 10.1016/j.cose.2024.103825.

Okur, F., Altunisik, A.C., and Okur, O. “A novel approach for anomaly detection in vibration-based structural health monitoring using autoencoders in deep learning.” Structural Control and Health Monitoring, vol. 2025, Article ID 5602604, 2025. DOI: 10.1155/stc/5602604.

Chen, M., et al. “Physics-informed neural networks for building thermal modeling and demand response control.” Knowledge-Based Systems (Elsevier), 2025; preprint arXiv:2405.06925, May 2024. DOI: 10.1016/j.knosys.2025.112011.

Yang, D.Y. “Updating of stochastic deterioration models for reinforced concrete structures using inspection data.” Journal of Engineering Mechanics, vol. 148, No. 1, art. 04021126, 2022. DOI: 10.1061/(ASCE)EM.1943-7889.0002028.

Pfingstl, S., Schoebel, L., and Zimmermann, M. “Scheduling structural health monitoring systems considering measurement quality.” Materials Research Proceedings, vol. 18, pp. 203-210, 2021. DOI: 10.21741/9781644901311-24.

Panangadan, A., Ali, W., and Talukder, S. “Learning anomaly patterns for smart environments from human teachers.” Proc. 17th Innovative Applications of Artificial Intelligence Conference (IAAI-05), AAAI Press, 2005.

Yi, L., et al. “Reinforcement-Learning-Enabled Partial Confident Information Coverage for IoT-Based Bridge Structural Health Monitoring.” IEEE Internet of Things Journal, 2021. DOI: 10.1109/JIOT.2020.3028325. IEEE Xplore document 9211720.

Wei, S., Bao, Y., and Li, H. “Optimal policy for structure maintenance: A deep reinforcement learning framework.” Structural Safety, vol. 83, 2020. DOI: 10.1016/j.strusafe.2019.101906.

Hamida, Z. and Goulet, J.-A. “Hierarchical reinforcement learning for transportation infrastructure maintenance planning.” Reliability Engineering & System Safety, vol. 235, 2023. DOI: 10.1016/j.ress.2023.109214.

Ge, L. and Sadhu, A. “Deep learning-enhanced smart ground robotic system for automated structural damage inspection and mapping.” Automation in Construction, vol. 170, Feb. 2025. DOI: 10.1016/j.autcon.2024.105951.

Fang, X., Luo, H., and Tang, J. “Structural damage detection using neural network with learning rate improvement.” Computers & Structures, vol. 83, No. 25-26, pp. 2150-2161, Sep. 2005. DOI: 10.1016/j.compstruc.2005.02.029.

Abdeljaber, O., Avci, O., Kiranyaz, S., Gabbouj, M., and Inman, D.J. “Real-time vibration-based structural damage detection using one-dimensional convolutional neural networks.” Journal of Sound and Vibration, vol. 388, pp. 154-170, Feb. 3, 2017. DOI: 10.1016/j.jsv.2016.10.043.

U.S. Pat. No. 10,860,011 B2, Dec. 8, 2020, Oracle International Corp—digital twin to facilitate enviroment-specific prognostic-surveillance operations using NN/SVM/AAKR/regression with residual-based fault diagnostics.

US 2017/0286572 A1, Oct. 5, 2017, General Electric Co—digital twin of twinned physical system with continually tuned auto-associative neural network and residual vector fault daignostics.

(56) References Cited

OTHER PUBLICATIONS

U.S. Pat. No. 10,850,840 B2, Dec. 1, 2020, Florida Power and Light Co—drone and rover preplacement for remote autonomous inspection of utility system components.
US 2024/0378353 A1, Nov. 14, 2024, Robert Scott Hansen; Louisa Marie, Hansen, Edwin Robert Hansen, Entire document “Method of Retraining a Device with Real-World Data”, U.S. Appl. No. 18/657,755, filed May 7, 2024. Earliest claimed priority May 10, 2023 (U.S. Appl. No. 63/465,314).
US 2024/0378330, Nov. 14, 2024, Scott R. Hansen; Marie Louisa Hansen; Robert Edwin Hansen, Entire Document Abstract: ¶¶ [0112]- [0119], [0126]- [0142]; Claims 83, 96, 100, 103. “Method and System for Optimal Engineering Design.” U.S. Appl. No. 18/215,834 filed Jun. 29, 2023. Now abandoned.
US 2026/0089434 A1, Mar. 26, 2026, Scott Robert Hansen; Marie Louisa Hansen; Robert Edwin Hansen, Entire document; Abstract; ¶¶ [0588]- [0622], [0613]- [0618]; Claims 112, 113, 138, 140. “Method of Retraining a Device or System with Real-World Data.” U.S. Appl. No. 18/852,441 filed May 10, 2024. CIP of Cite 1; national stage of Cite 3.
WO 2024/233968 A1, Nov. 14, 2024, Robert Scott Hansen, Louisa Marie Hansen; Robert Edwin Hansen, WIPO publication of PCT/US2024/028955 filed May 10, 2024. “Method of Retraining a Device with Real-World Data.” Counterpart of Cite 2. Published in English.
European Patent Office, acting as International Searching Authority. Written Opinion of the International Searching Authority, PCT/US2026/029259, Form PCT/ISA/237 with seperate sheets, 17 pages. Identified as Aug. 22, 2026 in the supplied record. English.
Andriotis, C.P. and Papakonstantinou, K.G. “Deep reinforcement learning driven inspection and maintenance planning under incomplete information and constraints.” Reliability Engineering & System Safety, vol. 212, article 107551, 2021 (Mar. 11, 2021 as cited by the ISA). DOI: 10.1016/j.ress.2021.107551. Copy supplied: corresponding manuscript, arXiv:2007.01380, 17 pages.
Jackson, Richard J.; Wojcik, Adam; and Miodownik, Mark. “3D printing of asphalt and its effect on mechanical properties.” Materials & Design, vol. 160, pp. 468-474, 2018 (Sep. 20, 2018 as cited by the ISA). Elsevier. DOI: 10.1016/j.matdes.2018.09.030. 7 pages.
Cunha, Barbara Zaproli et al. “A Review of Machine Learning Methods Applied to Structural Dynamics and Vibroacoustic.” arxIV:2204.06362, version dated Jul. 20, 2023, 47 pages. arXiv.org / Cornell University. Journal DOI identified by the ISA: 10.1016/j.ymssp.2023.110535.

* cited by examiner

PHYSICS-INFORMED STRUCTURAL HEALTH MONITORING WITH REINFORCEMENT LEARNING AND AUTONOMOUS MAINTENANCE RESPONSE

RELATED APPLICATIONS

This application is a continuation of U.S. patent application Ser. No. 19/387,184, filed Nov. 12, 2025, which is a continuation of U.S. patent application Ser. No. 19/218,317, filed May 25, 2025, both of which are incorporated by reference herein in their entirety. This application also claims the benefit under 35 U.S.C. § 120 of U.S. patent application Ser. No. 19/218,317, filed May 25, 2025, incorporated by reference herein in its entirety This application claims priority from the following US Provisional Patent Application Ser. Nos., all of which are incorporated by reference herein in their entirety:

63737662, filed Dec. 21, 2024
63735449, filed Dec. 18, 2024
63663742 filed Jun. 25, 2024
63663111, filed Jun. 22, 2024
63660502, filed Jun. 15, 2024
63656052, filed Jun. 4, 2024
63655083, filed Jun. 3, 2024
63653072, filed May 29, 2024
63652076, filed May 27, 2024
63652016, filed May 26, 2024

BACKGROUND

AI agents are systems capable of autonomous action to various degrees, to achieve specific goals. This patent application focuses on applications of AI in engineering design, analysis, and other aspects.

Existing AI agent systems have typically focused on specific applications or domains, utilizing sensor networks to collect data and employing machine learning algorithms for decision-making processes. These systems often lack a comprehensive approach that integrates all necessary components for a versatile and adaptable AI agent system. In some cases, the sensor networks used for data collection may be limited in scope or capacity, leading to incomplete or inaccurate data being processed by the AI agent. Additionally, the preprocessing of collected data to remove noise and extract relevant features may not be optimized for eficiency and efectiveness, resulting in suboptimal decision-making by the AI agent.

Moreover, previous AI agent systems have faced challenges in the implementation of learning modules for continuous adaptation and improvement of performance over time. The learning capabilities of these systems may be limited in scope or efectiveness, hindering the AI agent's ability to evolve and enhance its decision-making processes based on new data and feedback. Furthermore, the actuator modules in existing AI agent systems may lack the flexibility to execute a wide range of actions based on the decisions made by the reasoning module, limiting the system's ability to interact with and respond to its environment in a dynamic and adaptive manner.

In addition, the human/system interfaces of conventional AI agent systems may not provide users with a seamless and intuitive interaction experience. These interfaces may be restricted in terms of input modalities and output formats, limiting the ways in which users can interact with and receive responses from the AI agent system. Overall, the existing approaches to AI agent systems have been fragmented and lacking in integration, hindering the development of a comprehensive solution that combines all the essential features required for a versatile and eficient AI agent system. However, none of these approaches have provided a comprehensive solution that combines the features described in this disclosure.

Overview of AI Agents

AI agents are computer programs that utilize artificial intelligence (AI) and machine learning to perform specific tasks, make decisions, and interact in a manner analogous to human beings to some extent.

These entities are designed to perceive their surroundings and take actions that help them achieve particular goals. They range from simple systems that follow predefined rules to complex, autonomous entities capable of learning and adapting based on their experiences. AI agents can be as straightforward as chatbots used in customer support systems or as advanced as robots in healthcare and manufacturing. They are not limited to performing tasks based on specific inputs but are driven by goals, adapting their behavior to achieve the desired outcomes. This level of autonomy allows AI agents to execute tasks with high precision and accuracy, often surpassing human capabilities In Business and Workflow Eficiency, AI agents work in business operations, automating repetitive tasks, reducing errors, and freeing up staf to focus on more complex activities AI agents can automate entire processes, such as lead capturing, content creation, and project management activities, enhancing workflow eficiency and promoting seamlessness. In marketing and sales, AI agents can revolutionize workflows from start to finish, using data analytics to provide personalized customer solutions.

In the healthcare sector, AI agents enhance patient care and workflows. They can diagnose medical conditions with advanced image recognition algorithms, analyze large datasets, create personalized treatment plans, and streamline administrative tasks.

In Finance, AI agents work on fraud detection and customer service, analyze large amounts of data to identify patterns and anomalies, enhance security and eficiency.

Autonomous Vehicles use AI agents to make real-time decisions based on data from various sensors.

In Customer Service, AI agents provide customer service by providing instantaneous responses to queries and concerns, learning from interactions, and integrate with various communication platforms.

In Environmental Conservation, AI agents monitor natural resources, tracking climate changes, and enhance environmental conservation.

In Gaming, AI agents serve as both adversaries and allies, creating dynamic and immersive experiences, enhancing realism in interactive entertainment, for example.

Digital assistants like Siri and Alexa utilize AI agents to provide a user with a suite of apps the user initiates with voice commands.

AI agents may work in multi-agent systems, to handle complex tasks across domains and applications.

It is noted that at present, sometimes AI agents are narrow in focus, with limited applicability across technologies or other areas of endeavor. Also, AI and AI agents can lack an understanding of the real world. That is, they sometimes operate in a simulated space, use simulated data, or are otherwise fully or at least partially disconnected from real-world data or behavior.

Technical Aspects of AI Agents

At a technical level, AI agents can be described through a combination of their architecture, learning algorithms, and decision-making processes. Here's a more detailed look at the core components:

Architecture: The architecture of an AI agent includes its hardware and software structure. Common architectures include:

Reactive Agents: These agents respond directly to stimuli from their environment without maintaining any internal state. They operate based on a pre-defined set of rules and are suitable for simple, well-defined tasks. For example, a thermostat that adjusts heating based on temperature changes. These agents typically use simple rule-based systems or finite state machines.

Reactive agents often rely on finite state machines (FSMs) where the agent exists in one of many possible states and transitions between these states based on inputs. Each state represents a specific behavior or response. Rule-based systems in reactive agents consist of condition-action pairs, where specific conditions in the environment trigger predefined actions. These systems are limited by their inability to adapt or learn from new experiences.

Deliberative Agents: These agents maintain an internal model of the world, allowing them to plan and reason about their actions. They use symbolic reasoning and logic-based models to handle more complex tasks requiring foresight. For example, an AI planner used in logistics to optimize delivery routes. Deliberative agents often employ techniques like A* search, constraint satisfaction problems (CSP), and decision trees.

Deliberative agents utilize symbolic reasoning where the internal model of the world is represented through symbols and relationships. Planning algorithms, such as A* search, are used to find the optimal path to achieve a goal, taking into account various constraints and heuristics. Constraint satisfaction problems (CSP) involve finding a solution to a set of constraints that must be satisfied. Decision trees are employed for reasoning by recursively splitting the data into subsets based on feature values to make decisions.

Hybrid Agents: These agents combine reactive and deliberative approaches, using a layered architecture where different layers handle different aspects of perception, reasoning, and action. For instance, a hybrid robot that uses reactive behaviors for obstacle avoidance and deliberative planning for navigation. Hybrid agents may use a combination of behavior trees, neural networks for perception, and planning algorithms for high-level decision making.

In hybrid agents, the architecture typically involves multiple layers where the lower layers handle reactive responses and the higher layers manage deliberative planning. Behavior trees, often used in game AI and robotics, provide a hierarchical control structure that sequences tasks and subtasks. Neural networks, especially convolutional neural networks (CNNs), process sensory inputs like images for perception tasks. Planning algorithms such as those used in deliberative agents are integrated at higher levels to enable complex decision-making.

Sensors and Perception: AI agents use sensors to collect data from their environment. This data can come from various sources, including physical sensors (e.g., cameras, LiDAR) and digital inputs (e.g., APIs, databases). The perception system is responsible for transforming raw sensory data into a useful representation.

Data Acquisition: Sensors capture raw data from the environment. For example, a self-driving car uses cameras, LiDAR, and radar to gather information about the surroundings.

Sensor data acquisition involves the real-time collection of high-dimensional data streams. Cameras provide visual data in the form of pixel arrays, LiDAR sensors emit laser pulses to measure distances and create 3D maps, and radar systems detect objects by reflecting radio waves. The fusion of these sensor data streams is crucial for accurate environment perception.

Preprocessing: Raw data is often noisy and unstructured. Preprocessing steps such as filtering, normalization, feature extraction, and dimensionality reduction are applied to make the data suitable for analysis. For instance, image preprocessing techniques might involve noise reduction and edge detection to enhance important features.

Preprocessing in AI perception involves techniques like Gaussian filtering for noise reduction, histogram equalization for contrast enhancement, and edge detection algorithms such as Canny or Sobel filters. Feature extraction may involve techniques like Scale-Invariant Feature Transform (SIFT) or Speeded-Up Robust Features (SURF) for image data, and Mel-frequency cepstral coeficients (MFCCs) for audio data. Dimensionality reduction techniques like Principal Component Analysis (PCA) or t-Distributed Stochastic Neighbor Embedding (t-SNE) are used to reduce the complexity of data while preserving important information.

Perception Algorithms: These include computer vision algorithms for image recognition, NLP for text processing, and signal processing for auditory data. For example, convolutional neural networks (CNNs) are widely used for image recognition tasks.

Perception algorithms leverage deep learning models such as CNNs for image recognition, where convolutional layers extract hierarchical features from raw pixel data. Natural Language Processing (NLP) employs models like recurrent neural networks (RNNs), long short-term memory networks (LSTMs), and transformers (e.g., BERT, GPT) for text understanding. Signal processing algorithms analyze auditory data, extracting features like spectrograms and employing techniques like fast Fourier transforms (FFT) for frequency domain analysis.

Processing and Reasoning: The core of an AI agent involves processing the perceived data and making decisions. This process can be broken down into several steps:

Data Preprocessing: Raw data from sensors is often noisy and unstructured. Preprocessing steps such as normalization, feature extraction, and dimensionality reduction are applied to make the data suitable for analysis.

Data preprocessing for AI agents involves standardization techniques such as z-score normalization or min-max scaling to ensure uniform data ranges. Feature extraction methodologies depend on the data type, such as using wavelet transforms for time-series data or bag-of-words models for text data. Dimensionality reduction is critical for managing high-dimensional data, with techniques like singular value decomposition (SVD) or autoencoders being employed to reduce feature space complexity.

Modeling and Inference: AI agents use a variety of models to interpret data and make predictions. These models can range from simple decision trees to complex neural networks. Techniques like supervised learning, unsupervised learning, and reinforcement learning are employed depending on the task.

Modeling involves selecting and training appropriate algorithms based on the nature of the task. Supervised learning models, such as decision trees, random forests, and gradient boosting machines, are used for tasks where labeled data is available. Neural networks, including feedforward, convolutional, and recurrent architectures, are trained using backpropagation and gradient descent optimization. Unsupervised learning models like k-means clustering, Gaussian mixture models (GMMs), and hierarchical clustering are used to discover hidden patterns in unlabeled data. Reinforcement learning algorithms, such as Q-learning, deep Q-networks (DQNs), and policy gradients, enable agents to learn optimal policies through interaction with the environment.

Decision Making: Based on the model's output, the agent decides the best course of action. This may involve optimization algorithms, rule-based systems, or probabilistic reasoning.

Decision making in AI agents involves optimization techniques like linear programming, integer programming, and genetic algorithms to find the best solutions within given constraints. Rule-based systems employ if-then-else logic and inference engines to make decisions based on predefined rules. Probabilistic reasoning models, such as Bayesian networks and Markov decision processes (MDPs), handle uncertainty by estimating the likelihood of different outcomes and making decisions that maximize expected utility.

Actuators and Action: Once a decision is made, the AI agent uses actuators to perform actions. These actuators can be physical (e.g., motors in a robot) or digital (e.g., sending commands to a software application).

Actuators in physical systems convert electrical signals into physical motion, using components like servomotors, stepper motors, and hydraulic actuators. Control systems, including proportional-integral-derivative (PID) controllers and model predictive control (MPC), regulate actuator behavior to achieve desired outcomes. In digital systems, actions involve executing API calls, updating databases, or triggering other software processes based on the agent's decisions.

Learning and Adaptation: AI agents improve their performance over time through learning mechanisms. These can be:

Supervised Learning: The agent learns from labeled training data, adjusting its model based on feedback.

Supervised learning involves training models on datasets where each instance is paired with a label or target value. Techniques include regression models (linear regression, logistic regression), tree-based models (decision trees, random forests, gradient boosting), and neural networks. Training involves optimizing a loss function, such as mean squared error or cross-entropy, using algorithms like stochastic gradient descent (SGD) and its variants (Adam, RMSprop).

Unsupervised Learning: The agent finds patterns and structures in unlabeled data.

Unsupervised learning focuses on identifying intrinsic structures in data without labeled outputs. Clustering algorithms, such as k-means, hierarchical clustering, and DBSCAN, group data points based on similarity measures. Dimensionality reduction techniques like Principal Component Analysis (PCA), t-SNE, and autoencoders reduce data complexity while preserving important features. Anomaly detection models identify outliers and unusual patterns in data.

Reinforcement Learning: The agent learns by interacting with its environment and receiving rewards or penalties.

Reinforcement learning involves training agents to make a sequence of decisions by interacting with an environment. Key components include the agent, environment, states, actions, rewards, and policies. Algorithms like Q-learning, SARSA, deep Q-networks (DQNs), and actor-critic methods are used to learn optimal policies. The agent's goal is to maximize cumulative reward over time, using techniques like temporal diference learning and policy gradient methods.

Components of AI Agents

Perception involves gathering data from the environment, which can come from various sources such as sensors, databases, user inputs, and external APIs. This data can be structured or unstructured, including images, text, numerical data, and more.

Examples

Self-driving Cars: Sensors like LiDAR, cameras, and radar collect data about the car's surroundings, such as the positions of other vehicles, pedestrians, and road signs. The data from these sensors is fused using sensor fusion algorithms to create a comprehensive understanding of the environment. For example, Extended Kalman Filters (EKF) or Particle Filters can be used for sensor fusion.

Sensor fusion algorithms combine data from multiple sources to create a coherent and accurate representation of the environment. Extended Kalman Filters (EKF) are used to estimate the state of a dynamic system, considering both sensor measurements and system dynamics. Particle Filters represent the state as a set of random samples (particles) and update the belief state based on the likelihood of each particle. These techniques are essential for accurately tracking objects and understanding the environment in self-driving cars.

Healthcare: Wearable devices monitor vital signs like heart rate, blood pressure, and activity levels. Data preprocessing steps like noise reduction and signal filtering (e.g., using Fourier transforms) are applied before feeding the data into predictive models.

Wearable devices collect continuous data streams, which are often subject to noise and artifacts. Signal preprocessing involves techniques like band-pass filtering to remove noise, Fourier transforms for frequency domain analysis, and wavelet transforms for multi-resolution analysis. Feature extraction methods, such as time-domain features (mean, variance) and frequency-domain features (spectral entropy, power spectral density), are used to derive meaningful insights from raw sensor data. Predictive models, including regression analysis and machine learning classifiers, analyze the preprocessed data to monitor health conditions and predict potential issues.

E-commerce: User behavior data, including browsing history, purchase patterns, and feedback, are collected to personalize shopping experiences. Techniques like collaborative filtering, content-based filtering, and hybrid recommendation systems are used to analyze and leverage this data.

E-commerce platforms collect extensive user interaction data, including clickstream data, transaction history, and user reviews. Collaborative filtering techniques, such as user-based and item-based approaches, analyze user-item interactions to generate recommendations. Content-based filtering relies on the attributes of items and users to suggest similar items. Hybrid recommendation systems combine both collaborative and content-based methods to enhance recommendation accuracy. Matrix factorization techniques like singular value decomposition (SVD) and neural collaborative filtering models further improve recommendation quality by capturing latent factors in user-item interactions.

Reasoning and Decision Making

The core of an AI agent lies in its ability to process the perceived data and make decisions. This involves complex algorithms and models that can include rule-based systems, machine learning, neural networks, and probabilistic models.

Examples

Chatbots: Natural Language Processing (NLP) models analyze user queries to generate appropriate responses. For instance, a customer service chatbot interprets customer complaints and provides solutions. Techniques like sequence-to-sequence models, attention mechanisms, and transformers (e.g., BERT, GPT) are used for understanding and generating human-like responses.

Chatbots employ advanced NLP techniques to understand and respond to user queries. Sequence-to-sequence models, often used in machine translation, consist of an encoder that processes the input sequence and a decoder that generates the response. Attention mechanisms, such as those in the Transformer architecture, allow the model to focus on relevant parts of the input when generating a response. Transformers, like BERT (Bidirectional Encoder Representations from Transformers) and GPT (Generative Pre-trained Transformer), use self-attention and deep neural networks to capture complex language patterns and generate coherent responses.

Finance: Algorithmic trading systems analyze market data in real-time to make buy/sell decisions, optimizing investment portfolios based on trends and patterns. These systems often employ deep learning models (e.g., LSTM networks for time series prediction), reinforcement learning algorithms (e.g., Q-learning, policy gradient methods), and statistical arbitrage strategies.

Algorithmic trading systems utilize a combination of deep learning and reinforcement learning techniques to make trading decisions. Long short-term memory (LSTM) networks, a type of recurrent neural network (RNN), are used to model and predict time series data, capturing long-term dependencies in market trends. Reinforcement learning algorithms, such as Q-learning and policy gradient methods, enable the agent to learn trading strategies by interacting with the market environment and receiving feedback in the form of rewards. Statistical arbitrage strategies involve identifying and exploiting ineficiencies in market pricing, using techniques like co-integration analysis and pair trading.

Robotics: Industrial robots use AI to make decisions on assembly lines, such as identifying defective products or adjusting assembly processes for eficiency. Vision systems using CNNs identify defects, while control algorithms (e.g., PID controllers, inverse kinematics) adjust the robot's movements.

Industrial robots integrate computer vision and control systems to perform complex tasks. Convolutional neural networks (CNNs) process images captured by cameras to detect defects and classify products. Advanced vision systems may use techniques like semantic segmentation and object detection (e.g., YOLO, Faster R-CNN) to precisely locate and identify defects. Control algorithms, including proportional-integral-derivative (PID) controllers and inverse kinematics, ensure accurate and smooth robot movements. PID controllers regulate the robot's actuators to achieve desired positions and velocities, while inverse kinematics algorithms compute joint angles needed to place the robot's end-efector in a specific position.

Key Techniques

Rule-Based Systems: Utilize predefined rules to make decisions. For instance, an expert system for medical diagnosis might use rules derived from medical guidelines. These systems often use forward chaining or backward chaining inference techniques.

Rule-based systems employ inference engines that use forward chaining (data-driven) or backward chaining (goal-driven) methods to derive conclusions from a set of rules and facts. Forward chaining starts with known facts and applies rules to infer new facts until a goal is reached. Backward chaining begins with a goal and works backward, searching for rules that support the goal until known facts are found. These systems are effective for well-defined domains with clear rules but struggle with ambiguity and incomplete knowledge.

Machine Learning: Algorithms learn from data to improve decision-making. For example, a recommendation system learns from user preferences to suggest products or content. Techniques like collaborative filtering, matrix factorization, and neural collaborative filtering are common.

Machine learning models are trained on historical data to learn patterns and make predictions. Collaborative filtering techniques, such as user-based and item-based approaches, predict user preferences based on the preferences of similar users or items. Matrix factorization methods, including singular value decomposition (SVD) and alternating least squares (ALS), decompose the user-item interaction matrix into lower-dimensional latent factors. Neural collaborative filtering models combine the power of neural networks with collaborative filtering to capture complex, non-linear user-item interactions.

Neural Networks: Complex models inspired by the human brain, used for tasks like image recognition and language translation. For example, convolutional neural networks (CNNs) are used for classifying images in medical imaging or social media platforms.

Neural networks consist of interconnected layers of artificial neurons that process data through weighted connections. Convolutional neural networks (CNNs) are designed for spatial data, using convolutional layers to extract hierarchical features from images. These networks include pooling layers for dimensionality reduction and fully connected layers for classification. Recurrent neural networks (RNNs), including LSTMs and GRUs, are used for sequential data, capturing temporal dependencies. Transformers, based on self-attention mechanisms, excel in tasks requiring long-range dependencies, such as language translation and text generation.

Probabilistic Models: Make decisions under uncertainty by estimating probabilities. For instance, spam filters in email systems use probabilistic models to classify emails as spam or not spam based on various features. Bayesian networks and Hidden Markov Models (HMMs) are typical examples.

Probabilistic models represent uncertainty using probability distributions and Bayesian inference. Bayesian networks are directed acyclic graphs where nodes represent variables and edges represent probabilistic dependencies. These networks use Bayes' theorem to update beliefs based on new evidence. Hidden Markov Models (HMMs) model sequences of observations where the underlying states are hidden. HMMs use algorithms like the Forward-Backward algorithm for state estimation and the Viterbi algorithm for finding the most likely sequence of states.

Action

Based on the decisions made, AI agents perform actions to achieve their goals. These actions can be varied, from physical movements to digital transactions.

Examples

Robotics: An autonomous vacuum cleaner navigates around a home, avoiding obstacles while cleaning the floors. These robots use simultaneous localization and mapping (SLAM) algorithms to build a map of the environment and plan their paths. Motion planning algorithms like Rapidly-exploring Random Trees (RRT) or A* search are used for navigation.

Autonomous vacuum cleaners use SLAM algorithms to create a map of the environment while simultaneously tracking their location within that map. Techniques like extended Kalman filters (EKF) and particle filters are used for localization. Motion planning algorithms, such as A* search and Rapidly-exploring Random Trees (RRT), generate paths that avoid obstacles and optimize cleaning eficiency. Sensors, including infrared, ultrasonic, and bump sensors, provide real-time feedback for obstacle detection and avoidance.

Virtual Assistants: Digital assistants like Siri or Alexa execute tasks like setting reminders, sending messages, or controlling smart home devices. These assistants use NLP models for understanding user commands and various APIs to interact with other devices and services.

Virtual assistants leverage NLP models, including transformers (BERT, GPT) and sequence-to-sequence models, to understand and generate human-like text. These models use tokenization, embeddings, and attention mechanisms to process and respond to user queries. Virtual assistants also utilize APIs to interact with other services and devices, enabling functionalities like setting reminders, sending messages, and controlling smart home systems. The integration of speech recognition and text-to-speech technologies allows for seamless voice interactions.

Financial Services: Automated customer service agents perform tasks such as processing loan applications, conducting fraud detection, and managing account information. Techniques like anomaly detection (e.g., using isolation forests or autoencoders) are used for fraud detection, while natural language understanding (NLU) models process customer inquiries.

Automated customer service agents use natural language understanding (NLU) models, such as BERT and ELMo, to comprehend customer inquiries and generate appropriate responses. Anomaly detection algorithms, including isolation forests and autoencoders, identify suspicious activities by detecting deviations from normal patterns. These models are trained on historical transaction data and continuously updated with new data to improve accuracy. Additionally, predictive models, such as logistic regression and decision trees, assess loan applications and manage account information based on credit scores and financial history.

Learning and Adaptation

Many AI agents incorporate learning mechanisms to adapt and improve over time. This involves updating their models based on new data and feedback from their environment.

Examples

Gaming: AI opponents in video games learn from player behavior to become more challenging over time, using reinforcement learning to improve their strategies. Techniques like Q-learning, deep Q-networks (DQNs), and Monte Carlo Tree Search (MCTS) are commonly used.

AI opponents in video games use reinforcement learning algorithms to adapt their strategies based on player interactions. Q-learning algorithms estimate the value of actions in given states, enabling the agent to choose actions that maximize cumulative rewards. Deep Q-networks (DQNs) combine Q-learning with deep neural networks to handle high-dimensional state spaces. Monte Carlo Tree Search (MCTS) is used for decision-making in games with large search spaces, employing random simulations to evaluate the potential outcomes of different actions.

Personal Assistants: Systems like Google Assistant learn user preferences and routines to provide more personalized and accurate assistance. They use techniques like collaborative filtering and reinforcement learning to adapt to user behavior.

Personal assistants use collaborative filtering techniques to analyze user interactions and preferences, recommending actions and content based on similar users. Reinforcement learning algorithms enable the assistant to learn optimal responses and actions through user feedback and interactions. Contextual bandits, a variation of reinforcement learning, balance exploration and exploitation to provide personalized assistance while continuously improving based on user behavior.

Healthcare: Predictive models for patient care improve as they receive more patient data, becoming better at diagnosing and recommending treatments. Techniques like transfer learning are used to adapt models to new types of data or different patient populations.

Predictive models in healthcare use techniques like transfer learning to adapt pre-trained models to new datasets with limited labeled data. Transfer learning involves fine-tuning a pre-trained model, such as a deep neural network, on a smaller, domain-specific dataset. This approach leverages the knowledge gained from the initial training to improve performance on the new task. Predictive models, including logistic regression, support vector machines (SVMs), and deep learning models, analyze patient data to identify risk factors and recommend treatments. Continuous learning from new patient data ensures that these models remain accurate and efective over time.

Key Learning Techniques

Supervised Learning: The agent learns from labeled training data. For example, a facial recognition system learns to identify faces by training on a dataset of labeled images. Techniques like backpropagation in neural networks, decision trees, and support vector machines (SVMs) are common.

Supervised learning involves training models on datasets with known input-output pairs. Neural networks use backpropagation to adjust weights based on the error between predicted and actual outputs. Decision trees split the data into subsets based on feature values, creating a tree-like model of decisions. Support vector machines (SVMs) find the hyperplane that best separates different classes in the feature space. These models are evaluated using metrics like accuracy, precision, recall, and F1-score to ensure their performance.

Unsupervised Learning: The agent identifies patterns and relationships in unlabeled data. For instance, clustering algorithms in customer segmentation group customers based on purchasing behavior without predefined labels. Techniques include k-means clustering, hierarchical clustering, and Gaussian mixture models (GMMs).

Unsupervised learning focuses on discovering hidden structures in data without labeled outputs. Clustering algorithms like k-means partition data into k clusters by minimizing the distance between data points and cluster centroids. Hierarchical clustering builds a tree-like structure of clusters using agglomerative or divisive approaches. Gaussian mixture models (GMMs) represent the data as a mixture of multiple Gaussian distributions, using expectation-maximization (EM) to estimate parameters. These techniques are used for tasks like customer segmentation, anomaly detection, and dimensionality reduction.

Reinforcement Learning: The agent learns by interacting with its environment and receiving rewards or penalties. For example, AI in robotics learns to navigate through trial and error, receiving rewards for reaching targets and penalties for collisions. Techniques like Q-learning, policy gradients, and actor-critic methods are used.

Reinforcement learning involves training agents to make sequential decisions by maximizing cumulative rewards. Q-learning algorithms learn the value of actions in given states, updating Q-values based on observed rewards and future estimates. Policy gradient methods directly optimize the policy by adjusting parameters to increase the expected reward. Actor-critic methods combine value-based and policy-based approaches, with the actor learning the policy and the critic estimating value functions. These techniques are used in applications like robotics, game AI, and autonomous systems.

Further Considerations

AI agent can have an "agent function" that is a sophisticated mapping mechanism that translates the influx of data into actionable steps. It can interact dynamically with its surroundings. AI agents may have sensors to perceive their environment, gathering data or percepts that inform their actions. These actions may be executed through actuators, as one example, akin to the muscles in a human body, enabling the agent to alter its environment or navigate through it. Initially, AI agents rely on a pre-established knowledge base, which serves as their reference point for understanding the world AI agents can learn and adapt through feedback mechanisms, evolving their knowledge and capabilities over time. AI agents may be used in, for example, robotics, gaming, virtual assistants, and autonomous vehicles, showcasing their versatility and adaptability The operational cycle of an AI agent is a continuous loop of perception, decision-making, and action, allowing it to process information, make informed decisions, and take necessary actions to achieve its goals AI agents may make real-time decisions, including in environments that are unpredictable or in a state of flux Applications Beyond Engineering Healthcare Diagnosis and Treatment: AI agents assist in diagnosing diseases by analyzing medical images, genetic data, and patient records. For example, IBM Watson Health uses AI to analyze vast amounts of medical data to provide treatment recommendations. Techniques include deep learning models like CNNs for image analysis and ensemble learning methods for combining predictions from multiple models.

AI agents in healthcare use convolutional neural networks (CNNs) to analyze medical images, such as X-rays or MRIs, identifying patterns that correlate with diseases. These models are trained on large datasets of labeled medical images, using techniques like data augmentation to improve generalization. Genetic data analysis involves using techniques like genome-wide association studies (GWAS) and deep learning models to identify links between genetic variations and diseases. Natural language processing (NLP) is used to extract relevant information from patient records and research papers, feeding into decision-making systems that use ensemble learning methods, such as random forests and gradient boosting, to combine predictions from multiple models for more accurate diagnosis and treatment recommendations.

Personalized Medicine: AI agents tailor treatments based on individual genetic profiles and medical histories, improving eficacy and reducing side efects. Techniques like clustering and classification algorithms are used to identify subgroups of patients with similar characteristics.

Personalized medicine leverages clustering algorithms like k-means or hierarchical clustering to group patients based on genetic profiles and medical histories. Classification algorithms, such as support vector machines (SVMs), random forests, and gradient boosting machines, predict the most efective treatments for each group. By continuously learning from patient outcomes, these models can adapt and improve over time, ensuring that treatment plans remain efective. Machine learning techniques like survival analysis and risk prediction models are also used to estimate the likelihood of adverse outcomes and tailor interventions accordingly.

Virtual Health Assistants: These agents provide health advice, medication reminders, and appointment scheduling, enhancing patient engagement and compliance. NLP models and recommendation systems are used to personalize interactions and recommendations.

Virtual health assistants use natural language processing (NLP) models, such as BERT and GPT, to understand and generate human-like text. These models are trained on large corpora of medical texts and patient interactions, using tokenization, embeddings, and attention mechanisms to process and respond to user queries. Recommendation systems, often using collaborative filtering or content-based filtering, analyze patient data to provide personalized health advice and reminders. The agents use reinforcement learning to improve their recommendations based on patient feedback and outcomes, ensuring that interactions are relevant and effective.

Finance

Fraud Detection: AI agents analyze transaction patterns to detect and prevent fraudulent activities. Systems like those used by PayPal employ machine learning models to identify suspicious behavior. Techniques include anomaly detection algorithms, clustering, and neural networks.

Fraud detection systems use anomaly detection algorithms like isolation forests, one-class SVMs, and autoencoders to identify unusual patterns in transaction data that may indicate fraud. Clustering algorithms, such as DBSCAN, group transactions into clusters based on similarity measures, flagging outliers as potential fraud. Neural networks, including recurrent neural networks (RNNs) and long short-term memory (LSTM) networks, analyze sequences of transactions to detect suspicious patterns over time. These models are trained on historical transaction data and continuously updated with new data to improve accuracy and effectiveness.

Credit Scoring: AI agents assess creditworthiness by analyzing a wide range of data, including financial history, spending patterns, and even social media activity. Techniques include logistic regression, decision trees, and ensemble methods like random forests and gradient boosting.

Credit scoring models use logistic regression to calculate the probability of default based on historical financial data. Decision trees split the data into subsets based on feature values, creating a tree-like model of decisions. Ensemble methods, such as random forests and gradient boosting machines, combine multiple decision trees to improve accuracy and robustness. These models analyze various features, including income, employment history, debt levels, and spending patterns, to assess creditworthiness. Some advanced systems also incorporate alternative data sources, such as social media activity and online behavior, to provide a more comprehensive assessment.

Algorithmic Trading: AI agents execute trades at high speeds and frequencies, using complex algorithms to capitalize on market opportunities. For instance, hedge funds use AI-driven trading systems to manage portfolios. Techniques include time series analysis, reinforcement learning, and deep learning models.

Algorithmic trading systems utilize a combination of deep learning and reinforcement learning techniques to make trading decisions. Long short-term memory (LSTM) networks, a type of recurrent neural network (RNN), are used to model and predict time series data, capturing long-term dependencies in market trends. Reinforcement learning algorithms, such as Q-learning, deep Q-networks (DQNs), and policy gradient methods, enable the agent to learn trading strategies by interacting with the market environment and receiving feedback in the form of rewards. Statistical arbitrage strategies involve identifying and exploiting ineficiencies in market pricing, using techniques like co-integration analysis, pair trading, and mean reversion models. Portfolio optimization methods, including Markowitz mean-variance optimization and risk parity, are employed to manage risk and maximize returns.

Customer Service

Chatbots and Virtual Assistants: AI agents handle customer inquiries, provide product recommendations, and resolve issues in real-time, enhancing customer satisfaction. Examples include chatbots on e-commerce websites and customer support bots on social media. Techniques include NLP models, intent classification, and dialogue management systems.

Chatbots employ advanced NLP techniques to understand and respond to user queries. Sequence-to-sequence models, often used in machine translation, consist of an encoder that processes the input sequence and a decoder that generates the response. Attention mechanisms, such as those in the Transformer architecture, allow the model to focus on relevant parts of the input when generating a response. Transformers, like BERT (Bidirectional Encoder Representations from Transformers) and GPT (Generative Pre-trained Transformer), use self-attention and deep neural networks to capture complex language patterns and generate coherent responses. Intent classification algorithms, such as support vector machines (SVMs), logistic regression, and deep learning models, categorize user intents based on the input text. Dialogue management systems, often using reinforcement learning, manage the flow of conversation to ensure coherent and relevant interactions. These systems are continuously updated with new data to improve their performance.

Sentiment Analysis: AI agents analyze customer feedback and social media mentions to gauge public sentiment and improve products or services. Tools like Brandwatch use AI to monitor brand reputation. Techniques include text mining, sentiment classification, and topic modeling.

Sentiment analysis models use text mining techniques to preprocess and extract features from textual data. Sentiment classification algorithms, such as logistic regression, support vector machines (SVMs), and neural networks, classify the sentiment of the text as positive, negative, or neutral. Topic modeling techniques, like Latent Dirichlet Allocation (LDA), identify common themes in the data. These models are trained on large datasets of customer feedback and social media posts, allowing them to provide real-time insights into public sentiment. Advanced sentiment analysis systems may also use deep learning models, such as convolutional neural networks (CNNs) and recurrent neural networks (RNNs), to capture context and nuances in the text.

Education

Personalized Learning: AI agents customize educational content based on student performance, learning styles, and preferences. Platforms like Coursera and Khan Academy use AI to recommend courses and resources. Techniques include collaborative filtering, knowledge tracing models, and reinforcement learning.

Personalized learning systems use collaborative filtering techniques to recommend courses and resources based on student preferences and performance. Knowledge tracing models, like Bayesian Knowledge Tracing (BKT) and deep knowledge tracing, track student progress and predict future performance. These models use probabilistic and neural network approaches to estimate a student's knowledge state and adapt the learning path accordingly. Reinforcement learning algorithms optimize the learning experience by adapting content and feedback based on student interactions and outcomes, ensuring that the learning process is personalized and efective.

Tutoring Systems: AI-powered tutors provide personalized instruction and feedback, helping students understand complex subjects. For instance, Carnegie Learning's MATHia uses AI to guide students through math problems. Techniques include intelligent tutoring systems, Bayesian knowledge tracing, and natural language processing.

Intelligent tutoring systems use Bayesian Knowledge Tracing (BKT) to model student knowledge and predict learning outcomes. These systems maintain a probabilistic model of a student's knowledge state, updating it based on student interactions and performance. Natural language processing (NLP) techniques, such as semantic analysis and question answering models, provide personalized feedback and explanations. Reinforcement learning algorithms optimize tutoring strategies by adapting to individual student needs and learning styles, ensuring that instruction is tailored to each student's progress and understanding.

Administrative Assistance: AI agents automate administrative tasks such as grading, scheduling, and student enrollment, reducing the workload for educators. Techniques include optical character recognition (OCR) for grading handwritten assignments, optimization algorithms for scheduling, and machine learning for predictive analytics in enrollment management.

Grading systems use optical character recognition (OCR) to digitize handwritten assignments and machine learning models to assess the quality of the work. These models are trained on labeled datasets of graded assignments, using techniques like convolutional neural networks (CNNs) for image recognition and natural language processing (NLP) for text analysis. Scheduling algorithms, such as genetic algorithms, simulated annealing, and constraint satisfaction problems (CSP), optimize course timetables and resource allocation based on various constraints and preferences. Predictive analytics models, including regression analysis, decision trees, and ensemble methods, forecast enrollment trends and identify at-risk students, enabling proactive interventions and resource planning.

Transportation

Autonomous Vehicles: AI agents control self-driving cars, making decisions about navigation, obstacle avoidance, and trafic management. Companies like Tesla and Waymo leverage AI to enhance autonomous driving capabilities. Techniques include sensor fusion, computer vision, and reinforcement learning.

Autonomous vehicles use sensor fusion algorithms, such as Extended Kalman Filters (EKF) and Particle Filters, to combine data from cameras, LiDAR, radar, and other sensors.

Computer vision techniques, including convolutional neural networks (CNNs) and object detection algorithms (e.g., YOLO, Faster R-CNN), identify and track objects in the environment. Reinforcement learning algorithms, like deep Q-networks (DQNs) and policy gradient methods, enable the vehicle to learn optimal driving strategies through trial and error. Path planning algorithms, such as A* search and Rapidly-exploring Random Trees (RRT), generate safe and eficient routes. Control systems, including proportional-integral-derivative (PID) controllers and model predictive control (MPC), ensure smooth and accurate vehicle movements.

Traffic Management: AI agents analyze traffic data to optimize traffic flow, reduce congestion, and manage incidents. Systems in smart cities use AI to control traffic lights and reroute traffic. Techniques include simulation models, optimization algorithms, and machine learning.

Traffic management systems use simulation models, such as agent-based modeling (ABM) and cellular automata, to predict traffic patterns and optimize traffic flow. Optimization algorithms, like genetic algorithms, linear programming, and mixed-integer programming, adjust traffic light timings and reroute vehicles to minimize congestion and improve travel times. Machine learning models, including regression analysis, clustering algorithms, and neural networks, analyze historical and real-time traffic data to identify patterns and predict future conditions. These models are used to develop adaptive traffic control systems that dynamically respond to changing traffic conditions and incidents.

Predictive Maintenance: AI agents predict when transportation infrastructure, such as trains and planes, will need maintenance, preventing breakdowns and improving safety. Airlines use AI to monitor aircraft systems and schedule maintenance. Techniques include anomaly detection, time series analysis, and predictive modeling.

Predictive maintenance systems use anomaly detection algorithms, such as isolation forests, one-class SVMs, and autoencoders, to identify deviations from normal operating conditions. Time series analysis techniques, like ARIMA models, exponential smoothing, and LSTM networks, forecast future maintenance needs based on historical data. Predictive modeling approaches, including regression analysis, decision trees, and ensemble methods, estimate the remaining useful life (RUL) of components and schedule maintenance activities accordingly. These models are trained on large datasets of sensor readings and maintenance records, continuously learning from new data to improve accuracy and effectiveness.

Retail

Inventory Management: AI agents forecast demand, optimize inventory levels, and manage supply chains. Retail giants like Walmart use AI to ensure shelves are stocked and reduce waste. Techniques include time series forecasting, optimization algorithms, and machine learning.

Inventory management systems use time series forecasting models, such as ARIMA, Prophet, and LSTM networks, to predict future demand based on historical sales data. Optimization algorithms, like genetic algorithms, simulated annealing, and mixed-integer linear programming (MILP), determine optimal inventory levels and reorder points to minimize costs and avoid stockouts. Machine learning models, including regression analysis, decision trees, and ensemble methods, analyze sales patterns and external factors (e.g., weather, holidays) to improve demand forecasting accuracy. These systems integrate with supply chain management tools to ensure timely replenishment and reduce waste.

Personalized Marketing: AI agents analyze customer data to create targeted marketing campaigns, improving conversion rates. E-commerce platforms use AI to personalize email campaigns and advertisements. Techniques include clustering, collaborative filtering, and natural language processing.

Personalized marketing systems use clustering algorithms, like k-means, hierarchical clustering, and DBSCAN, to segment customers based on behavior and preferences. Collaborative filtering techniques, including user-based and item-based approaches, recommend products and promotions tailored to individual customers. Natural language processing (NLP) models, such as sentiment analysis, topic modeling, and named entity recognition (NER), analyze customer feedback and social media interactions to refine marketing strategies. Machine learning models, including logistic regression, decision trees, and neural networks, predict customer responses to marketing campaigns and optimize targeting.

Customer Insights: AI agents provide insights into customer behavior and preferences, helping retailers refine their product oferings and improve customer experience. Retail analytics tools use AI to analyze sales data and customer feedback. Techniques include data mining, sentiment analysis, and predictive analytics.

Customer insights systems use data mining techniques, such as association rule mining, clustering, and classification, to identify patterns in sales data and customer interactions. Sentiment analysis models, including logistic regression, support vector machines (SVMs), and neural networks, classify customer feedback as positive, negative, or neutral. Topic modeling techniques, like Latent Dirichlet Allocation (LDA) and Non-negative Matrix Factorization (NMF), identify common themes and topics in customer feedback. Predictive analytics models, including regression analysis, decision trees, and ensemble methods, forecast future sales trends and identify opportunities for product improvement and marketing campaigns. These models are continuously updated with new data to provide real-time insights and actionable recommendations for retailers.

Applications of AI Agents in Structural Engineering

AI agents have the potential to improve aspects of design, analysis, construction, and maintenance.

Design Optimization

AI agents might assist in optimizing structural designs by evaluating multiple design parameters and configurations to identify the most eficient and cost-efective solutions. These agents leverage advanced algorithms to handle complex calculations and simulations, ensuring structural integrity while minimizing material usage and costs.

Generative Design Algorithms: Generative design uses algorithms to explore a design space, generating potential solutions based on predefined criteria and constraints. These algorithms typically involve optimization techniques such as genetic algorithms, simulated annealing, and particle swarm optimization. The process involves:

Parameter Definition: Defining the design parameters, including material properties, load conditions, and geometric constraints.

Fitness Evaluation: Evaluating each design iteration based on criteria such as structural performance, weight, cost, and sustainability.

Optimization Loop: Iteratively refining the designs by selecting the best-performing solutions and introducing variations to explore new possibilities.

Finite Element Analysis (FEA): AI agents enhance FEA by automating the meshing process, optimizing mesh density, and identifying critical stress points. Machine learning models, such as convolutional neural networks (CNNs), can predict stress distributions and failure points based on input geometry and load conditions.

Mesh Generation: AI agents automate the generation of high-quality meshes, ensuring that regions with high stress concentrations receive finer meshes for accurate analysis.

Stress Prediction: Using pre-trained neural networks, AI agents predict stress distributions and identify potential failure points, significantly speeding up the iterative design process.

Topology Optimization: AI agents employ topology optimization techniques to determine the optimal material distribution within a given design space, subject to performance criteria and constraints. This method involves:

Initial Design Space Definition: Defining the design space and constraints, including load paths and boundary conditions.

Material Distribution Optimization: Using algorithms such as the Solid Isotropic Material with Penalization (SIMP) method to iteratively adjust material distribution for optimal performance.

Structural Health Monitoring

AI agents play a crucial role in monitoring the health of structures using data from sensors embedded in buildings, bridges, and other infrastructure. These sensors collect data on parameters such as vibrations, stress, strain, and temperature. AI agents analyze this data in real-time to detect anomalies, predict potential failures, and schedule maintenance activities proactively.

Sensor Networks: Distributed sensor networks collect real-time data on structural health parameters. Types of sensors include:

- Accelerometers: Measure vibrations and dynamic responses.
- Strain Gauges: Measure deformation and strain in structural components.
- Temperature Sensors: Monitor temperature variations that could afect material properties.
- Displacement Sensors: Measure movements and displacements within the structure.

Data Preprocessing: Raw sensor data is preprocessed to remove noise and irrelevant information. Techniques include:

- Filtering: Applying low-pass, high-pass, or band-pass filters to remove noise.
- Normalization: Scaling data to a consistent range for accurate analysis.
- Feature Extraction: Extracting relevant features such as peak amplitudes, frequency components, and statistical measures (mean, standard deviation).

Anomaly Detection: AI agents use machine learning models to detect anomalies and predict failures. Techniques include:

- Supervised Learning: Training models on labeled data to recognize patterns associated with normal and abnormal conditions. Algorithms include support vector machines (SVMs), decision trees, and neural networks.
- Unsupervised Learning: Using clustering algorithms like k-means and hierarchical clustering to identify deviations from normal behavior without labeled data.
- Time-Series Analysis: Applying models like autoregressive integrated moving average (ARIMA) and LSTM networks to predict future structural conditions based on historical data.
- Proactive Maintenance: AI agents predict maintenance needs and optimize schedules to prevent failures and extend the lifespan of structures. Techniques include:
- Predictive Modeling: Using regression models, decision trees, and neural networks to predict the remaining useful life (RUL) of structural components.
- Optimization Algorithms: Implementing optimization techniques like genetic algorithms and linear programming to schedule maintenance activities eficiently, minimizing downtime and costs.

Current examples of related applications include, as examples only, certain commercial products. Altair advertises that its DesignAI integrates physics-based simulation-driven design with machine learning-based AI-assisted design. Combines AI-assisted design with expert-specific constraints and simulation-driven design with physical engineering constraints to make better product decisions. Altair indicates its suite of AI technologies are directed toward automotive, aerospace, heavy equipment, and manufacturing. Altair's physicsAI™ ofers physics predictions. ExpertAI™ considers subjective design criteria like aesthetics in manufacturing simulations. ShapeAI™ provides automatic pattern and shape recognition in CAE models and feature extraction from geometry without additional input. RomAI™ within Altair® Twin Activate™ incorporates 3D simulations into a 1D environment for system-level studies, aiding in digital twin deployment, system identification, and real-time simulation accuracy.

Construction Management

In construction management, AI agents enhance project planning, scheduling, and resource allocation. They predict project timelines, identify potential delays, and optimize the use of resources such as labor, equipment, and materials.

Project Planning and Scheduling: AI agents use predictive models and optimization algorithms to create detailed project plans and schedules. Techniques include:

Critical Path Method (CPM): Identifying the sequence of critical tasks that determine the project duration.

Program Evaluation and Review Technique (PERT): Incorporating uncertainty in task durations to estimate project timelines more accurately.

Resource Leveling and Allocation: Using optimization algorithms to allocate resources eficiently, avoiding conflicts and over-allocations.

Supply Chain Management: AI agents manage supply chains to ensure timely delivery of materials and prevent bottlenecks. Techniques include:

Demand Forecasting: Using machine learning models to predict material needs based on project schedules and historical data.

Inventory Optimization: Applying optimization algorithms to balance inventory levels, reducing holding costs while ensuring material availability.

Risk Management: AI agents evaluate risks associated with various construction activities and develop mitigation strategies. Techniques include:

Monte Carlo Simulation: Modeling the impact of uncertainties and variations in project parameters.

Risk Assessment Models: Using decision trees and Bayesian networks to evaluate the likelihood and impact of potential risks.

Risk Assessment and Safety: AI agents evaluate the risks associated with various construction activities and structural designs. By analyzing data from past projects and real-time information, they identify potential hazards and suggest mitigation strategies.

Safety Analysis: AI agents use historical accident data and real-time sensor data to assess safety risks. Techniques include:

Classification Models: Using algorithms like logistic regression, decision trees, and neural networks to classify activities and conditions as safe or hazardous.

Natural Language Processing (NLP): Analyzing safety reports, incident logs, and inspection records to identify common risk factors and trends.

Hazard Prediction: AI agents predict potential hazards and recommend preventive measures. Techniques include:

Time-Series Forecasting: Applying models like ARIMA and LSTM networks to predict the occurrence of hazards based on historical data.

Anomaly Detection: Using unsupervised learning algorithms to detect deviations from normal operating conditions that could indicate impending hazards.

Simulation and Scenario Analysis: AI agents simulate various construction scenarios to evaluate safety and risk. Techniques include:

Finite Element Analysis (FEA): Simulating the structural response to different loads and conditions to identify potential failure modes.

Agent-Based Modeling (ABM): Simulating interactions between workers, equipment, and environmental factors to assess safety risks and optimize workflows.

Structural Analysis and Simulation

AI agents perform advanced structural analysis and simulations to predict how structures will behave under different loads and conditions. They model complex interactions between various components of a structure, accounting for factors such as material properties, load distributions, and environmental influences.

Finite Element Analysis (FEA): AI agents automate and enhance FEA processes, including mesh generation, boundary condition application, and result interpretation.

Mesh Optimization: AI agents use techniques like adaptive meshing and neural networks to generate high-quality meshes, ensuring accurate simulations while minimizing computational costs.

Material Modeling: Incorporating machine learning models to predict material behavior under different conditions, improving the accuracy of simulations.

Multiphysics Simulation: AI agents integrate multiple physical phenomena, such as structural, thermal, and fluid dynamics, into a single simulation framework.

Coupled Simulations: Using techniques like partitioned coupling and co-simulation to model interactions between different physical domains.

Data-Driven Models: Employing machine learning algorithms to create surrogate models that approximate complex physical behaviors, reducing computational costs.

Optimization and Sensitivity Analysis: AI agents optimize structural designs and perform sensitivity analysis to identify critical parameters.

Design of Experiments (DOE): Using statistical techniques to systematically vary design parameters and evaluate their impact on performance.

Sensitivity Analysis: Applying methods like Sobol indices and variance-based approaches to quantify the influence of input variables on structural behavior.

Intelligent Building Systems

In modern smart buildings, AI agents manage and optimize building systems such as HVAC (heating, ventilation, and air conditioning), lighting, and security. They analyze data from sensors to adjust these systems in real-time, improving energy efficiency and occupant comfort.

HVAC Optimization: AI agents use predictive models and optimization algorithms to control HVAC systems, ensuring eficient energy use and maintaining desired indoor conditions.

Predictive Control: Using machine learning models to predict future temperature and occupancy patterns, adjusting HVAC settings proactively.

Optimization Algorithms: Implementing techniques like model predictive control (MPC) and genetic algorithms to optimize HVAC operations for energy eficiency and comfort.

Lighting Control: AI agents adjust lighting based on occupancy, natural light availability, and user preferences.

Occupancy Detection: Using sensors and machine learning models to detect occupancy patterns and adjust lighting accordingly.

Daylight Harvesting: Implementing control algorithms that adjust artificial lighting based on the amount of natural light, maximizing energy savings.

Security Systems: AI agents enhance building security through intelligent surveillance and access control.

Video Analytics: Using computer vision algorithms, such as convolutional neural networks (CNNs) and object detection models (e.g., YOLO, Faster R-CNN), to analyze surveillance footage and detect suspicious activities.

Access Control: Implementing biometric recognition systems (e.g., facial recognition, fingerprint scanning) to manage building access and ensure security.

Elaboration on Applications in Structural Engineering

Design Optimization: By evaluating a multitude of parameters and constraints, agents facilitate the generation of optimal designs that balance strength, eficiency, and cost-efectiveness Generative design software may propose a variety of design solutions tailored to meet specific criteria such as material types, geometric constraints, and load requirements Structural Analysis: Ai agents may be used in simulating and evaluating forces in a structure, aiding engineers in identifying potential vulnerabilities, predicting failure modes, and improving performance AI algorithms may sift through vast datasets allows for the detection of patterns and anomalies that might otherwise go unnoticed, to improve structural designs.

Health Monitoring and Predictive Maintenance: Monitoring and maintaining structural integrity. By analyzing real-time sensor data, AI algorithms can detect irregularities, predict potential failures, and provide a comprehensive assessment of a structure's condition Predictive maintenance enables engineers to address issues proactively, saving costs and/or prolonging the lifespan of structures Construction Management: AI can enhance project planning, execution, and monitoring. This can include predicting project timelines, budget requirements, and resource allocation within given constraints.

Sustainable Design: AI agents can help facilitate eco-friendly design principles. Applications may include optimizing material usage and resource management. They may assist in sustainable construction practices, reducing waste and minimizing environmental impact.

Specific Structures AI Agents Can Help Design and/or Otherwise Improve

Building Structures: AI agents can assist in the design and analysis of various types of building structures, including residential, commercial, and industrial buildings. They can optimize the structural design, evaluate load-bearing capacities, and ensure compliance with safety regulations.

Bridges: AI agents can analyze the structural integrity of bridges, considering factors such as material strength, load distribution, and environmental conditions. They can help engineers optimize bridge designs for maximum safety and eficiency.

Tunnels: AI agents can aid in the design and analysis of tunnels, considering factors such as soil conditions, water pressure, and structural stability. They can optimize tunnel designs to ensure safe and eficient transportation infrastructure.

Dams: AI agents can assist in the analysis and design of dams, considering factors such as water pressure, soil stability, and environmental impact. They can help engineers optimize dam designs for water storage, flood control, and power generation.

High-rise Structures: AI agents can analyze and design tall structures, such as skyscrapers, considering factors such as wind loads, structural stability, and material strength. They can optimize the design to ensure structural integrity and occupant safety.

Roofs and Canopies: AI agents can assist in the design and analysis of roofs and canopies, considering factors such as load-bearing capacity, material selection, and aesthetic requirements. They can optimize the design for structural stability and weather resistance.

Retaining Walls: AI agents can analyze and design retaining walls, considering factors such as soil pressure, slope stability, and drainage. They can optimize the design to ensure stability and prevent soil erosion.

Offshore Structures: AI agents can aid in the analysis and design of offshore structures, such as oil platforms and wind turbines, considering factors such as wave loads, corrosion resistance, and structural integrity. They can optimize the design for safe and efficient operation in harsh marine environments.

Stadiums and Arenas: AI agents can assist in the design and analysis of large sports stadiums and arenas, considering factors such as seating arrangements, structural stability, and acoustics. They can optimize the design to provide optimal spectator experiences and ensure safety.

Airports: AI agents can aid in the analysis and design of airport structures, including terminals and hangars. They can consider factors such as passenger flow, structural integrity, and seismic resistance. AI agents can optimize the design to ensure eficient operations and passenger safety.

Railway Structures: AI agents can analyze and design railway structures, such as railway bridges, tunnels, and platforms. They can consider factors such as track alignment, train loads, and dynamic forces. AI agents can optimize the design for safe and reliable railway infrastructure.

Power Plants: AI agents can assist in the analysis and design of power plant structures, including thermal power plants, hydroelectric plants, and nuclear power plants. They can consider factors such as equipment placement, structural stability, and safety requirements. AI agents can optimize the design for eficient power generation and operational safety.

Historical and Cultural Heritage Structures: AI agents can aid in the preservation and restoration of historical and cultural heritage structures, such as ancient monuments, temples, and castles. They can analyze structural integrity, assess deterioration, and recommend appropriate restoration techniques. AI agents can help ensure the preservation of these valuable structures for future generations.

Transportation Infrastructure: AI agents can assist in the design and analysis of transportation infrastructure, including highways, tunnels, and railway systems. They can consider factors such as trafic flow, structural capacity, and environmental impact. AI agents can optimize the design to ensure eficient and sustainable transportation networks.

Water and Wastewater Treatment Facilities: AI agents can analyze and design structures related to water and wastewater treatment facilities, including water treatment plants and sewage treatment plants. They can consider factors such as water pressure, chemical exposure, and structural durability. AI agents can optimize the design for efective and safe treatment processes.

Sports Facilities: AI agents can aid in the analysis and design of sports facilities, such as indoor and outdoor arenas, swimming pools, and sports complexes. They can consider factors such as load distribution, material durability, and safety requirements. AI agents can optimize the design to provide optimal sporting experiences and ensure player safety.

Towers and Communication Structures: AI agents can assist in the analysis and design of communication towers, radio antennas, and telecommunication infrastructure. They can consider factors such as wind loads, structural stability, and signal propagation. AI agents can optimize the design for reliable communication networks.

Industrial Structures: AI agents can aid in the analysis and design of industrial structures, including factories, warehouses, and manufacturing plants. They can consider factors such as equipment layout, material handling, and structural integrity. AI agents can optimize the design for eficient industrial operations and worker safety.

Agricultural Structures: AI agents can analyze and design structures used in agriculture, such as greenhouses, storage facilities, and livestock shelters. They can consider factors such as climate control, structural durability, and animal welfare. AI agents can optimize the design to enhance agricultural productivity and sustainability.

Educational and Institutional Buildings: AI agents can assist in the design and analysis of educational and institutional buildings, including schools, universities, and government facilities. They can consider factors such as space utilization, accessibility, and energy eficiency. AI agents can optimize the design to provide conducive environments for learning and working.

Healthcare Facilities: AI agents can aid in the analysis and design of healthcare facilities, including hospitals, clinics, and medical research centers. They can consider factors such as patient flow, infection control, and structural resilience. AI agents can optimize the design to support eficient healthcare delivery and patient well-being.

Reservoirs and Water Storage Structures: AI agents can analyze and design structures related to water storage and reservoirs, including water tanks, dams, and water supply systems. They can consider factors such as water pressure, storage capacity, and structural stability. AI agents can optimize the design for reliable water storage and distribution.

Theme Parks and Entertainment Structures: AI agents can assist in the design and analysis of theme parks, amusement rides, and entertainment structures. They can consider factors such as ride dynamics, safety regulations, and crowd management. AI agents can optimize the design to create thrilling and safe entertainment experiences.

Environmental and Sustainable Structures: AI agents can analyze and design structures focused on environmental sustainability, such as green buildings, renewable energy systems, and eco-friendly infrastructure. They can consider factors such as energy eficiency, material selection, and ecological impact. AI agents can optimize the design to reduce environmental footprints and promote sustainable practices.

Emergency and Disaster Response Structures: AI agents can aid in the analysis and design of structures used in emergency and disaster response, such as emergency shelters, command centers, and temporary housing. They can consider factors such as rapid deployment, structural safety, and logistical requirements. AI agents can optimize the design to provide efficient and resilient solutions during crises.

Sports Stadiums and Complexes: AI agents can assist in the design and analysis of sports stadiums and complexes, including football stadiums, basketball arenas, and sports training facilities. They can consider factors such as seating arrangements, acoustics, and player safety. AI agents can optimize the design to create immersive and secure sporting environments.

Parking Structures: AI agents can analyze and design parking structures, including multi-level parking garages and automated parking systems. They can consider factors such as vehicle flow, structural stability, and space optimization. AI agents can optimize the design to maximize parking capacity and streamline parking operations.

Data Centers: AI agents can aid in the analysis and design of data centers, which house large-scale computer systems and servers. They can consider factors such as cooling requirements, power distribution, and structural resilience. AI agents can optimize the design to ensure efficient data processing, storage, and security.

Cultural and Exhibition Centers: AI agents can assist in the design and analysis of cultural and exhibition centers, including museums, art galleries, and convention halls. They can consider factors such as exhibit layout, lighting, and architectural aesthetics. AI agents can optimize the design to create engaging and visually appealing spaces for cultural events and exhibitions.

Transportation Hubs: AI agents can analyze and design transportation hubs, including airports, train stations, and bus terminals. They can consider factors such as passenger flow, accessibility, and structural integrity. AI agents can optimize the design to ensure seamless connectivity and eficient transportation operations.

Pedestrian Bridges: AI agents can aid in the analysis and design of pedestrian bridges, considering factors such as structural stability, aesthetics, and accessibility. They can optimize the design to create safe and visually appealing bridges for pedestrians.

Aquariums and Marine Structures: AI agents can assist in the design and analysis of aquariums and marine structures, including underwater observatories and marine research facilities. They can consider factors such as water pressure, marine life habitat, and structural durability. AI agents can optimize the design to provide immersive marine experiences and support marine research.

Prisons and Detention Facilities: AI agents can analyze and design prisons and detention facilities, considering factors such as security measures, inmate management, and architectural layout. They can optimize the design to ensure secure and eficient correctional environments.

Historical Structure Restoration: AI agents can aid in the restoration and preservation of historical structures, including ancient monuments, heritage sites, and architectural landmarks. They can analyze structural integrity, assess deterioration, and recommend appropriate restoration techniques. AI agents can help preserve the cultural heritage for future generations.

Urban Infrastructure: AI agents can assist in the analysis and design of urban infrastructure, including roads, bridges, and utility systems. They can consider factors such as trafic management, infrastructure resiliency, and sustainability. AI agents can optimize the design to create eficient and sustainable urban environments.

MRI Machines: AI agents can assist in the analysis and design of Magnetic Resonance Imaging (MRI) machines, which are used for non-invasive medical imaging. They can consider factors such as electromagnetic field stability, patient comfort, and imaging quality. AI agents can optimize the design to enhance image resolution, reduce scanning time, and improve patient experience.

X-ray Machines: AI agents can aid in the analysis and design of X-ray machines, which are commonly used for diagnostic imaging. They can consider factors such as radiation safety, image clarity, and patient positioning. AI agents can optimize the design to minimize radiation exposure, improve imaging accuracy, and enhance workflow eficiency.

Ultrasound Systems: AI agents can analyze and design ultrasound systems, which use high-frequency sound waves for medical imaging. They can consider factors such as image resolution, probe ergonomics, and real-time imaging capabilities. AI agents can optimize the design to provide clear and detailed ultrasound images for diagnostic purposes.

Prosthetic Devices: AI agents can assist in the analysis and design of prosthetic devices, including artificial limbs, joints, and implants. They can consider factors such as biomechanics, material selection, and patient comfort. AI agents can optimize the design to improve functionality, enhance mobility, and provide a better quality of life for individuals with limb loss or impairment.

Hearing Aids: AI agents can analyze and design hearing aids, which are wearable devices used to amplify sound for individuals with hearing loss. They can consider factors such as sound processing algorithms, comfort, and aesthetics. AI agents can optimize the design to provide personalized and high-quality sound amplification, improving hearing capabilities.

Pacemakers and Implantable Devices: AI agents can assist in the analysis and design of pacemakers and other implantable medical devices. They can consider factors such as power management, biocompatibility, and longevity. AI agents can optimize the design to ensure reliable and eficient functioning of these life-saving devices.

Medical Monitoring Systems: AI agents can aid in the analysis and design of medical monitoring systems, including vital sign monitors, electrocardiogram (ECG) machines, and sleep monitoring devices. They can consider factors such as data accuracy, user interface, and connectivity. AI agents can optimize the design to provide real-time and accurate monitoring of patient health parameters.

Surgical Robots: AI agents can analyze and design surgical robots, which assist surgeons in performing minimally invasive procedures with precision and control. They can consider factors such as robotic arm dexterity, imaging integration, and haptic feedback. AI agents can optimize the design to enhance surgical accuracy, reduce invasiveness, and facilitate faster patient recovery.

Medical Imaging Software: AI agents can assist in the analysis and design of medical imaging software, including computer-aided diagnosis (CAD) systems and image processing algorithms. They can consider factors such as image analysis accuracy, speed, and automation. AI agents can optimize the design to improve diagnostic accuracy, streamline workflow, and aid in early disease detection.

Infusion Pumps: AI agents can aid in the analysis and design of infusion pumps, which deliver fluids, medications, or nutrients to patients in a controlled manner. They can consider factors such as flow rate accuracy, user interface, and alarm systems. AI agents can optimize the design to ensure precise and safe infusion delivery.

Aircraft Fuselages: AI agents can assist in the analysis and design of aircraft fuselages, which house the cockpit, passenger cabin, and cargo compartments. They can consider factors such as structural integrity, weight optimization, and aerodynamic performance. AI agents can optimize the design to ensure safe and eficient flight operations.

Wings: AI agents can aid in the analysis and design of aircraft wings, which provide lift and control during flight. They can consider factors such as wing shape, structural strength, and fuel efficiency. AI agents can optimize the design to enhance aerodynamic performance and reduce drag.

Aircraft Engine Mounts: AI agents can analyze and design aircraft engine mounts, which secure the engines to the aircraft structure. They can consider factors such as load distribution, vibration damping, and structural stability. AI agents can optimize the design to ensure safe and reliable engine operation.

Rocket Structures: AI agents can assist in the analysis and design of rocket structures, including launch vehicles and spacecraft. They can consider factors such as structural integrity, thermal protection, and aerodynamic stability. AI agents can optimize the design to withstand the extreme conditions of space travel.

Satellite Structures: AI agents can aid in the analysis and design of satellite structures, including communication satellites and Earth observation satellites. They can consider factors such as weight reduction, structural stability, and thermal management. AI agents can optimize the design to ensure reliable satellite operation in space.

Aircraft Landing Gear: AI agents can analyze and design aircraft landing gear, which supports the aircraft during takeof, landing, and ground operations. They can consider factors such as load-bearing capacity, shock absorption, and structural durability. AI agents can optimize the design to ensure safe and smooth landing operations.

Spacecraft Habitats: AI agents can assist in the analysis and design of spacecraft habitats, which provide living and working environments for astronauts during space missions. They can consider factors such as radiation shielding, life support systems, and structural integrity. AI agents can optimize the design to ensure the well-being and safety of astronauts in space.

Aircraft Control Surfaces: AI agents can aid in the analysis and design of aircraft control surfaces, including ailerons, elevators, and rudders. They can consider factors such as aerodynamic forces, structural strength, and control responsiveness. AI agents can optimize the design to ensure precise and eficient aircraft maneuverability.

Aircraft Interiors: AI agents can analyze and design aircraft interiors, including seating arrangements, cabin layouts, and storage compartments. They can consider factors such as passenger comfort, safety regulations, and weight optimization. AI agents can optimize the design to provide a pleasant and functional interior environment for passengers.

Vehicle Body Structure: AI agents can assist in the analysis and design of vehicle body structures, including the chassis, frame, and body panels. They can consider factors such as structural integrity, crashworthiness, and weight optimization. AI agents can optimize the design to ensure safety, durability, and fuel efficiency.

Automotive Suspension Systems: AI agents can aid in the analysis and design of automotive suspension systems, including the springs, shock absorbers, and control arms. They can consider factors such as ride comfort, handling, and stability. AI agents can optimize the design to provide a smooth and controlled ride experience.

Automotive Powertrain: AI agents can analyze and design automotive powertrain systems, including the engine, transmission, and drivetrain components. They can consider factors such as power output, fuel eficiency, and emissions control. AI agents can optimize the design to enhance performance, eficiency, and environmental sustainability.

Automotive Safety Systems: AI agents can assist in the analysis and design of automotive safety systems, including airbags, seat belts, and collision avoidance technologies. They can consider factors such as crash test performance, occupant protection, and active safety features. AI agents can optimize the design to enhance vehicle safety and reduce the risk of accidents.

Automotive Interior Design: AI agents can aid in the analysis and design of automotive interiors, including seating arrangements, dashboard layout, and infotainment systems. They can consider factors such as ergonomics, user interface, and comfort. AI agents can optimize the design to provide a pleasant and intuitive user experience.

Automotive Lighting Systems: AI agents can analyze and design automotive lighting systems, including headlights, taillights, and interior lighting. They can consider factors such as visibility, energy eficiency, and aesthetics. AI agents can optimize the design to ensure optimal lighting performance and enhance the overall appearance of the vehicle.

Automotive Aerodynamics: AI agents can assist in the analysis and design of automotive aerodynamics, including the shape of the vehicle, airflow management, and drag reduction techniques. They can consider factors such as fuel eficiency, stability, and noise reduction. AI agents can optimize the design to minimize aerodynamic drag and improve vehicle performance.

Automotive Electrical Systems: AI agents can aid in the analysis and design of automotive electrical systems, including wiring harnesses, sensors, and control modules. They can consider factors such as electrical eficiency, reliability, and integration with other vehicle systems. AI agents can optimize the design to ensure proper functioning and connectivity of electrical components.

Green Roofs: AI agents can analyze building characteristics, climate data, and plant species requirements to design green roofs that optimize stormwater management, energy eficiency, and biodiversity in urban areas.

Constructed Wetlands: AI agents can analyze hydrological data, pollutant levels, and plant species characteristics to design constructed wetlands for wastewater treatment. They can optimize wetland size, flow patterns, and plant selection to enhance water quality and habitat creation.

Biofiltration Systems: AI agents can analyze pollutant data, filtration media properties, and hydraulic conditions to design biofiltration systems for stormwater treatment. They can optimize system design, media composition, and flow rates to efectively remove contaminants.

Living Shorelines: AI agents can analyze coastal dynamics, sediment transport, and plant species preferences to design living shorelines that provide erosion control, habitat creation, and shoreline stabilization. They can optimize design parameters to enhance ecological resilience and protect coastal areas.

Riparian Bufer Zones: AI agents can analyze hydrological data, pollutant loads, and plant characteristics to design riparian bufer zones along water bodies. They can optimize bufer width, plant species selection, and spatial arrangement to reduce nutrient runof and enhance water quality.

Fish Passages: AI agents can analyze fish behavior, hydraulic conditions, and barrier characteristics to design fish passages that facilitate fish migration and enhance connectivity in river systems. They can optimize passage design and hydraulic structures to improve fish passage success.

Ecological Bridges: AI agents can analyze landscape connectivity, species movement patterns, and road network data to design ecological bridges or wildlife corridors. They can optimize bridge location, size, and vegetation composition to enhance wildlife movement and mitigate habitat fragmentation.

Automated Heavy Equipment: AI agents can be used to design and optimize heavy equipment structures, such as excavators, bulldozers, and cranes, to improve eficiency, safety, and performance.

Robotic Construction Systems: AI agents can assist in the design and analysis of robotic construction systems, including autonomous construction vehicles and robotic arms, to automate construction processes and increase productivity.

Smart Sensors and Monitoring Systems: AI agents can analyze data from sensors installed on construction equipment to monitor various parameters, such as temperature, humidity, and structural integrity. This data can be used to identify potential issues, initiate preventive measures, enable predictive maintenance, and improve design of real-world construction equipment.

Generative Design for Construction: AI agents can utilize generative design algorithms to optimize the structural design of construction equipment, considering factors like material usage, weight distribution, and performance requirements.

Computer Vision and Machine Learning for Equipment Safety: AI agents can use computer vision and machine learning techniques to analyze video feeds from construction sites and detect potential hazards, such as trip and fall incidents or unauthorized access to equipment.

Further Considerations

Engineering analysis and design is often done in virtual space. But real-world structures and engineering systems don't always behave in the same way as structures and engineering systems as modeled in virtual space. AI Agents can help gather information and take action in the field to help improve virtual space models to more closely simulate real-world structures and systems.

Examples of Future Directions of AI Agents in Technical Fields

In the next three to five years, potential users of AI could include a wide variety of potential applications. In healthcare, AI agents may help diagnosing diseases, developing personalized treatment plans, and managing patient data. In financial analysts, predicting market trends, fraud detection, and personal financial advice. For educators and students, personalized learning experiences, automated grading, and educational content creation. In the manufacturing industry, improving production lines, predictive maintenance, and quality control.

For legal professionals, enhanced document analysis, contract review, legal research. Also, drafting legal documents, autonomously inventing, autonomously writing and/or filing patent applications, prior art searches, automated patent and/or trademark examining, automated preparation of responses to Office Actions, drafting cease-and-desist letters, drafting legal opinion letters, legal brief review, drafting court opinions, weighing competing court arguments and briefs, reviewing large sets of legal data, and the like. These functions, at least initially, will likely include human involvement and oversight, although one can envision a future in which much of the inventing, patenting, patent examining, court filings and decisions, appeals, and a wide variety of other legal processes are automated, at least partially, with the assistance of AI agents.

Special Case: AI Agents in Patent Preparation, Prosecution, and Appeal

In the field of patent prosecution, there already exist platforms to assist in patent drafting. By entering a few sentences or paragraphs describing an invention, a GenAi platform such as ChatGPT, Claude, and others can generate a patent application on the submitted idea, which may be provided to the GenAI platform in written form or even spoken audibly. The generated patent application can optionally include claims and all other parts of the application. Other apps such as PatentPal, PatentBots, and others can generate drawings, brief description of the drawings, abstract, summary of the invention, and all or portions of the specification.

Between these various apps, an inventor can generate an entire patent application, ready to file with the Patent Office, with just a simple description of the invention. For AI-assisted patent searching, platforms such as IP Rally can very quickly search for prior art or other art that might be relevant. When an inventor receives an Office Action from the Patent Office, Dolcera offers an AI-assisted review of the Office Action and can automatically prepare arguments and claim amendments in response.

Thus, by using these existing elements and coordinating functions and transfer of data and such, an AI agent-assisted patent prosecution system can be devised. In one embodiment, AI agents mostly write the patent application, AI agents automatically generate patent application and assignment forms. AI agents file the patent application and forms with a Patent Office, pay fees, and take care of any other aspects of patent filing. The patent application is examined in the Patent Office by an AI agent or with its significant assistance, and an Office Action is prepared, potentially automatically and/or with human examiner assistance. Responses to Office Actions are automatically generated on the inventor's side and submitted back to the Patent Office. This process continues until the application is allowed or finally rejected. Similarly, an AI agent-assisted system can initiate appeal, prepare briefs on all sides, and even perhaps make automated decisions on the appeal. AI agents can keep all parties aware of due dates, calendar them, provide reminders, automatically generate letters to clients and/or other interested parties, and such. AI agents can become a docketing service, as one example.

AI agents may assist in applicant interviews with the Patent Ofice. In one embodiment, an inventor may have an interview with a real or virtual patent examiner to make arguments, provide evidence, negotiate potentially allowable claims, and such. AI agents may make suggestions to the inventor as to what to argue, and statistically what arguments are potentially successful with the Patent Ofice and with specific patent examiners, based on historical data or the like.

In all of this, human intervention and review is likely to be important, especially in the early stages of the system. Consequently, the system may include one or multiple points at which a human participates in the patent application preparation and prosecution process.

Although a mostly automated system implemented by AI agents can be imagined in which patent application preparation and examination process is largely automated and can greatly shorten the timeline for patent prosecution.

As noted, some individual AI agents can already do some elements of an automated patent preparation and prosecution system. However, significant coordination, data transfer, and building out and customization of capabilities is needed. AI agents can help with all of these needs to build, operate, and maintain such a system. Once implemented, an automated or partially automated patent prosecution system can save time and cost in the patent process. Systems can similarly be built to automatically negotiate licensing deals, using for example data that an AI agent gathers about scope of claims, life of patent, knowledge of existing and potential products/systems, data about the potential licensee and the licensor, data about other deals in a similar technology space, and such.

Retail

For retailers, AI agents can provide or assist with personalized shopping experiences and inventory management. Customer service chatbots can provide customer service 24/7.

Mental Health Care

In mental health care, Ai agents may assist with Mental Health Chatbots and Virtual Therapists, Personalized Treatment Plans, Predictive Analytics for Mental Health, Telepsychiatry Platforms, Monitoring and Managing Medication Adherence Behavioral Analysis Tools such as analyzing speech patterns, facial expressions, and other behavioral cues to help with diagnosis and treatment. Other Ai agent developments in mental health may include AI-Enhanced Cognitive Behavioral Therapy (CBT) Apps, Clinical Decision Support Systems in which AI agents provide evidence-based recommendations and insights from large datasets.

In mental health care, AI agents may also help foster Virtual Reality (VR) Therapy in which AI agents integrate with VR therapy to provide adaptive, immersive treatment for conditions like PTSD, phobias, depression, mania, psychosis, and/or anxiety disorders. AI agents may also help with Patient Engagement with AI agents providing reminders, educational content, and providing virtual or real-life support groups.

In a virtual support group, a patient may interact with real and/AI-generated group members in a VR group setting. AI-generated group members may be designed in a personalized way to support, share relevant simulated life stories, and/or converse in a way likely to help the patient. AI-generated group members may be provided, for example, in realistic video as if they are real people (on a display screen, perhaps, or by holography etc.), even though they are actually AI-generated. Alternatively, this may be done in a one-on-one format as well, in which an AI-generated simulated mental health professional converses with a patient, for example.

Here are potential future applications of AI agents in various fields. As will be seen, there are numerous roles for AI agents to play in, among several other areas: predictive maintenance and monitoring, personalized experiences and recommendations, real-time analysis and response, automation and optimization, enhanced safety and risk management, environmental and energy eficiency, data-driven insights and decision support, and AI agent integration with emerging technologies.

Automobile Frame Engineering

Predictive Maintenance and Anomaly Detection: AI agents will help in predictive maintenance, using algorithms to analyze sensor data and identify patterns indicative of potential component failures. This may reduce vehicle breakdowns and optimize maintenance schedules, to enhance vehicle reliability and reduced maintenance costs and downtime.

Lightweight Materials: The development of new material compositions, such as high-strength steel, aluminum alloys, and composites, will be accelerated by AI algorithms that can predict their properties and performance AI-driven tools will enable engineers to design materials that balance weight reduction, strength, and cost-efectiveness, which is essential for improving vehicle eficiency and performance. This application has strong commercial prospects as the industry moves towards more fuel-eficient and environmentally friendly vehicles.

AI-Enhanced Structural Analysis and Crashworthiness Optimization: AI will enhance structural analysis, allowing engineers to simulate how lightweight materials perform under various conditions, including crashes, shortening development time and improving safety.

Manufacturing Process Optimization: AI's role in optimizing manufacturing processes, such as forming, joining, and casting, will lead to higher quality and reduced waste and energy consumption Predictive maintenance: Ensuring that production equipment operates smoothly The commercial opportunities include the development of AI-powered automation solutions that can streamline production lines and reduce costs Supply Chain and Inventory Management: AI will streamline the supply chain by ensuring eficient production schedules and reducing costs. Will help manage complex logistics of car body manufacturing, with timely delivery of materials, for example. The commercial potential lies in the development of AI systems that can manage inventory levels and optimize the supply chain, leading to significant cost savings for manufacturers.

Airframe Engineering

Intelligent Sensors for Mechanical Failure Prediction: Integrating with AI will enhance the ability to anticipate mechanical failures in aircraft components. These sensors will collect and analyze data in real-time, allowing for immediate responses to any detected anomalies. The commercial opportunities include the manufacturing and integration of these intelligent sensors into new and existing aircraft, as well as the development of the AI software that interprets the sensor data.

AI-Enhanced Visual Inspection Systems: Computer vision systems powered by AI will automate the visual inspection of aircraft, improving the accuracy and eficiency of identifying structural damage or wear. These systems will analyze images faster than human inspectors and with greater consistency. This can foster earlier detection of potential issues. The commercial potential lies in the development of, for example, drones and robotic systems equipped with AI-driven computer vision for routine inspections.

Electro-Mechanical Engineering

Generative AI in Design and Manufacturing: Automate and optimize design of complex designs. AI agents will generate and evaluate a multitude of design variations, reducing the time and cost associated with product development.

AI-Enhanced Computational Fluid Dynamics (CFD): AI agents will enhance the capabilities of CFD simulation software, enabling more accurate and faster analysis of fluid flows in systems such as HVAC, aerospace, and automotive. Help engineers optimize designs for performance and energy eficiency, leading to more sustainable and cost-efective solutions.

AI-Driven Development of Small Modular Reactors: Cevelopment of small modular reactors (SMRs) will benefit from AI agents capable of handling complex simulations and data analysis. AI will accelerate design and testing of reactors, helping build and ship eficiently to meet energy demands. Assists in a flexible and sustainable energy grid.

AI in Sustainable Electro-Mechanical Systems: AI agents will help development of sustainable electro-mechanical systems, such as electric trucks. By helping energy consumption and improving safety features, AI will enhance eficiency and reliability to develop greener transportation solutions.

Centralized AI-Driven Engineering Data Management: AI agents will centralize and manage dynamic engineering data, streamlining the development of complex machinery such as satellites and launch vehicles. This will improve collaboration among engineers and ensure that all team members have access to the most up-to-date information, leading to more eficient project management and reduced time to market.

Autonomous Systems and Robotics: Ai agents will play an important role in autonomous systems and advanced robotics that can perform complex tasks with minimal human intervention. This includes autonomous vehicles, drones, and industrial robots capable of performing more intricate and/or dificult operations than current models.

Science and Engineering Labs

Experiment Design: AI agents may ofer more complex protocol designs, possibly using scientific and engineering papers to generate lab-executable protocols. AI agents can suggest new experimental approaches based on data from previous experiments or other sources.

Data Management: AI agents may handle larger volumes of text, images, video, sound or other modes in queries and responses. AI agents may evolve to manage and analyze extensive datasets and provide more reliable projections Enhanced Interpretability and Explanation: One possibility is for AI agents to automate explanation of complex neural networks, providing intuitive explanations of computations inside trained networks. This can enable an AI agent to actively participate in hypothesis formation and experimental testing.

Workflow Execution: AI agent managers may plan and execute experiments autonomously or partially autonomously, identifying resources needed, constructing workflows to address queries, and other relevant activities. AI agents may present reasoning for their actions, enhancing transparency, and may include an interface to interact with humans.

Continuous Improvement: AI agents can have memory features. They can learn from interactions and become more eficient, accurate, or improve on other performance measures over time.

Structural Engineering

Structural Health Monitoring (SHM): AI agents may identify patterns and anomalies in data from sensors, predicting future behavior of structures, and automating tasks such as data analysis and reporting. Ai agents may assist in early detection of potential problems and reduce maintenance costs. Machine learning techniques like CNNs and RNNs may assist in processing data collected from SHM systems Automated Inspection and Maintenance: AI algorithms may automate the inspection process by analyzing images and sensor data to detect structural damage such as cracks and corrosion. Drones equipped with AI agents may capture high-resolution images. Maintenance may improve, extending the lifespan of structures.

Integration of IoT and AI in SHM: Ai agents may gather data from Internet of Things (IoT) sensors and, optionally, can continuously monitor parameters such as stress, strain, temperature, and other desired structural aspects. Other technologies, such as fiber optic sensors, may will provide sensitivity in areas such as structural deformations.

Further, AI agents will integrate diverse data from various sources, sometimes in varying formats and/or having other diferences from other data, in order to work with multiple types of sensors, optionally in real time.

Proactive Maintenance: AI agents may foster proactive maintenance strategies. Digital twins may be used to predict needed maintenance, for example. For best performance, the virtual twin should as closely model the real-world twin as possible. That is, in a virtual twin system, there is sometimes a diference between the behavior of a structure in virtual space, and the behavior of a real-world structure. Hence the need in the field to reduce the diference between virtual predicted behavior and actual, real-world behavior.

Wearable Electronics

Personalized Health Monitoring: AI agents could provide real-time alerts for critical health events like dangerously high blood pressure, blood glucose level significantly out of range, irregular heart rhythms, falls, and/or other critical health metrics. These systems might track data over time and look for trends.

AI agents might track other data relating to a person's health, such as their exercise level, environmental factors, amount and quality of sleep, and such to gain a holistic view of a person's health and make recommendations. It is noted that, as just one example, smart clothing with biometric and/or other data capture capabilities may be one option.

Footwear: shoes having AI agents that analyze and track walking and running patterns, to prevent injury and improve performance. The AI agent may be incorporated into the shoe, or may be remote to the shoe and work from data collected by or transmitted from the shoe.

Responsive Apparel: AI agents may enable clothing to respond to environmental changes, user movements, physiological signals, or other factors. In some embodiments, breathability, color, shape or other aspects of clothing may be altered by an AI agent.

Data for Training AI Agents

In some cases, AI agents require significant data for training. The quality, quantity, and diversity of this data can be reflected in the performance of the AI Agent. AI agents can autonomously clean up datasets to an extent. For example:

Data Imputation: AI agents can automatically fill in missing values using statistical methods or machine learning algorithms. For instance, they can predict missing values based on the patterns observed in the data.

Outlier Detection and Removal: AI algorithms can identify and handle outliers that may distort analyses. Techniques like clustering, anomaly detection, and statistical analysis are commonly used.

Data Normalization and Standardization: AI agents can automate the process of normalizing data to a standard scale or format, making it easier to compare and analyze.

Error Detection: AI can identify and correct errors in the dataset, such as typos, incorrect formats, or inconsistencies in categorical data.

Duplicate Detection: AI agents can find and merge duplicate records by comparing similarities across different entries.

Data Transformation: AI agents can transform data from one format to another, aggregate information, or create new features from existing ones.

But in some cases efectiveness of an AI agent is enhanced with collaboration with humans, for example:

AI-Assisted Cleaning: AI may handle routine and large-scale data cleaning tasks quickly, flagging potential issues for human review.

Human Oversight: Data scientists and domain experts can validate AI's output, make context-aware decisions, and handle complex or ambiguous cases.

Iterative Improvement: Continuous feedback from humans can be used to improve the AI's cleaning algorithms.

Artificial Heart Valve Design

Many of the concepts discussed with reference to other areas of engineering apply to artificial heart valve engineering. Here are some potential applications of AI agents in this field.

Automated Design Optimization: AI agents can assist in automating design optimization. AI agents can evaluate multiple design parameters and configurations to identify the most eficient and efective. This can include shape, material selection, and mechanical properties of heart valves to ensure durability, biocompatibility, and hemodynamic performance.

Predictive Modeling and Simulation: AI agents can integrate predictive modeling and simulation into the design process, allowing for the virtual testing of heart valve designs under various physiological conditions. These simulations can predict how a valve will perform over time, considering factors such as blood flow dynamics, wear and tear, and potential failure modes.

Personalized Heart Valve Design: AI agents can analyze patient-specific data, such as imaging scans, genetic information, and medical histories, to design customized heart valves tailored to individual needs. This personalized approach can enhance the fit and functionality of the valve, leading to better patient outcomes.

Post-Implantation Monitoring and Predictive Analytics: AI agents can be used to develop systems for monitoring the performance of implanted heart valves in real-time. By collecting and analyzing data from wearable devices or implantable sensors, AI can provide predictive analytics to detect early signs of valve dysfunction or patient complications.

SUMMARY OF THE INVENTION

The present disclosure provides an integrated structural-health-monitoring (SHM) platform for physical structures such as bridges, towers, aircraft components, or buildings. This system unifies real-time sensing, digital-twin modeling, data-driven structural modeling, anomaly detection, and autonomous maintenance response.

The system includes a sensor network mounted on the structure, comprising at least one strain gauge and at least one tri-axial accelerometer. Optional sensors may include temperature, humidity, acoustic-emission, and optical cameras, which provide auxiliary environmental and visual data. These sensors generate real-time data streams that are analyzed continuously.

A perception module preprocesses the sensor data by filtering out noise—preferably using a Gaussian filter—and applying statistical normalization such as z-score scaling. From the normalized data, numerical features such as peak amplitude and dominant frequency are extracted, often using fast Fourier transform (FFT) techniques.

The extracted features are provided to two models operating in parallel. A finite-element (FE) digital-twin model is maintained to simulate the structural state, updating parameters such as material properties or mesh density in response to observed changes. Concurrently, a data-driven surrogate model, implemented as a multilayer neural network, learns to predict expected sensor outputs from the feature inputs. This surrogate may be physics-informed and embed governing equations, material properties, and boundary conditions. The surrogate model is updated in real time through stochastic-gradient-descent back-propagation to minimize residual error between predicted and actual sensor values.

An anomaly-detection module evaluates structural condition either by computing a residual between predicted and actual sensor values or by classifying numerical features using a trained neural network. An anomaly score is computed and compared against a threshold to determine whether maintenance is required.

When an anomaly score exceeds the threshold, a maintenance module initiates an appropriate response. This may include generating a maintenance schedule with designated inspection locations, times, and predicted remaining-useful-life estimates. Alternatively, or in addition, a machine-readable control signal may be issued to an autonomous inspection or repair device—such as an aerial drone or ground robot—capable of performing nondestructive evaluation or repair actions like material deposition or crack sealing.

The system optionally prioritizes multiple inspection or repair locations by computing a maintenance priority score that considers the severity of the anomaly, predicted lifespan, and cost-benefit factors.

A learning module continuously improves system accuracy by adjusting the threshold for anomaly detection and updating model weights based on feedback from subsequent inspections. Reinforcement learning techniques may be used to adapt both the decision threshold and the frequency of data collection to optimize performance and resource use.

The system stores all historical data—including feature vectors, anomaly scores, inspection results, and model parameters—in a memory-resident database. This data can be used to periodically retrain the surrogate model and neural-network classifier, particularly during periods of low processor activity.

The entire system may be hosted on a single processor or distributed across edge and cloud computing platforms. Sensor data may pass through an edge gateway for preprocessing before being sent to a cloud-based processor. A graphical user interface may present the user with a color-coded 3D heat-map of anomaly severity, maintenance schedules, and model outputs.

The platform can be implemented as a method, a system, or a set of computer-readable instructions. This ensures flexibility in deployment across software environments and hardware configurations. The resulting SHM architecture is real-time, self-learning, and fully autonomous—designed to meet the future demands of high-value infrastructure with predictive diagnostics and robotic maintenance.

DETAILED DESCRIPTION

Figure 1:
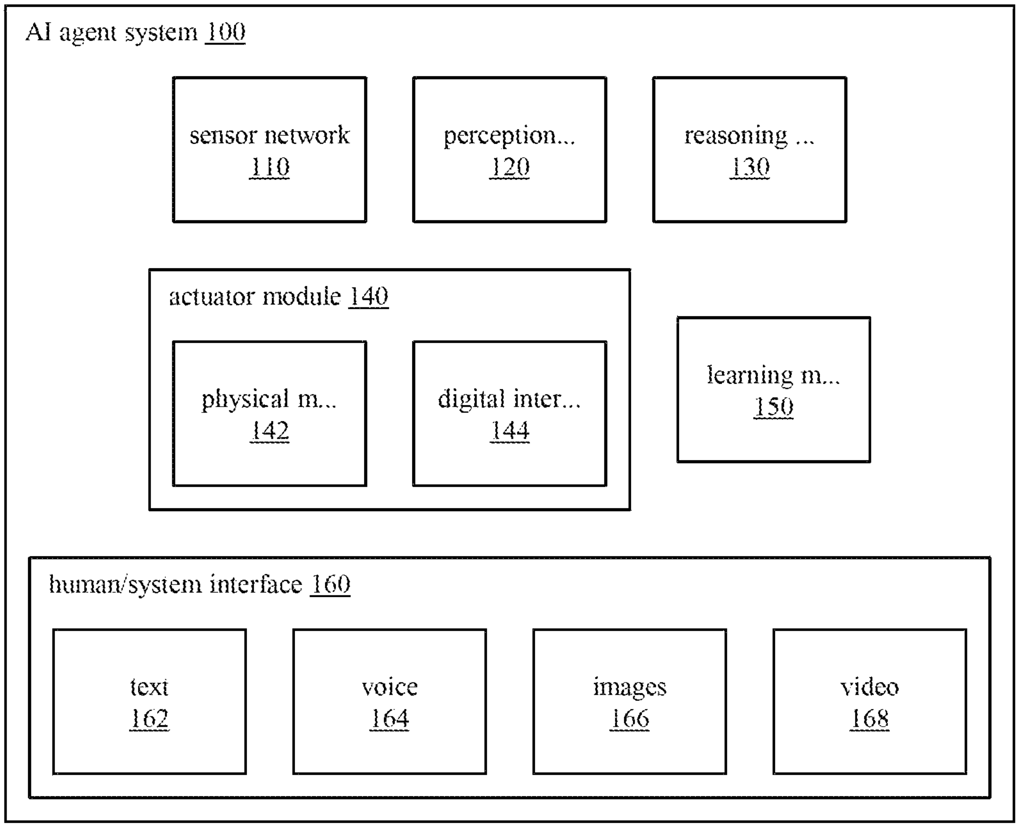
FIG. 1 is a block diagram illustrating an AI agent system, according to some embodiments of the present disclosure.

FIG. 1 is a block diagram that describes an AI agent system 100, according to some embodiments of the present disclosure. In some embodiments, the AI agent system 100 may include a sensor network 110 configured to collect data regarding relevant parameters of a subject or environment, a perception module 120 for preprocessing collected data to remove noise and extract relevant features, a reasoning module 130 employing machine learning algorithms to analyze preprocessed data and make decisions regarding the subject or environment, an actuator module 140 for executing actions based on decisions made by the reasoning module 130, and a learning module 150 for adapting and improving the AI agent's performance over time based on new data and feedback. The AI agent system 100 may also include a human/system interface 160 designed to facilitate user interaction with the AI agent system 100, enabling users to input queries and receive responses in multiple formats. The actuator module 140 may include physical movements 142 and digital interactions 144. The human/system interface 160 may include text 162, voice 164, images 166, and video 168.

Figure 2:
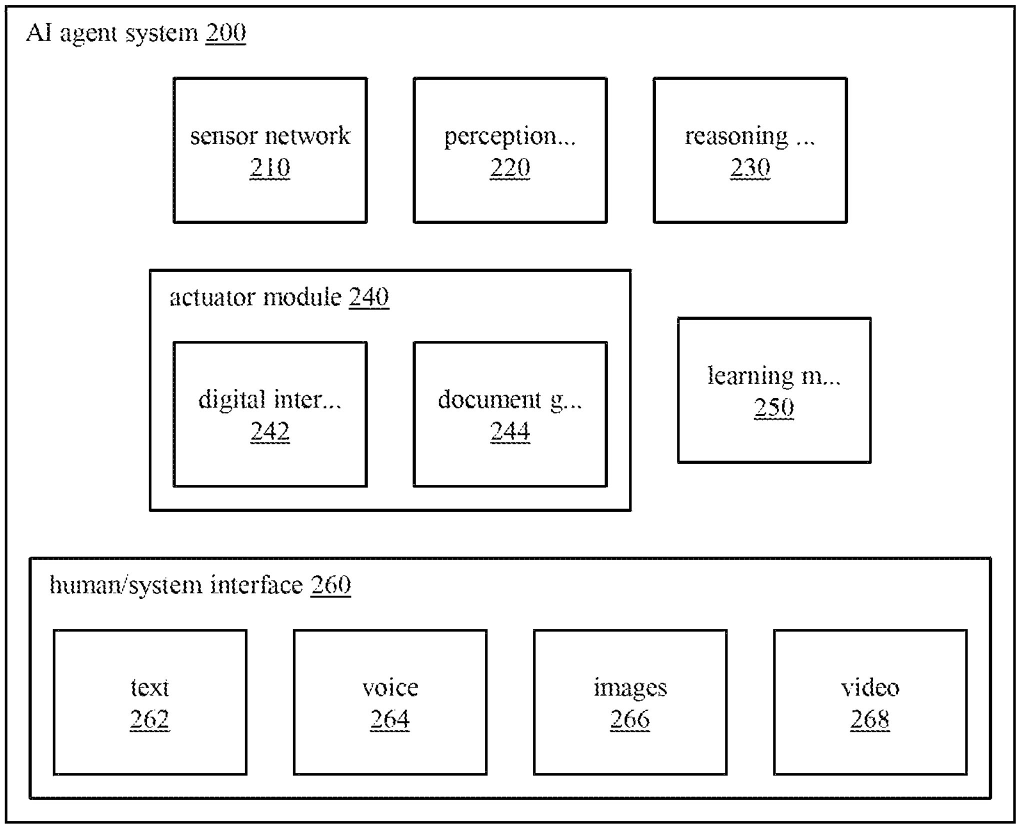
FIG. 2 is a block diagram illustrating an AI agent system, according to some embodiments of the present disclosure.

FIG. 2 is a block diagram that describes an AI agent system 200, according to some embodiments of the present disclosure. In some embodiments, the AI agent system 200 may include a sensor network 210 configured to collect data regarding patent-related parameters, a perception module 220 for preprocessing collected data to remove noise and extract relevant features, an actuator module 240 for executing actions based on decisions made by the reasoning module 230, and a learning module 250 for adapting and improving the AI agent's performance over time based on new data and feedback.

In some embodiments, the AI agent system 200 may also include a reasoning module 230 employing machine learning algorithms to analyze preprocessed data and make decisions regarding patent drafting, prior art searches, patent prosecution, and/or appeals. The AI agent system 200 may also include a human/system interface 260 designed to facilitate user interaction with the AI agent system 200, enabling users to input queries and receive responses in multiple formats. The actuator module 240 may include digital interactions 242 and document generation 244. The human/system interface 260 may include text 262, voice 264, images 266, and video 268.

Figure 3:
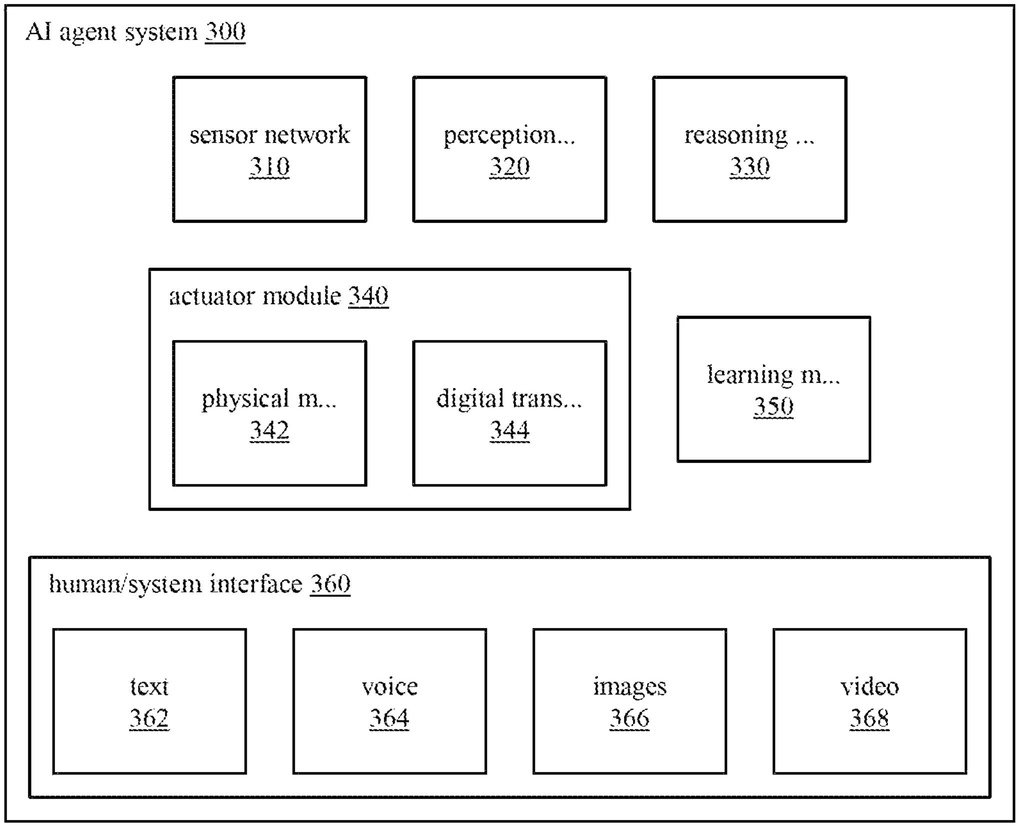
FIG. 3 is a block diagram illustrating an AI agent system, according to some embodiments of the present disclosure.

FIG. 3 is a block diagram that describes an AI agent system 300, according to some embodiments of the present disclosure. In some embodiments, the AI agent system 300 may include a sensor network 310 configured to collect data regarding structural health parameters, a perception module 320 for preprocessing collected data to remove noise and extract relevant features, an actuator module 340 for executing actions based on decisions made by the reasoning module 330, and a learning module 350 for adapting and improving the AI agent's performance over time based on new data and feedback.

In some embodiments, the AI agent system 300 may also include a reasoning module 330 employing machine learning algorithms to analyze preprocessed data and make decisions regarding structural integrity, anomaly detection, and/or maintenance scheduling. The AI agent system 300 may also include a human/system interface 360 designed to facilitate user interaction with the AI agent system 300, enabling users to input queries and receive responses in multiple formats. The actuator module 340 may include physical movements 342 and digital transactions 344. The human/system interface 360 may include text 362, voice 364, images 366, and video 368.

Figure 4:
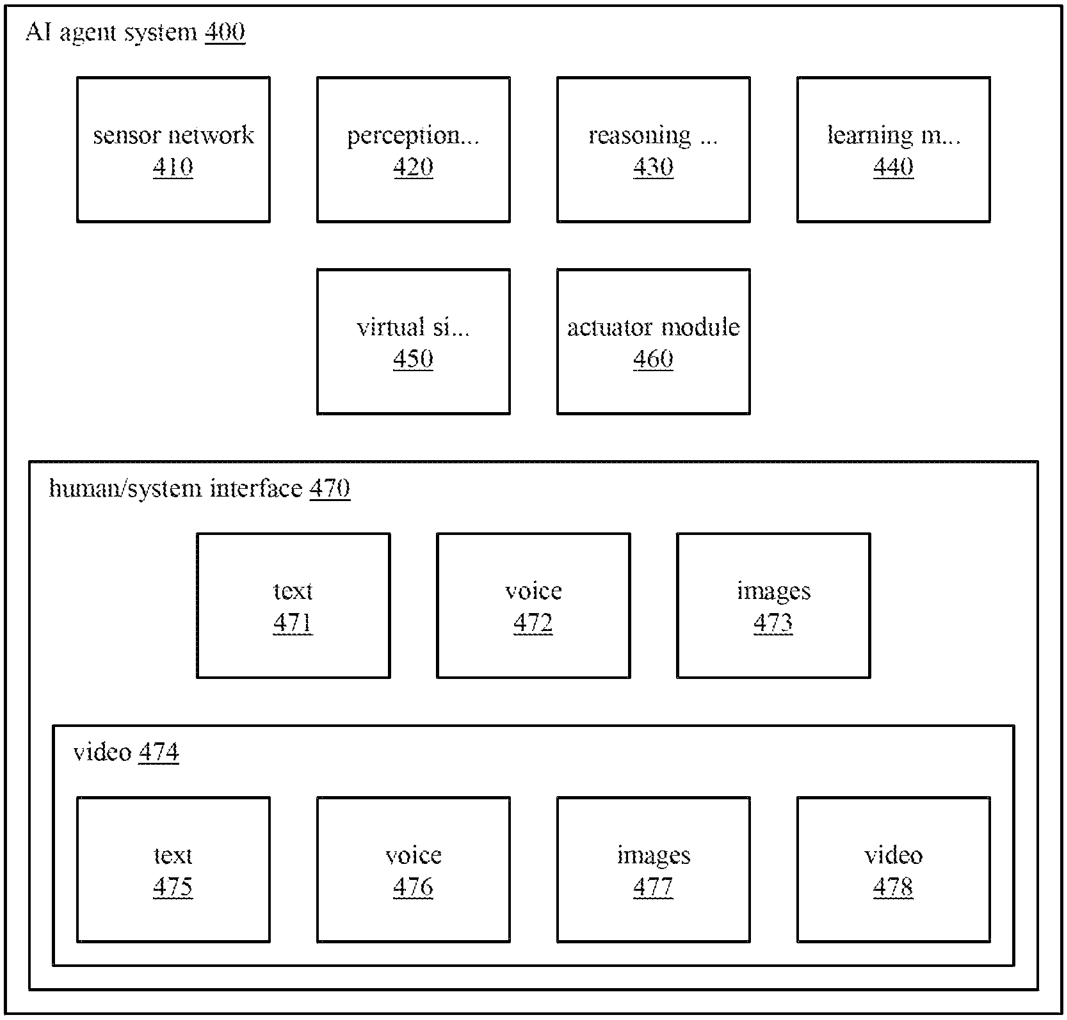
FIG. 4 is a block diagram illustrating an AI agent system, according to some embodiments of the present disclosure.

FIG. 4 is a block diagram that describes an AI agent system 400, according to some embodiments of the present disclosure. In some embodiments, the AI agent system 400 may include a sensor network 410 configured to collect real-time data from physical structures, a perception module 420 for preprocessing the collected real-time data to remove noise and extract relevant features, a virtual simulation module 450 for creating and updating models of structures in a virtual environment based on the real-time data, an actuator module 460 for implementing adjustments in the real-world structures based on insights gained from virtual simulations, and a learning module 440 for continuously adapting and improving the accuracy of both virtual simulations and real-world actions based on new data and feedback.

In some embodiments, the AI agent system 400 may also include a reasoning module 430 employing machine learning algorithms to analyze discrepancies between virtual simulations and real-world data, and to refine the virtual models accordingly. The AI agent system 400 may also include a human/system interface 470 designed to facilitate user interaction with the AI agent system 400, enabling users to input queries and receive responses in multiple formats. The human/system interface 470 may include text 471, voice 472, images 473, and video 474. The video 474 may include text 475, voice 476, images 477, and video 478. The human/system interface 470 may support multimodal input and output.

Figure 5:
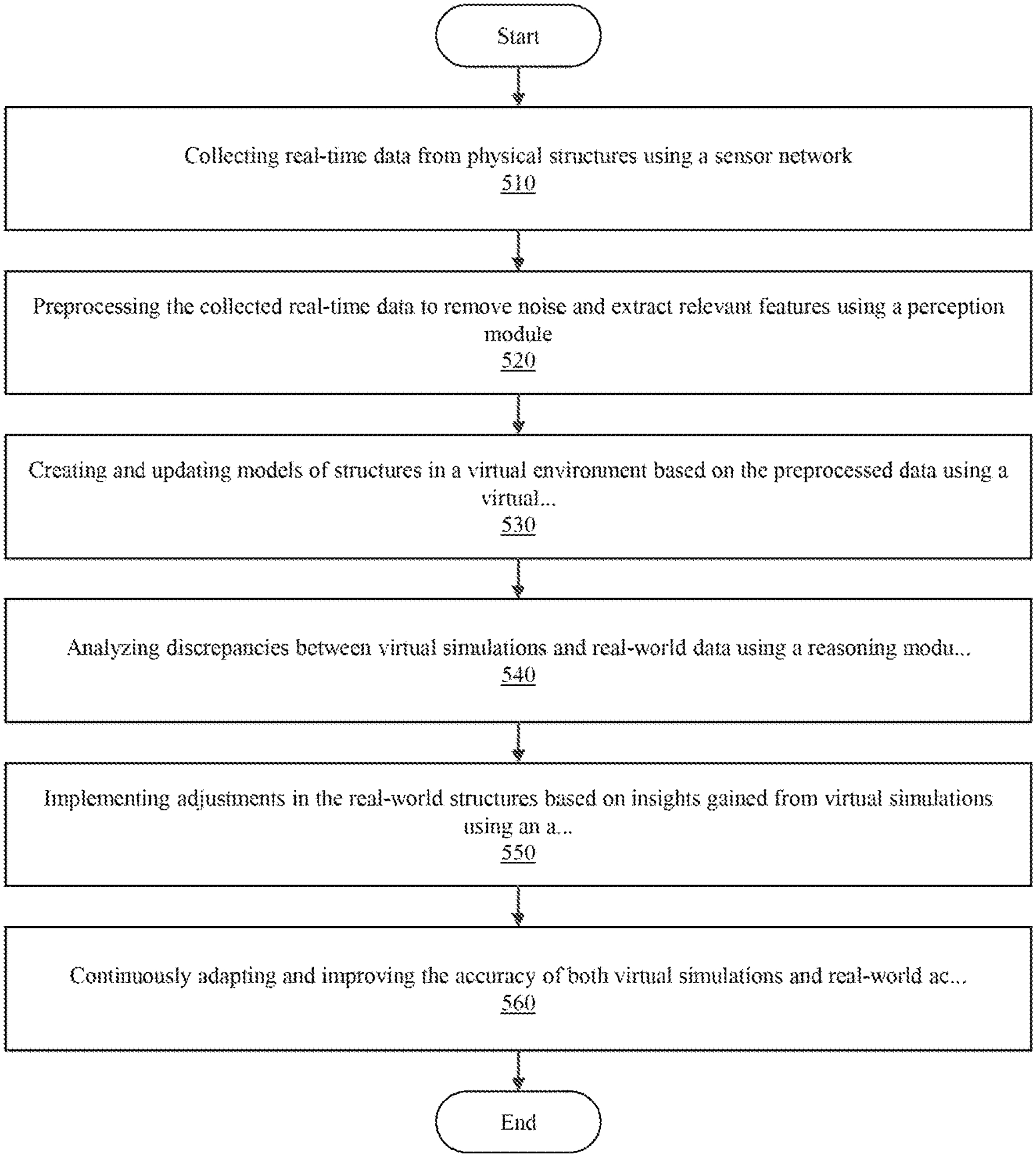
FIG. 5 is a flowchart illustrating a method for improving simulated systems to more closely model real-world structures, according to some embodiments of the present disclosure.

FIG. 5 is a flowchart that describes a method for improving simulated systems to more closely model real-world structures, according to some embodiments of the present disclosure. In some embodiments, at 510, the method may include collecting real-time data from physical structures using a sensor network. At 520, the method may include preprocessing the collected real-time data to remove noise and extract relevant features using a perception module. At 530, the method may include creating and updating models of structures in a virtual environment based on the preprocessed data using a virtual simulation module.

In some embodiments, at 540, the method may include analyzing discrepancies between virtual simulations and real-world data using a reasoning module employing machine learning algorithms. At 550, the method may include implementing adjustments in the real-world structures based on insights gained from virtual simulations using an actuator module. At 560, the method may include continuously adapting and improving the accuracy of both virtual simulations and real-world actions based on new data and feedback using a learning module.

Figure 6:
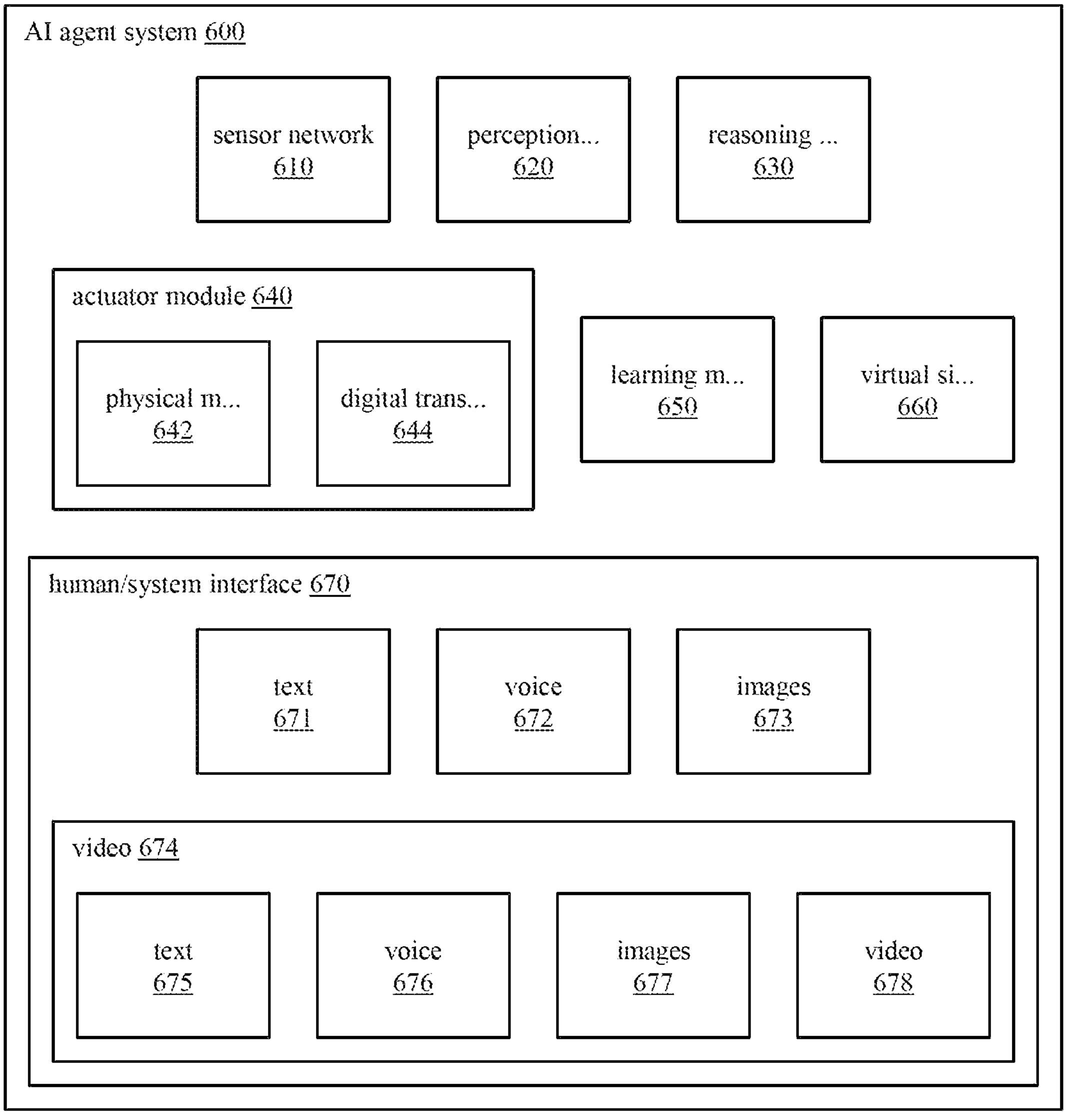
FIG. 6 is a block diagram illustrating an AI agent system, according to some embodiments of the present disclosure.

FIG. 6 is a block diagram that describes an AI agent system 600, according to some embodiments of the present disclosure. In some embodiments, the AI agent system 600 may include a sensor network 610 configured to collect data regarding structural parameters, a perception module 620 for preprocessing collected data to remove noise and extract relevant features, an actuator module 640 for executing actions based on decisions made by the reasoning module 630, a learning module 650 for adapting and improving the AI agent's performance over time based on new data and feedback, and a virtual simulation module 660 for creating and updating models of structures in a virtual environment based on real-time data.

In some embodiments, the AI agent system 600 may also include a reasoning module 630 employing machine learning algorithms to analyze preprocessed data and make decisions regarding structural integrity, design optimization, and/or simulation adjustments. The AI agent system 600 may also include a human/system interface 670 designed to facilitate user interaction with the AI agent system 600, enabling users to input queries and receive responses in multiple formats. The actuator module 640 may include physical movements 642 and digital transactions 644. The human/system interface 670 may include text 671, voice 672, images 673, and video 674. The video 674 may include text 675, voice 676, images 677, and video 678. The human/system interface 670 may support multimodal input and output.

Figure 7:
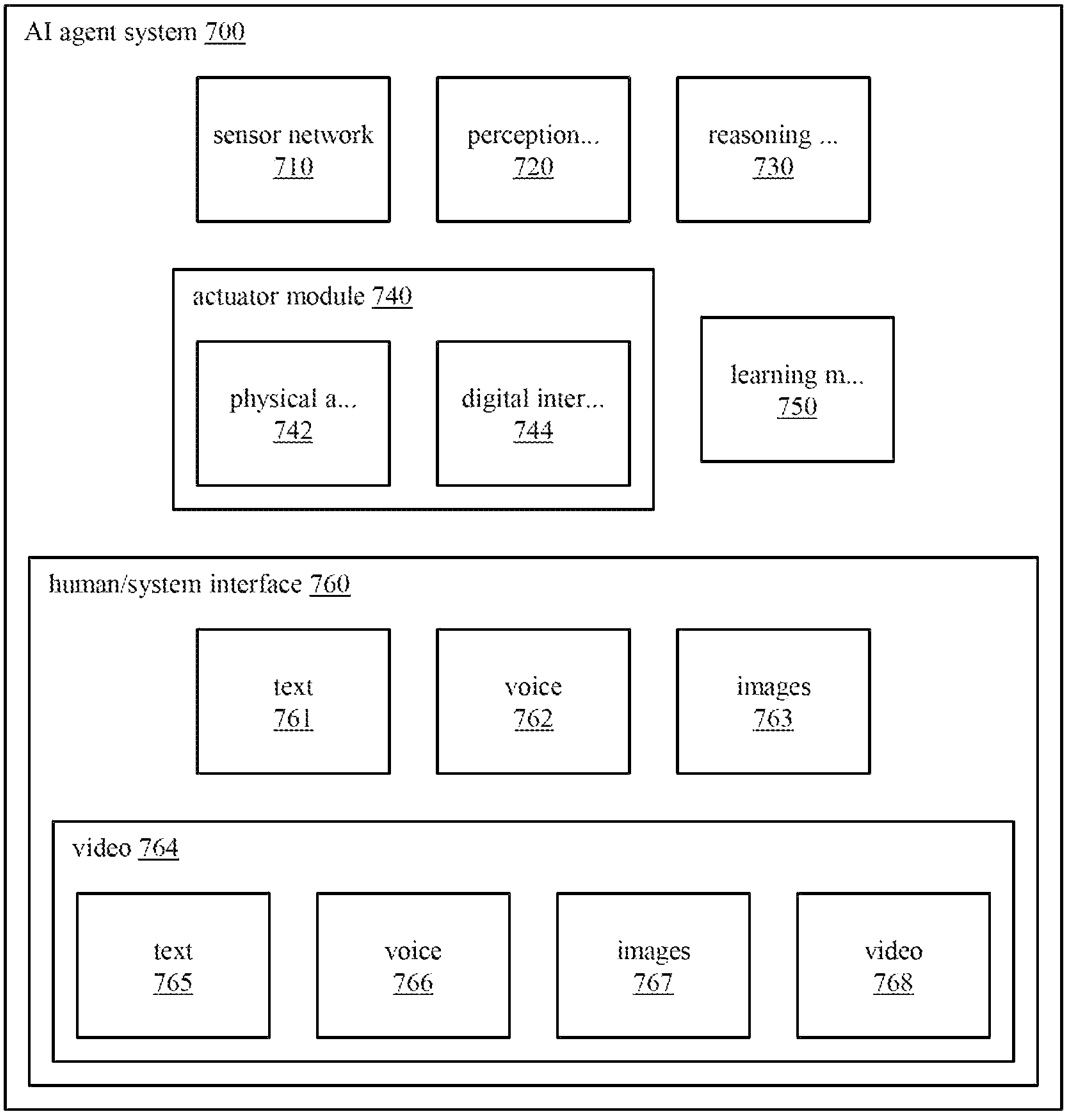
FIG. 7 is a block diagram illustrating an AI agent system, according to some embodiments of the present disclosure.

FIG. 7 is a block diagram that describes an AI agent system 700, according to some embodiments of the present disclosure. In some embodiments, the AI agent system 700 may include a sensor network 710 configured to collect data from experiments, a perception module 720 for preprocessing collected data to remove noise and extract relevant features, an actuator module 740 for executing actions based on decisions made by the reasoning module 730, and a learning module 750 for adapting and improving the AI agent's performance over time based on new data and feedback.

In some embodiments, the AI agent system 700 may also include a reasoning module 730 employing machine learning algorithms to analyze preprocessed data and make decisions regarding experiment design, data analysis, and/or hypothesis testing. The AI agent system 700 may also include a human/system interface 760 designed to facilitate user interaction with the AI agent system 700, enabling users to input queries and receive responses in multiple formats. The actuator module 740 may include physical adjustments 742 and digital interactions 744. The human/system interface 760 may include text 761, voice 762, images 763, and video 764. The video 764 may include text 765, voice 766, images 767, and video 768. The human/system interface 760 may support multimodal input and output.

Figure 8:
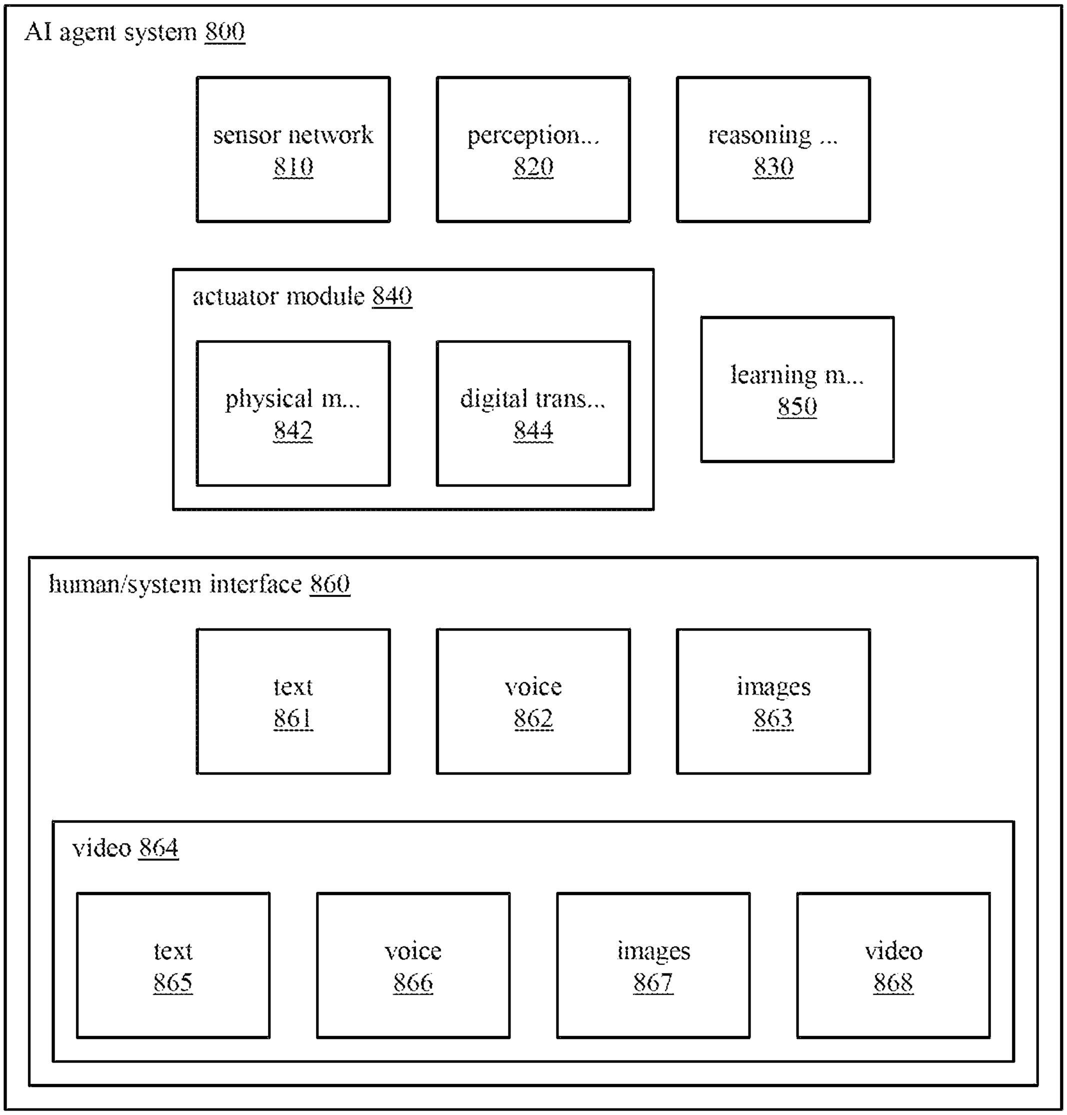
FIG. 8 is a block diagram illustrating an AI agent system, according to some embodiments of the present disclosure.

FIG. 8 is a block diagram that describes an AI agent system 800, according to some embodiments of the present disclosure. In some embodiments, the AI agent system 800 may include a sensor network 810 configured to collect data regarding electro-mechanical parameters, a perception module 820 for preprocessing collected data to remove noise and extract relevant features, an actuator module 840 for executing actions based on decisions made by the reasoning module 830, and a learning module 850 for adapting and improving the AI agent's performance over time based on new data and feedback.

In some embodiments, the AI agent system 800 may also include a reasoning module 830 employing machine learning algorithms to analyze preprocessed data and make decisions regarding design optimization, performance analysis, and/or maintenance scheduling. The AI agent system 800 may also include a human/system interface 860 designed to facilitate user interaction with the AI agent system 800, enabling users to input queries and receive responses in multiple formats. The actuator module 840 may include physical movements 842 and digital transactions 844. The human/system interface 860 may include text 861, voice 862, images 863, and video 864. The video 864 may include text 865, voice 866, images 867, and video 868. The human/system interface 860 may support multimodal input and output.

Figure 9:
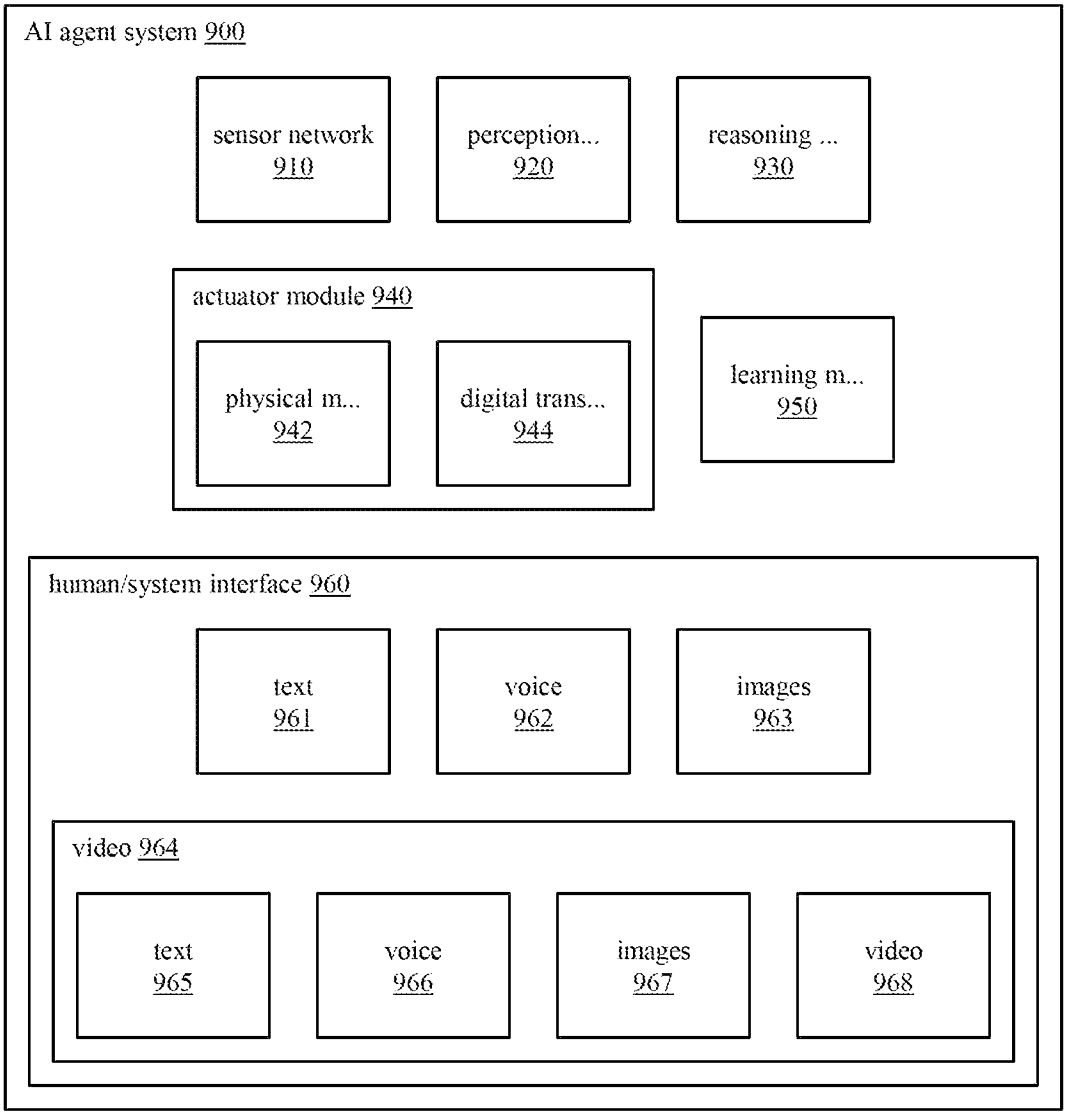
FIG. 9 is a block diagram illustrating an AI agent system, according to some embodiments of the present disclosure.

FIG. 9 is a block diagram that describes an AI agent system 900, according to some embodiments of the present disclosure. In some embodiments, the AI agent system 900 may include a sensor network 910 configured to collect data regarding airframe parameters, a perception module 920 for preprocessing collected data to remove noise and extract relevant features, an actuator module 940 for executing actions based on decisions made by the reasoning module

930, and a learning module 950 for adapting and improving the AI agent's performance over time based on new data and feedback.

In some embodiments, the AI agent system 900 may also include a reasoning module 930 employing machine learning algorithms to analyze preprocessed data and make decisions regarding design optimization, performance analysis, and/or maintenance scheduling. The AI agent system 900 may also include a human/system interface 960 designed to facilitate user interaction with the AI agent system 900, enabling users to input queries and receive responses in multiple formats. The actuator module 940 may include physical movements 942 and digital transactions 944. The human/system interface 960 may include text 961, voice 962, images 963, and video 964. The video 964 may include text 965, voice 966, images 967, and video 968. The human/system interface 960 may support multimodal input and output.

Figure 10:
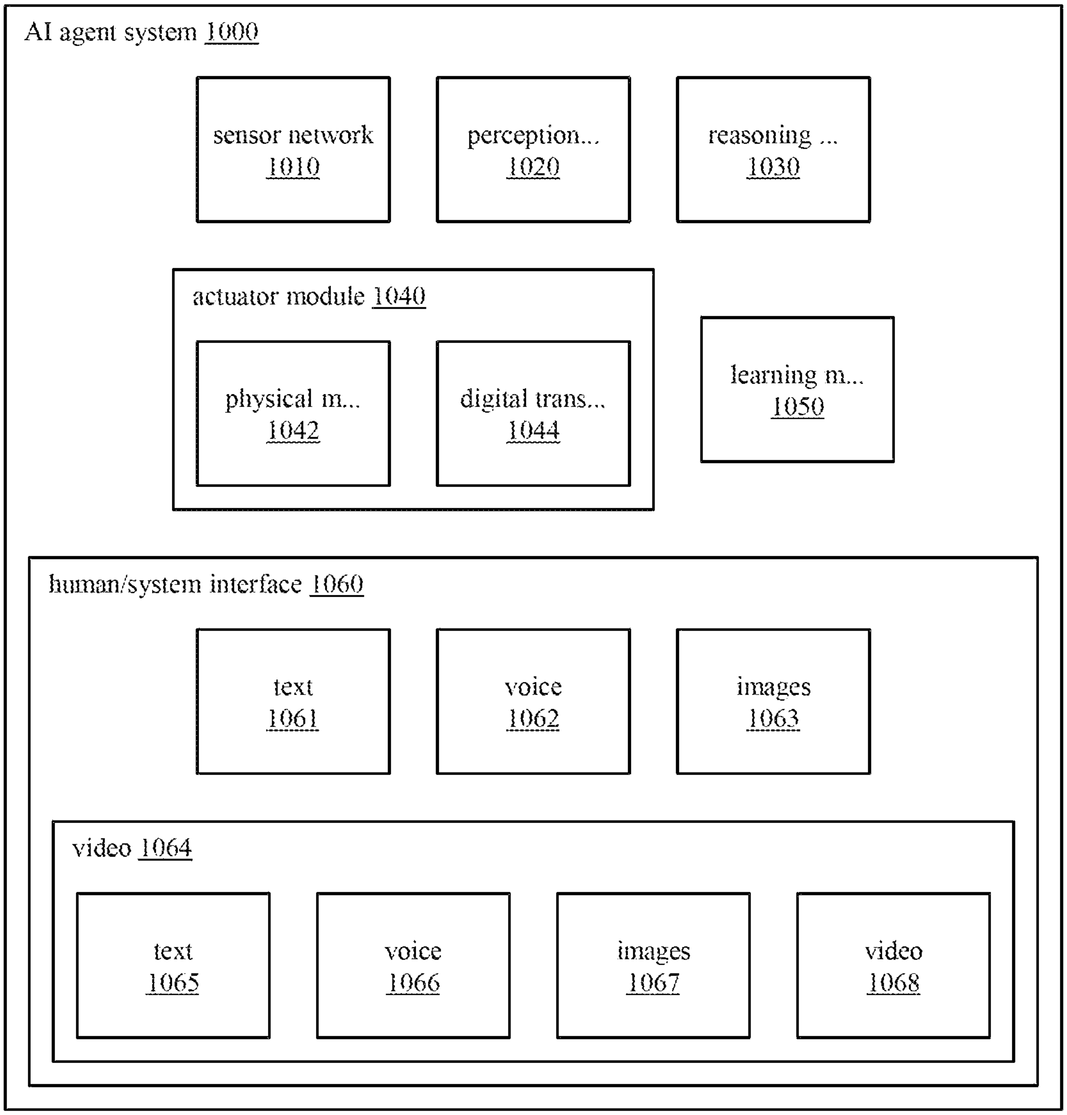
FIG. 10 is a block diagram illustrating an AI agent system, according to some embodiments of the present disclosure.

FIG. 10 is a block diagram that describes an AI agent system 1000, according to some embodiments of the present disclosure. In some embodiments, the AI agent system 1000 may include a sensor network 1010 configured to collect data regarding automobile frame parameters, a perception module 1020 for preprocessing collected data to remove noise and extract relevant features, an actuator module 1040 for executing actions based on decisions made by the reasoning module 1030, and a learning module 1050 for adapting and improving the AI agent's performance over time based on new data and feedback.

In some embodiments, the AI agent system 1000 may also include a reasoning module 1030 employing machine learning algorithms to analyze preprocessed data and make decisions regarding design optimization, performance analysis, and/or maintenance scheduling. The AI agent system 1000 may also include a human/system interface 1060 designed to facilitate user interaction with the AI agent system 1000, enabling users to input queries and receive responses in multiple formats. The actuator module 1040 may include physical movements 1042 and digital transactions 1044. The human/system interface 1060 may include text 1061, voice 1062, images 1063, and video 1064. The video 1064 may include text 1065, voice 1066, images 1067, and video 1068. The human/system interface 1060 may support multimodal input and output.

Figure 11:
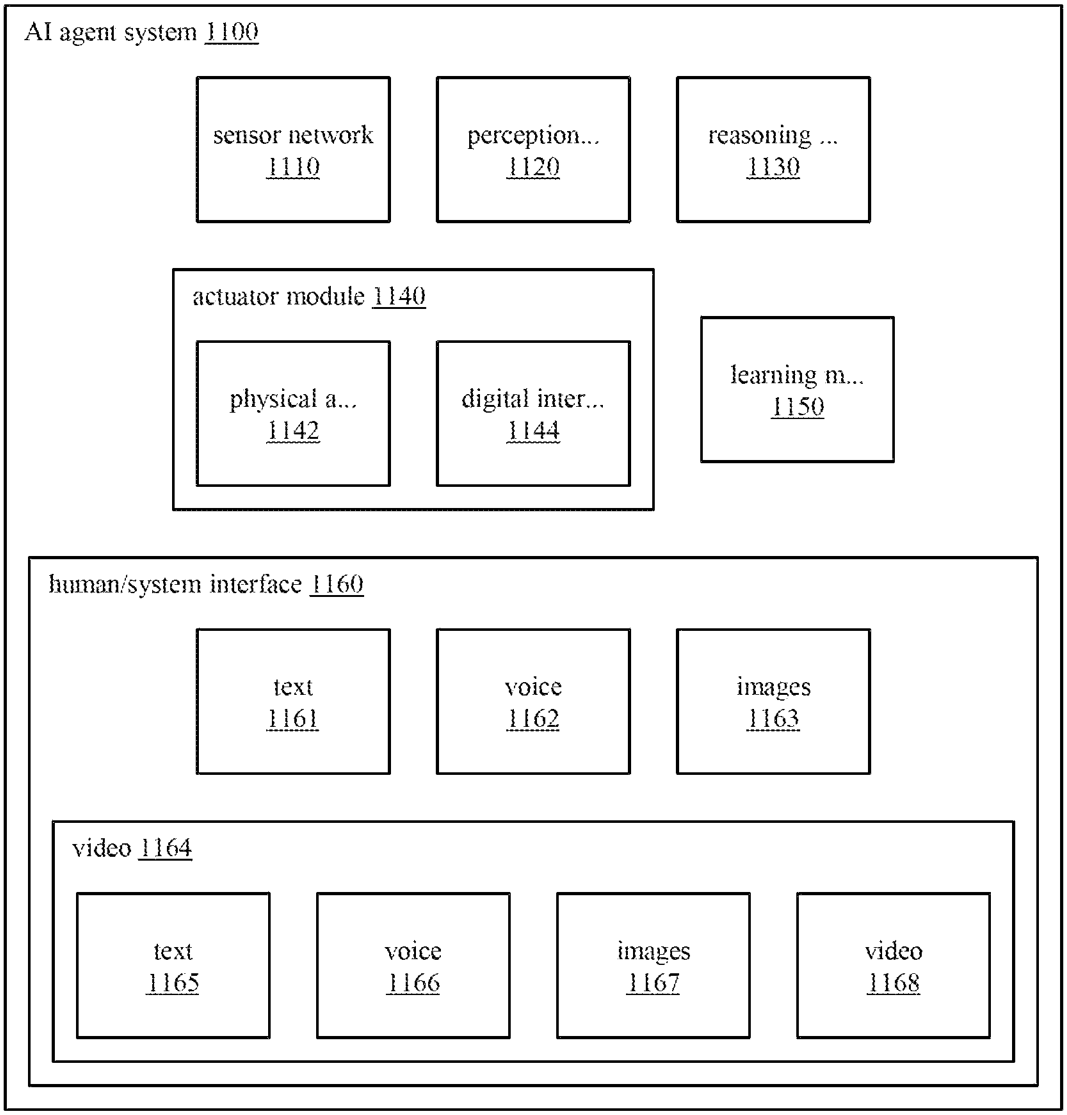
FIG. 11 is a block diagram illustrating an AI agent system, according to some embodiments of the present disclosure.

FIG. 11 is a block diagram that describes an AI agent system 1100, according to some embodiments of the present disclosure. In some embodiments, the AI agent system 1100 may include a sensor network 1110 configured to collect data regarding building parameters, a perception module 1120 for preprocessing collected data to remove noise and extract relevant features, an actuator module 1140 for executing actions based on decisions made by the reasoning module 1130, and a learning module 1150 for adapting and improving the AI agent's performance over time based on new data and feedback.

In some embodiments, the AI agent system 1100 may also include a reasoning module 1130 employing machine learning algorithms to analyze preprocessed data and make decisions regarding HVAC optimization, lighting control, and/or security management. The AI agent system 1100 may also include a human/system interface 1160 designed to facilitate user interaction with the AI agent system 1100, enabling users to input queries and receive responses in multiple formats. The actuator module 1140 may include physical adjustments 1142 and digital interactions 1144. The human/system interface 1160 may include text 1161, voice 1162, images 1163, and video 1164. The video 1164 may include text 1165, voice 1166, images 1167, and video 1168. The human/system interface 1160 may support multimodal input and output.

Figure 12:
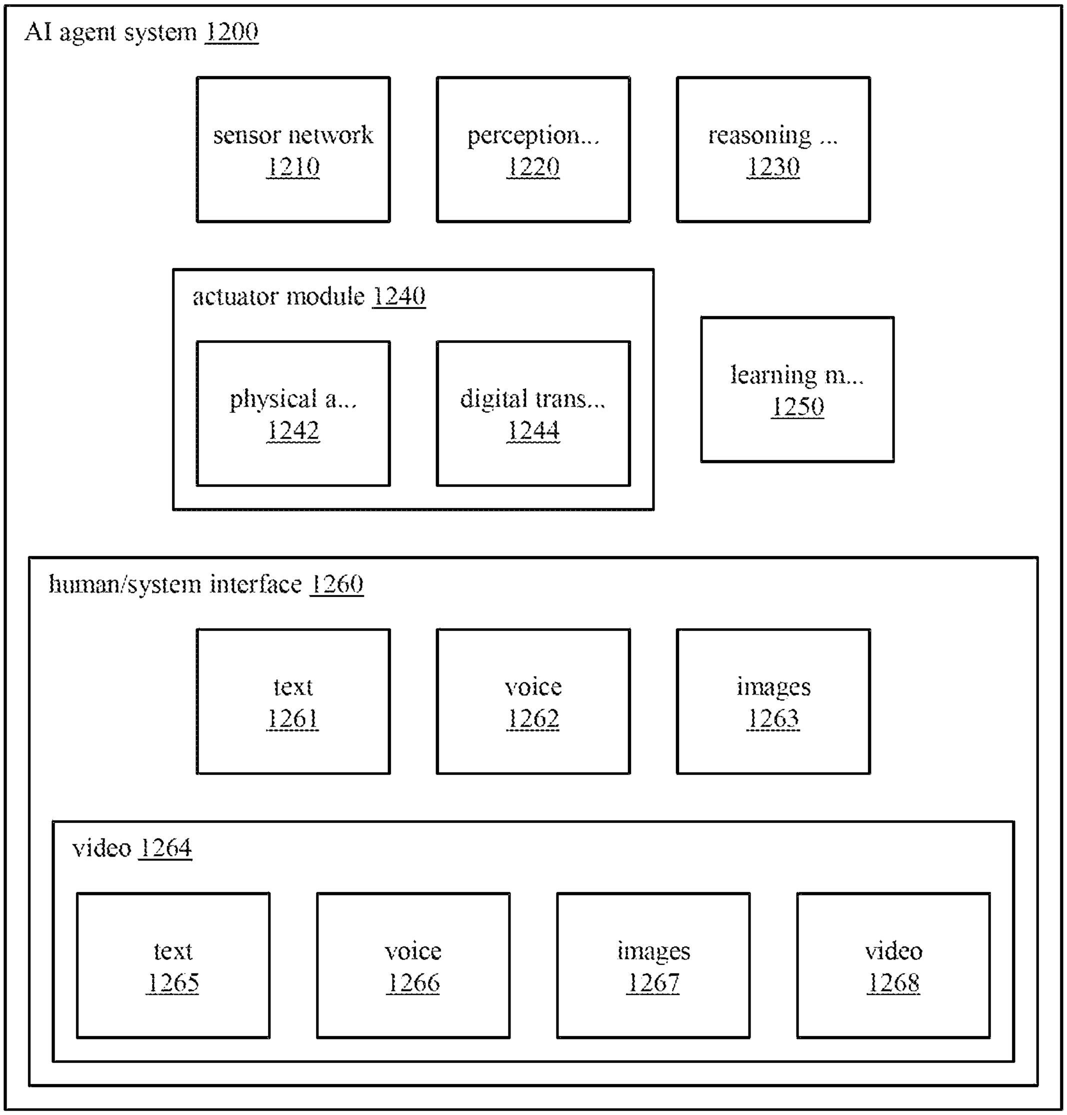
FIG. 12 is a block diagram illustrating an AI agent system, according to some embodiments of the present disclosure.

FIG. 12 is a block diagram that describes an AI agent system 1200, according to some embodiments of the present disclosure. In some embodiments, the AI agent system 1200 may include a sensor network 1210 configured to collect data regarding structural parameters, a perception module 1220 for preprocessing collected data to remove noise and extract relevant features, an actuator module 1240 for executing actions based on decisions made by the reasoning module 1230, and a learning module 1250 for adapting and improving the AI agent's performance over time based on new data and feedback.

In some embodiments, the AI agent system 1200 may also include a reasoning module 1230 employing machine learning algorithms to analyze preprocessed data and make decisions regarding design optimization, structural analysis, and/or maintenance scheduling. The AI agent system 1200 may also include a human/system interface 1260 designed to facilitate user interaction with the AI agent system 1200, enabling users to input queries and receive responses in multiple formats. The actuator module 1240 may include physical adjustments 1242 and digital transactions 1244. The human/system interface 1260 may include text 1261, voice 1262, images 1263, and video 1264. The video 1264 may include text 1265, voice 1266, images 1267, and video 1268. The human/system interface 1260 may support multimodal input and output.

Figure 13:
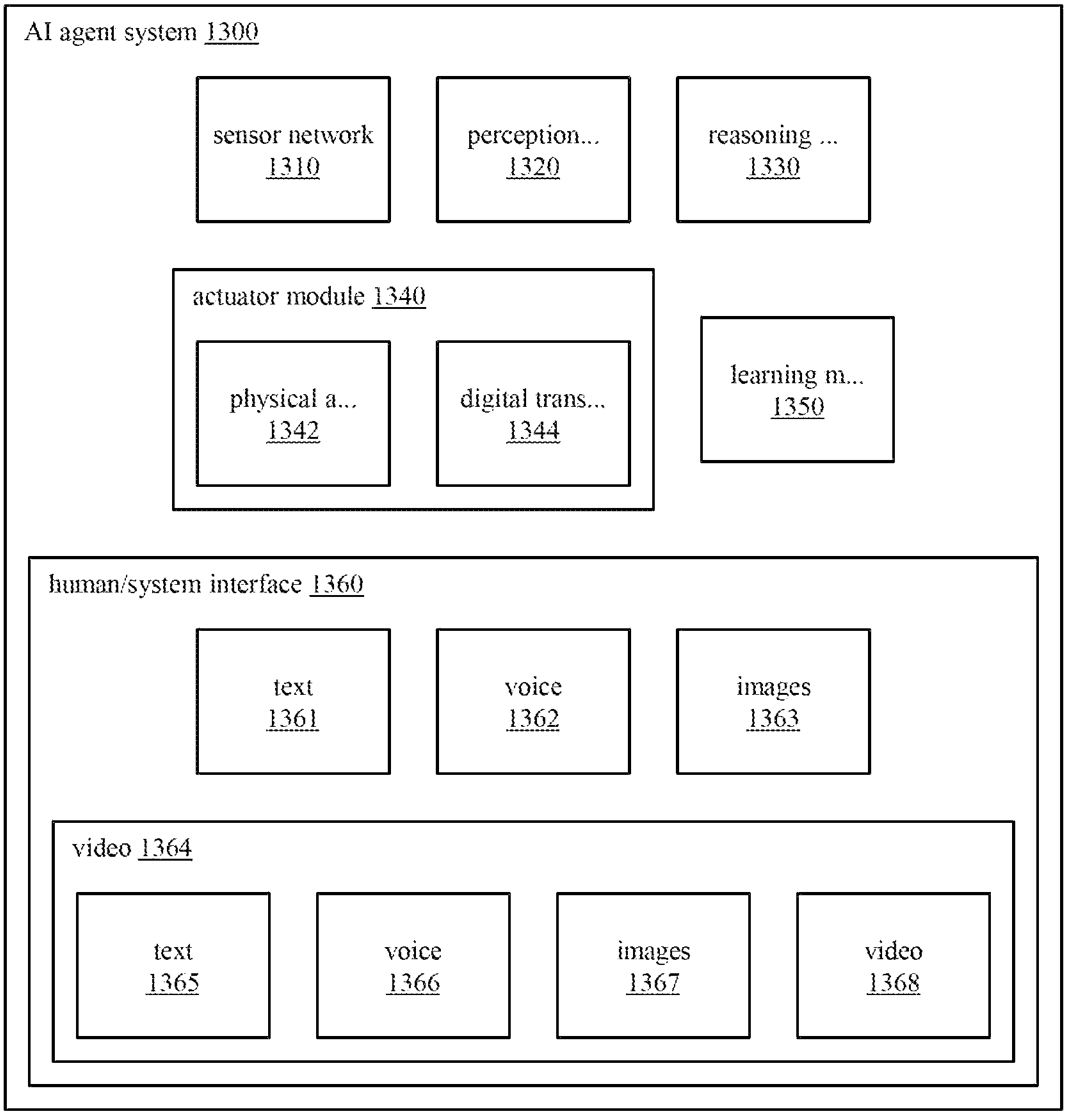
FIG. 13 is a block diagram illustrating an AI agent system, according to some embodiments of the present disclosure.

FIG. 13 is a block diagram that describes an AI agent system 1300, according to some embodiments of the present disclosure. In some embodiments, the AI agent system 1300 may include a sensor network 1310 configured to collect data regarding structural parameters, a perception module 1320 for preprocessing collected data to remove noise and extract relevant features, an actuator module 1340 for executing actions based on decisions made by the reasoning module 1330, and a learning module 1350 for adapting and improving the AI agent's performance over time based on new data and feedback.

In some embodiments, the AI agent system 1300 may also include a reasoning module 1330 employing machine learning algorithms to analyze preprocessed data and make decisions regarding design optimization, structural analysis, and/or maintenance scheduling. The AI agent system 1300 may also include a human/system interface 1360 designed to facilitate user interaction with the AI agent system 1300, enabling users to input queries and receive responses in multiple formats. The actuator module 1340 may include physical adjustments 1342 and digital transactions 1344. The human/system interface 1360 may include text 1361, voice 1362, images 1363, and video 1364. The video 1364 may include text 1365, voice 1366, images 1367, and video 1368. The human/system interface 1360 may support multimodal input and output.

Figure 14:
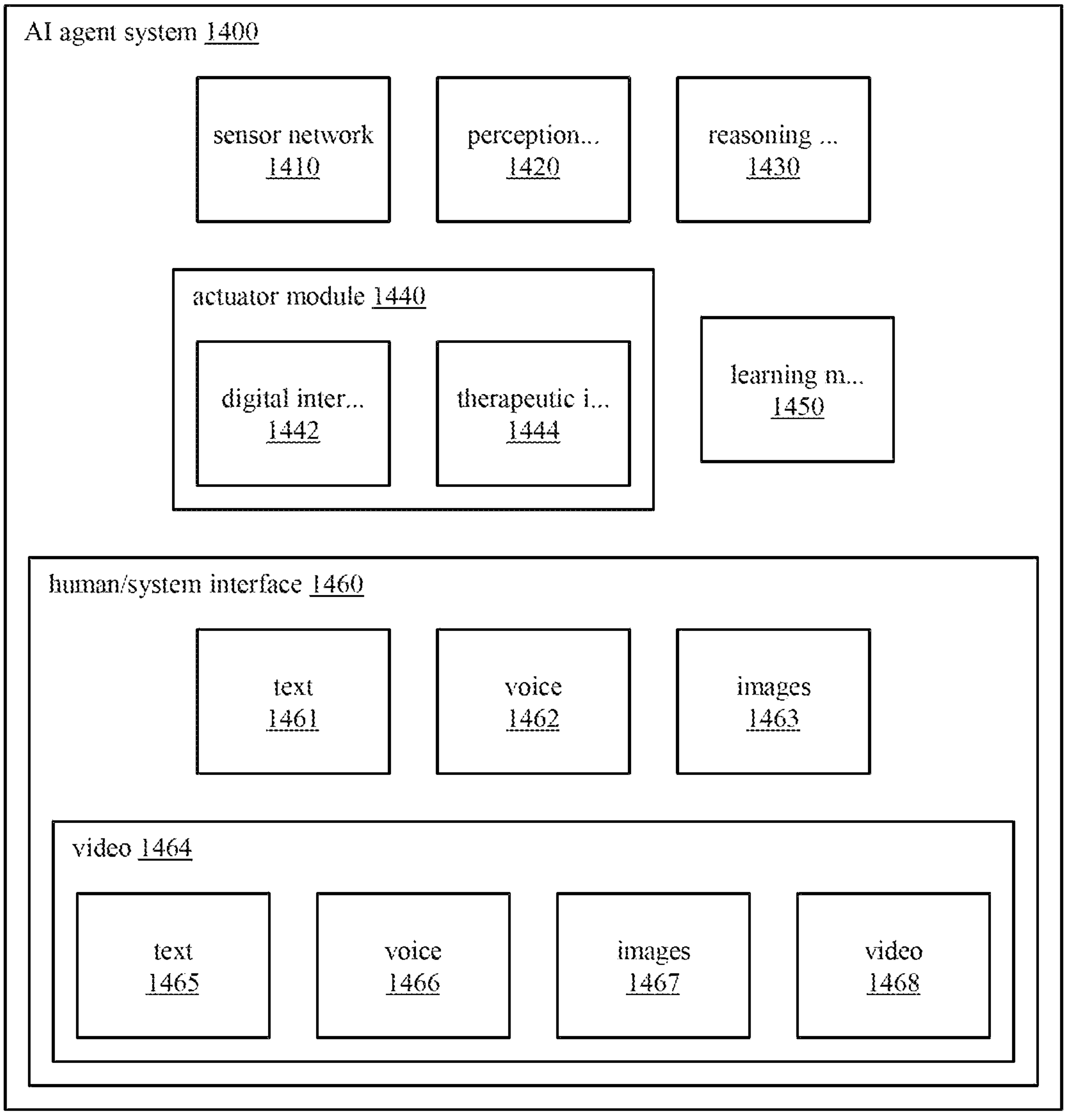
FIG. 14 is a block diagram illustrating an AI agent system, according to some embodiments of the present disclosure.

FIG. 14 is a block diagram that describes an AI agent system 1400, according to some embodiments of the present disclosure. In some embodiments, the AI agent system 1400 may include a sensor network 1410 configured to collect data regarding patient health parameters, a perception module 1420 for preprocessing collected data to remove noise and extract relevant features, an actuator module 1440 for executing actions based on decisions made by the reasoning module 1430, and a learning module 1450 for adapting and improving the AI agent's performance over time based on new data and feedback.

In some embodiments, the AI agent system 1400 may also include a reasoning module 1430 employing machine learning algorithms to analyze preprocessed data and make decisions regarding mental health diagnosis, treatment plans, and/or patient engagement. The AI agent system 1400 may also include a human/system interface 1460 designed to facilitate user interaction with the AI agent system 1400, enabling users to input queries and receive responses in multiple formats. The actuator module 1440 may include digital interactions 1442 and therapeutic interventions 1444. The human/system interface 1460 may include text 1461, voice 1462, images 1463, and video 1464. The video 1464 may include text 1465, voice 1466, images 1467, and video 1468. The human/system interface 1460 may support multimodal input and output.

Figure 15:
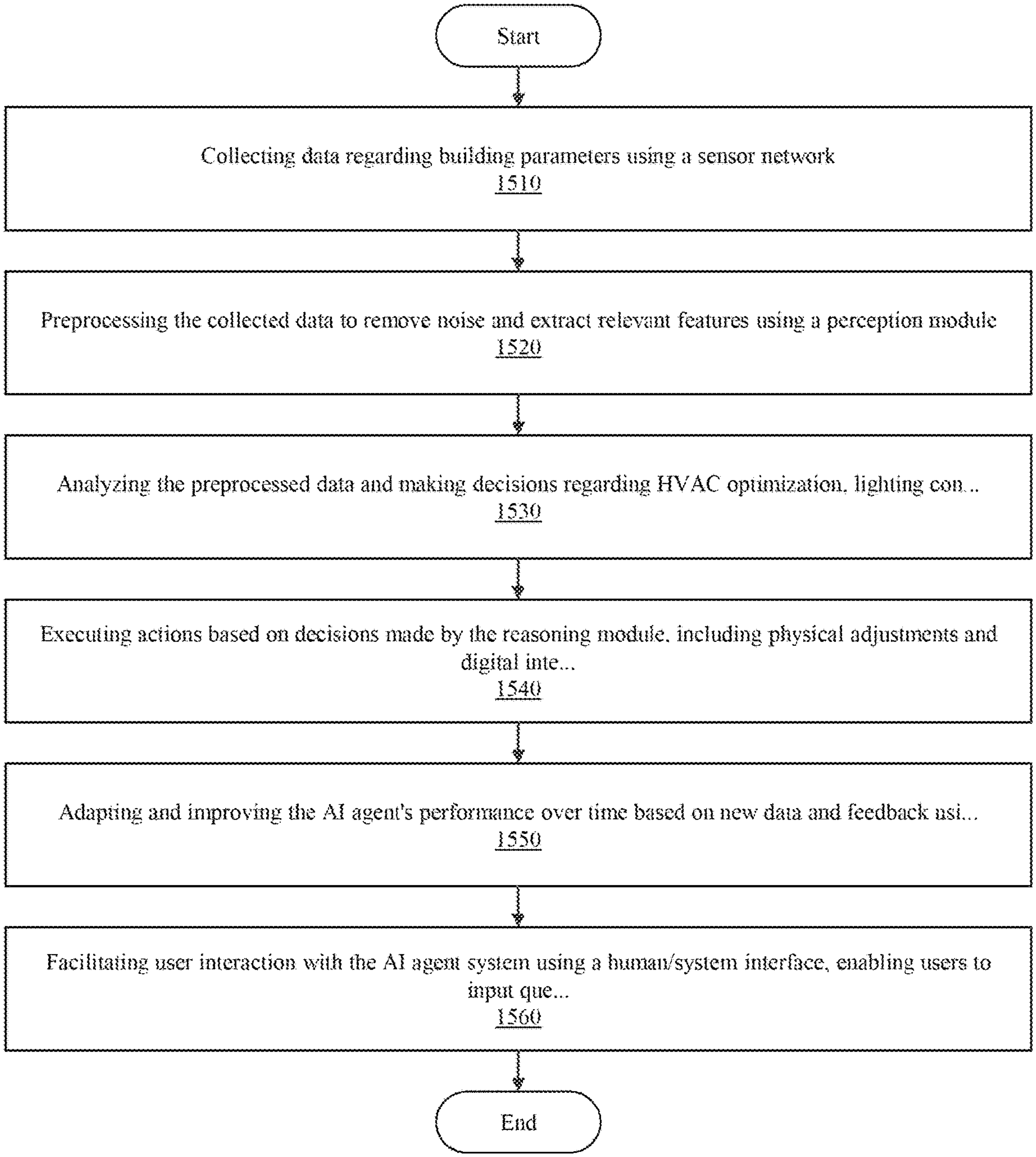
FIG. 15 is a flowchart illustrating a method, according to some embodiments of the present disclosure.

FIG. 15 is a flowchart that describes a method, according to some embodiments of the present disclosure. In some embodiments, at 1510, the method may include collecting data regarding building parameters using a sensor network. At 1520, the method may include preprocessing the collected data to remove noise and extract relevant features using a perception module. At 1530, the method may include analyzing the preprocessed data and making decisions regarding HVAC optimization, lighting control, and/or security management using a reasoning module employing machine learning algorithms.

In some embodiments, at 1540, the method may include executing actions based on decisions made by the reasoning module, including physical adjustments and digital interactions using an actuator module. At 1550, the method may include adapting and improving the AI agent's performance over time based on new data and feedback using a learning module. At 1560, the method may include facilitating user interaction with the AI agent system using a human/system interface, enabling users to input queries and receive responses in multiple formats including text, voice, images, and video. The human/system interface may support multimodal input and output, including text, voice, images, and video.

Figure 16:
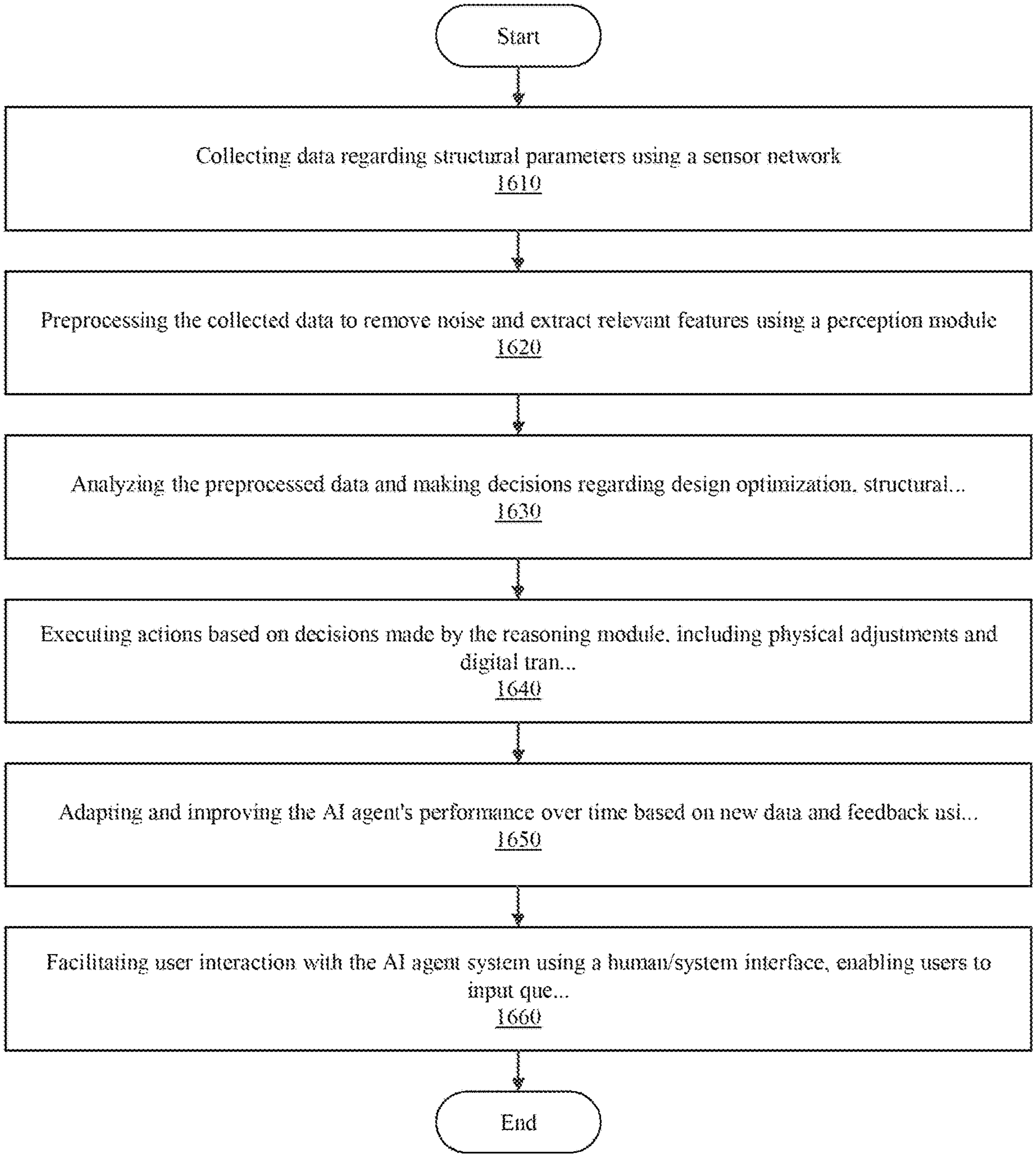
FIG. 16 is a flowchart illustrating a method, according to some embodiments of the present disclosure.

FIG. 16 is a flowchart that describes a method, according to some embodiments of the present disclosure. In some embodiments, at 1610, the method may include collecting data regarding structural parameters using a sensor network. At 1620, the method may include preprocessing the collected data to remove noise and extract relevant features using a perception module. At 1630, the method may include analyzing the preprocessed data and making decisions regarding design optimization, structural analysis, and/or maintenance scheduling using a reasoning module employing machine learning algorithms.

In some embodiments, at 1640, the method may include executing actions based on decisions made by the reasoning module, including physical adjustments and digital transactions using an actuator module. At 1650, the method may include adapting and improving the AI agent's performance over time based on new data and feedback using a learning module. At 1660, the method may include facilitating user interaction with the AI agent system using a human/system interface, enabling users to input queries and receive responses in multiple formats including text, voice, images, and video. The human/system interface may support multimodal input and output, including text, voice, images, and video.

Figure 17:
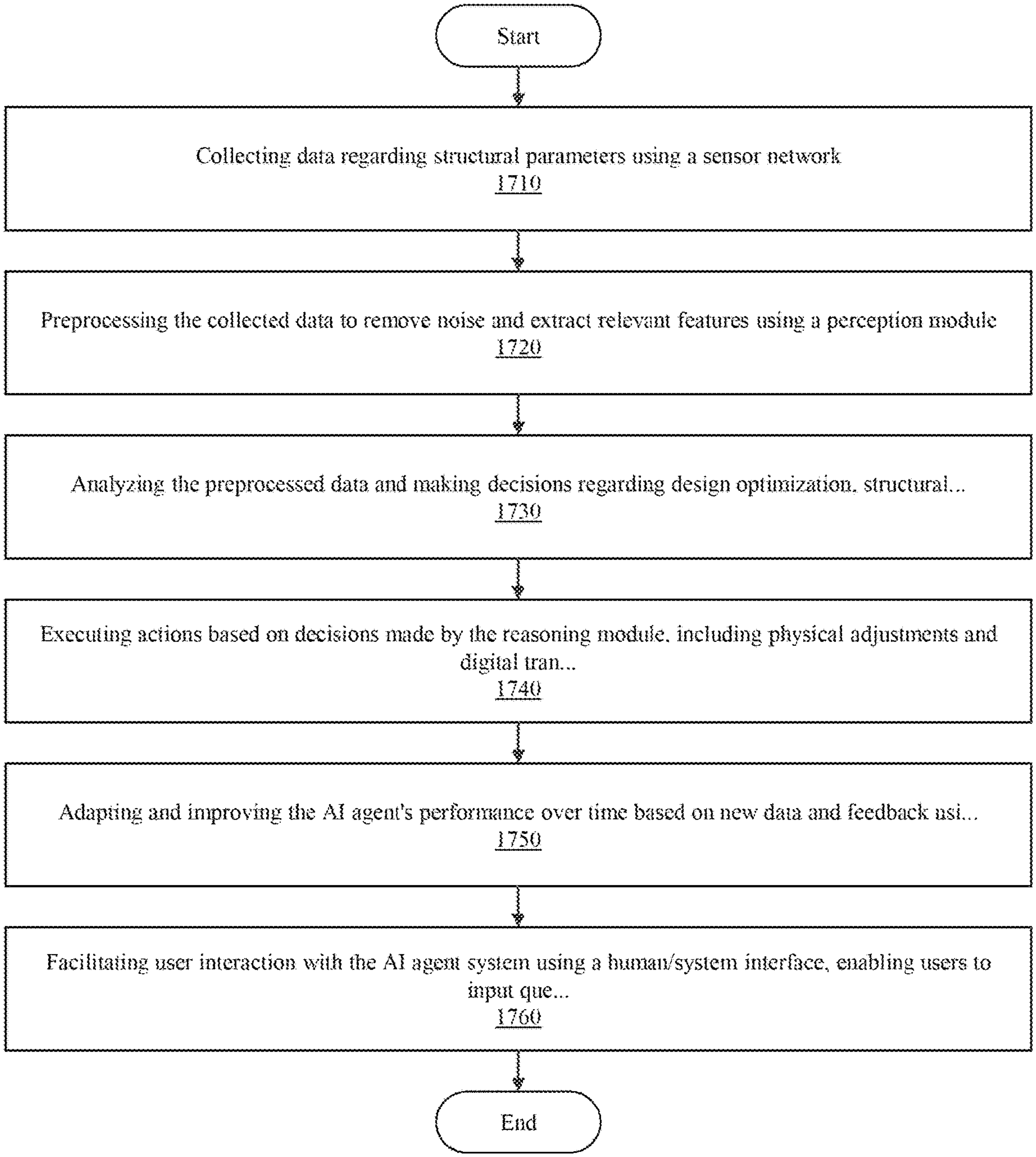
FIG. 17 is a flowchart illustrating a method for designing, according to some embodiments of the present disclosure.

FIG. 17 is a flowchart that describes a method for designing, according to some embodiments of the present disclosure. In some embodiments, at 1710, the method may include collecting data regarding structural parameters using a sensor network. At 1720, the method may include preprocessing the collected data to remove noise and extract relevant features using a perception module. At 1730, the method may include analyzing the preprocessed data and making decisions regarding design optimization, structural analysis, and/or maintenance scheduling using a reasoning module employing machine learning algorithms.

In some embodiments, at 1740, the method may include executing actions based on decisions made by the reasoning module, including physical adjustments and digital transactions using an actuator module. At 1750, the method may include adapting and improving the AI agent's performance over time based on new data and feedback using a learning module. At 1760, the method may include facilitating user interaction with the AI agent system using a human/system interface, enabling users to input queries and receive responses in multiple formats including text, voice, images, and video. The human/system interface may support multimodal input and output, including text, voice, images, and video.

Figure 18:
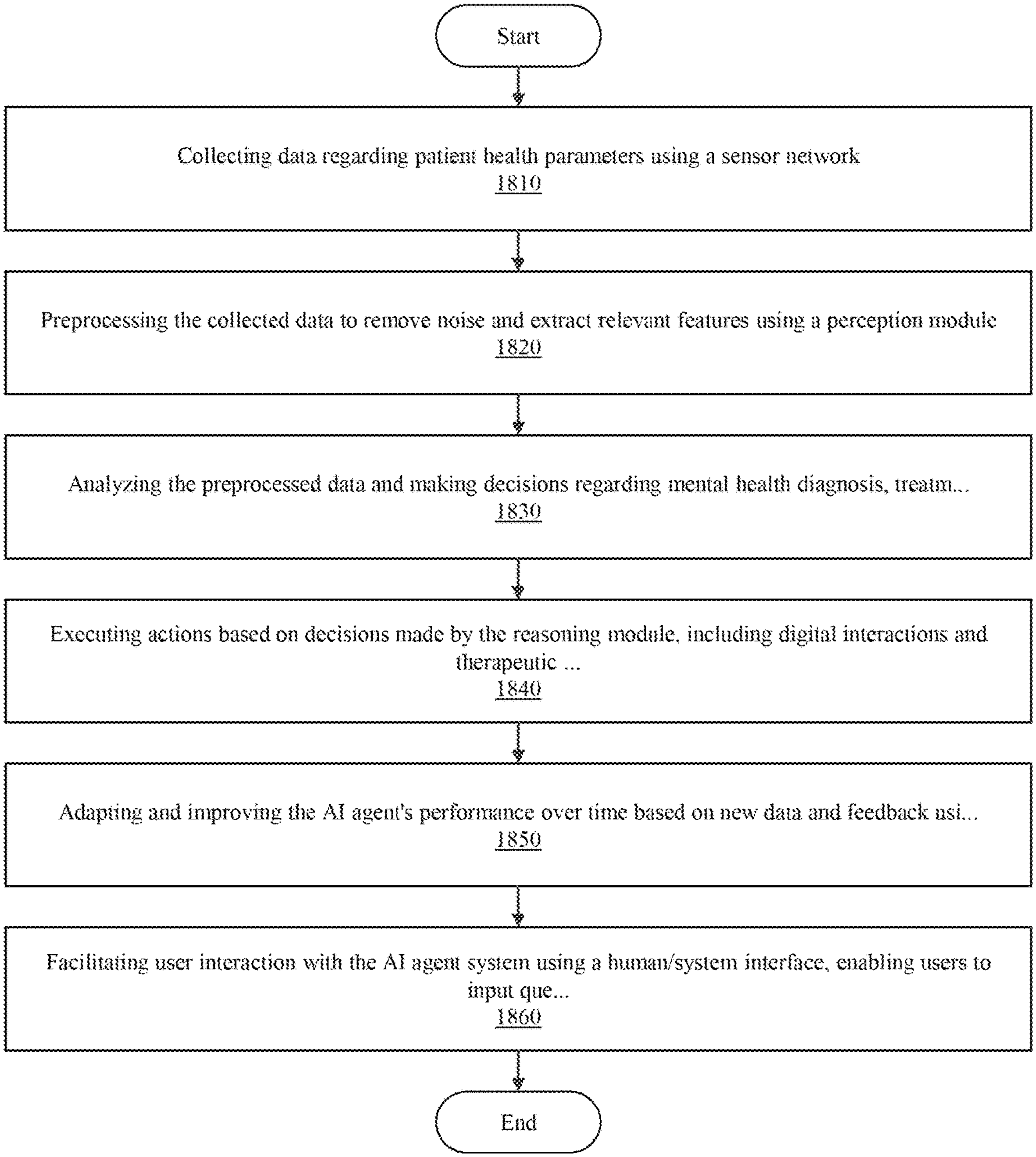
FIG. 18 is a flowchart illustrating a method, according to some embodiments of the present disclosure.

FIG. 18 is a flowchart that describes a method, according to some embodiments of the present disclosure. In some embodiments, at 1810, the method may include collecting data regarding patient health parameters using a sensor network. At 1820, the method may include preprocessing the collected data to remove noise and extract relevant features using a perception module. At 1830, the method may include analyzing the preprocessed data and making decisions regarding mental health diagnosis, treatment plans, and/or patient engagement using a reasoning module employing machine learning algorithms.

In some embodiments, at 1840, the method may include executing actions based on decisions made by the reasoning module, including digital interactions and therapeutic interventions using an actuator module. At 1850, the method may include adapting and improving the AI agent's performance over time based on new data and feedback using a learning module. At 1860, the method may include facilitating user interaction with the AI agent system using a human/system interface, enabling users to input queries and receive responses in multiple formats including text, voice, images, and video. The human/system interface may support multimodal input and output, including text, voice, images, and video.

Figure 19:
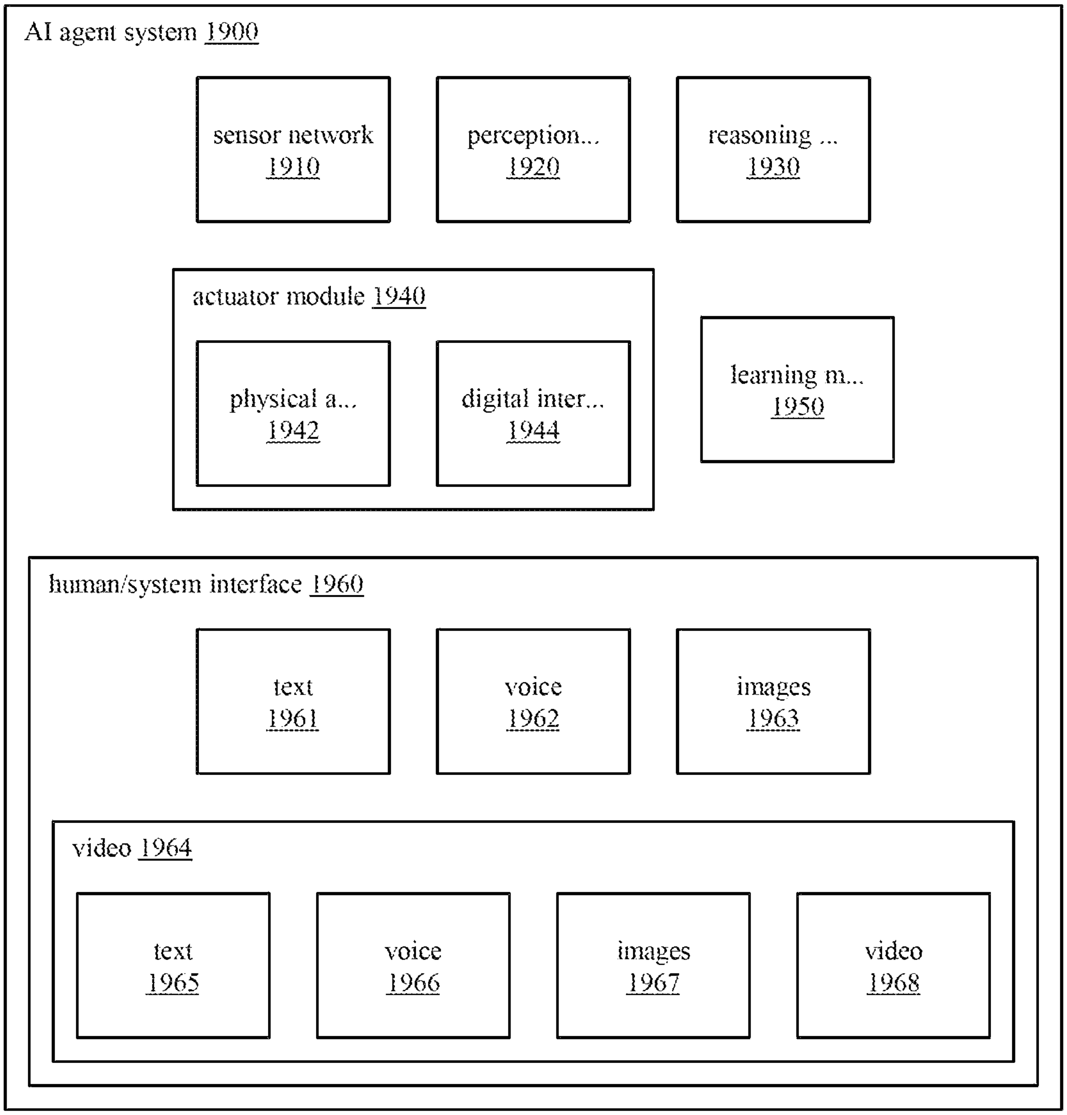
FIG. 19 is a block diagram illustrating an AI agent system, according to some embodiments of the present disclosure.

FIG. 19 is a block diagram that describes an AI agent system 1900, according to some embodiments of the present disclosure. In some embodiments, the AI agent system 1900 may include a sensor network 1910 configured to collect data regarding heart valve parameters, a perception module 1920 for preprocessing collected data to remove noise and extract relevant features, an actuator module 1940 for executing actions based on decisions made by the reasoning module 1930, and a learning module 1950 for adapting and improving the AI agent's performance over time based on new data and feedback.

In some embodiments, the AI agent system 1900 may also include a reasoning module 1930 employing machine learning algorithms to analyze preprocessed data and make decisions regarding design optimization, performance analysis, and/or quality control. The AI agent system 1900 may also include a human/system interface 1960 designed to facilitate user interaction with the AI agent system 1900, enabling users to input queries and receive responses in multiple formats. The actuator module 1940 may include physical adjustments 1942 and digital interactions 1944. The human/system interface 1960 may include text 1961, voice 1962, images 1963, and video 1964. The video 1964 may include text 1965, voice 1966, images 1967, and video 1968. The human/system interface 1960 may support multimodal input and output.

Improving Simulated Systems to More Closely Model Real-World Structures

One approach to using AI agents to help simulated models match real-world versions is to use a "digital twin" approach. A digital twin is a virtual representation of a physical object or system, using real-time or other data to to improve understanding, learning, and reasoning. One approach may be implemented as follows.

Data Collection: Continuously collect data from the real-world object using sensors and IoT devices. This data can include environmental conditions, operational parameters, and performance metrics.

Model Updating: Use machine learning algorithms to update the simulation model based on the collected data. Techniques like reinforcement learning can be particularly useful, as they can iteratively improve the model by minimizing the diference between the simulated outcomes and real-world observations.

Validation and Testing: Regularly validate the updated simulation against real-world results. This step helps ensure the model remains accurate over time.

Feedback Loop: Establish a continuous feedback loop where the AI agent uses the real-world data to refine the simulated model, improving its predictive accuracy and reliability.

Predictive Maintenance: Utilize the improved simulation to predict potential issues or failures in the real-world object, allowing for proactive maintenance and adjustments.

The accuracy and reliability of simulated models, in this approach, may be made more representative of their real-world counterparts.

If the simulated structure is an engineering project, and you aim to help the real-world structure more closely match the simulated one, the same principles with some added focus on, for example, structural integrity and performance:

Initial Calibration: Before construction, calibrate your simulation model with as much real-world data as possible. This includes material properties, environmental conditions, and expected loads.

Construction Monitoring: During the construction phase, continuously monitor the structure using sensors to track stress, strain, temperature, and other relevant factors. This data should be fed back into the simulation in real-time.

Adaptive Simulation: Use the collected data to adapt and refine the simulation model continuously. AI algorithms, especially those focused on reinforcement learning and predictive analytics, can help adjust the model based on real-world observations.

Post-Construction Analysis: Once the structure is built, perform detailed analysis and validation by comparing the performance of the real structure with the simulated one. Use AI to identify any discrepancies and update the simulation model accordingly.

Ongoing Monitoring: Continue to monitor the structure throughout its lifecycle. The ongoing data collection can be used to further refine the simulation, ensuring it remains accurate over time and under various conditions.

Predictive Adjustments: Use the refined simulation model to predict and plan for maintenance, detect potential issues early, and make necessary adjustments to the real-world structure proactively.

With this approach, AI may assist in helping engineering structures in the real world more closely match their simulated counterparts, improving accuracy, safety, and performance.

To use AI agents to improve the simulator when the real-world structure behaves diferently from the simulated one, you can follow these steps:

Collect Real-World Data: Equip the real-world structure with sensors to collect detailed data on its performance. This includes stress, strain, displacement, temperature, vibrations, and other relevant parameters under various conditions.

Data Integration: Feed this real-world data back into the simulation environment. Ensure the data is comprehensive and accurately reflects the real-world behavior of the structure.

Model Adjustment with AI: Use machine learning techniques, such as reinforcement learning or supervised learning, to adjust the simulation model. AI can help identify patterns and discrepancies between the simulated and real-world data, and update the model parameters accordingly. This process is often referred to as model updating or model calibration.

Iterative Refinement: Implement an iterative process where the simulation model is continuously refined based on real-world data. Each iteration should aim to reduce the discrepancies between the simulated and real-world behaviors.

Uncertainty Quantification: Use AI to quantify uncertainties in the model parameters and in the real-world data. This helps in understanding and minimizing the sources of errors in the simulation.

Optimization Algorithms: Apply optimization algorithms to fine-tune the model parameters. Techniques like genetic algorithms, Bayesian optimization, or gradient-based methods can be useful in finding the optimal set of parameters that align the simulation with real-world observations.

Validation and Testing: Regularly validate the updated simulation model by comparing its predictions with new real-world data. This ensures that the model remains accurate and reliable over time.

Feedback Loop: Establish a continuous feedback loop where real-world data is constantly used to update and improve the simulation model. AI agents play a role in automating this loop and ensuring the model evolves with new data.

Types of AI Agents

In engineering, several types of AI agents can be effectively used to improve simulated models with real-world data. Here are some of the most relevant types:

1. Reinforcement Learning Agents: These agents learn optimal policies through trial and error interactions with the environment. They are particularly useful for adaptive simulation models that require continuous updates based on real-world feedback. Reinforcement learning agents can dynamically adjust the simulation parameters to better match real-world observations.
2. Supervised Learning Models: These models learn from labeled data, where the input-output pairs are provided. In the context of simulation, supervised learning can be used to create predictive models that map real-world data to simulation outcomes. Techniques like regression, neural networks, and support vector machines fall into this category.
3. Unsupervised Learning Models: These models find patterns and relationships in data without labeled outcomes. They can be used for anomaly detection, clustering, and identifying hidden patterns in real-world data that can inform simulation adjustments. Techniques like clustering algorithms (e.g., K-means) and dimensionality reduction (e.g., PCA) are common.

4. Bayesian Networks: These probabilistic models use Bayes' theorem to update the probability of a hypothesis as more evidence becomes available. They are useful for modeling uncertainty and integrating real-world data to refine simulation models. Bayesian networks can handle incomplete and noisy data, making them robust for real-world applications.
5. Genetic Algorithms: These optimization algorithms are inspired by the process of natural selection. They can be used to find the best set of parameters for simulation models by iteratively evolving a population of candidate solutions. Genetic algorithms are efective in exploring large and complex search spaces.
6. Digital Twin Agents: These agents maintain a real-time digital replica of the physical structure. They use real-world data to continuously update and synchronize the digital twin with its physical counterpart. Digital twin agents can leverage various AI techniques to ensure the simulation remains accurate and up-to-date.
7. Predictive Maintenance Agents: These agents use machine learning and data analytics to predict when maintenance is needed for the physical structure. They analyze real-world performance data and use it to update simulation models to reflect potential future states of the structure.
8. Sensor Fusion Agents: These agents integrate data from multiple sensors to create a comprehensive and accurate representation of the real-world environment. By combining data from different sources, they can improve the fidelity of the simulation model.

Example: Improving Simulated Models of Real-World Electro-Mechanical Systems

To make a simulated model of an electromechanical system with an actuator and control system more closely match the real-world behavior, you can follow these steps:

1. Data Acquisition: Equip the real-world system with sensors to collect detailed performance data. This includes measurements of actuator position, velocity, force, current, voltage, temperature, and any control signals.
2. Initial Calibration: Start by calibrating the simulation model with known parameters from the real-world system. This includes the physical properties of the actuator, control system dynamics, and environmental conditions.
3. Dynamic Model Adjustment: Use machine learning techniques, such as reinforcement learning or supervised learning, to dynamically adjust the simulation model. These algorithms can help identify and correct discrepancies between the simulated and real-world data.
4. Control System Integration: Ensure the control algorithms used in the simulation match those in the real-world system. This includes PID controllers, state-space controllers, or any other advanced control strategies. Verify that the control logic behaves similarly in both environments.
5. Model Validation: Conduct validation tests by comparing the output of the simulation model with the real-world system under various operating conditions. Use this data to identify areas where the simulation deviates from reality.
6. Feedback Loop: Implement a continuous feedback loop where real-world data is used to refine the simulation model. Real-time data from sensors should be fed back into the simulation to update parameters and improve accuracy.
7. Uncertainty Analysis: Use AI techniques to quantify and manage uncertainties in the model. Bayesian methods can help update model parameters based on new data, providing a probabilistic understanding of the system's behavior.
8. Optimization Algorithms: Apply optimization algorithms, such as genetic algorithms or gradient-based optimization, to fine-tune model parameters. These algorithms can explore a wide range of parameter values to find the optimal settings that minimize the discrepancy between the simulation and real-world data.
9. Hybrid Modeling: Combine physics-based modeling with data-driven approaches. Use physical laws to create the initial model and employ machine learning to capture complex, nonlinear behaviors that are dificult to model analytically.
10. Real-Time Monitoring and Updates: Continuously monitor the real-world system and update the simulation model in real-time. Use AI agents to automate this process, ensuring the simulation remains accurate as the system operates under different conditions.

Using AI Agents

An AI agent may help make a synthetic (simulated) electromechanical system with an actuator and control system more like the real-world behavior, an enhanced approach 1. Data Collection and Integration:

Equip the real-world system with sensors to collect detailed performance data such as actuator position, velocity, force, current, voltage, temperature, and control signals.

Use an AI agent to process and integrate this data into the simulation environment.

2. Initial Model Calibration:

Utilize an AI agent to calibrate the initial simulation model with known parameters from the real-world system. This includes physical properties of the actuator, control system dynamics, and environmental conditions.

3. Machine Learning Model Adjustment:

Implement reinforcement learning agents to dynamically adjust the simulation model based on real-world data. These agents can iteratively improve the model by minimizing the discrepancies between the simulated and real-world behaviors.

Use supervised learning agents to create predictive models that map real-world data to simulation outcomes, refining the simulation accuracy.

4. Control System Integration and Validation:

Ensure the control algorithms used in the simulation match those in the real-world system. This includes PID controllers, state-space controllers, or other advanced control strategies.

Use AI agents to validate the simulation model by comparing its output with the real-world system under various operating conditions, identifying and correcting discrepancies.

5. Continuous Feedback Loop:

Establish a continuous feedback loop where an AI agent continuously monitors real-world data and feeds it back into the simulation model for ongoing refinement. This real-time data integration helps keep the simulation accurate and up-to-date.

6. Uncertainty Quantification and Management:

Employ Bayesian AI agents to quantify and manage uncertainties in the simulation model. These agents can update model parameters based on new data, providing a probabilistic understanding of the system's behavior.

7. Optimization and Hybrid Modeling:

Utilize optimization algorithms, managed by AI agents, such as genetic algorithms or gradient-based methods, to fine-tune model parameters. These agents can explore a wide range of parameter values to find the optimal settings.

Combine physics-based modeling with data-driven approaches using AI agents to capture complex, nonlinear behaviors that are dificult to model analytically.

8. Real-Time Monitoring and Updates:

Deploy AI agents to continuously monitor the real-world system and update the simulation model in real-time. These agents ensure the simulation remains accurate as the system operates under different conditions, providing real-time adjustments.

By leveraging AI agents throughout these steps, you can significantly enhance the fidelity of your simulated electromechanical system, ensuring it closely mirrors the real-world behavior. The AI may assist in data integration, model adjustment, validation, and continuous refinement, making the simulation more robust and reliable.

Human/System Interface

To create a GenAI system that allows a human to ask questions about both the simulated and real-world models or other aspects discussed herein, and/or what the AI agent is doing, these steps may be implemented:

1. System Architecture

Data Collection Layer: Collect data from both the simulated model and the real-world system using sensors and monitoring tools.

AI Processing Layer: Implement AI agents to manage data integration, model adjustments, and continuous updates.

Question-Answering Interface: Develop a user-friendly interface for human interaction, such as a chatbot or voice assistant.

1. Integration of AI Models

Use natural language processing (NLP) models to understand and process human questions.

Implement machine learning models to analyze and interpret data from the simulated and real-world systems.

Use explainable AI (XAI) techniques to make the actions of the AI agents transparent and understandable to users.

2. Data Management

Create a centralized database to store data from the simulated model, real-world system, and AI agents' actions.

Ensure the data is accessible in real-time for the AI models to process and respond to queries.

3. Developing the Interface

Chatbot Development: Use frameworks like Rasa, Dialogflow, or custom NLP models to develop a chatbot capable of understanding and responding to user queries.

Voice Assistant: If a voice interface is preferred, integrate with platforms like Google Assistant, Amazon Alexa, or custom speech recognition systems.

4. AI Explanation Capability

Implement XAI methods such as LIME or SHAP to generate explanations for the AI agent's decisions and actions.

Provide these explanations in response to user queries about what the AI is doing.

5. Integration and Testing

Ensure the system components are well-integrated, allowing seamless data flow and communication between the simulated model, real-world system, AI agents, and user interface.

Conduct extensive testing to ensure the system accurately interprets user queries and provides relevant, understandable responses.

Here's a simplified example of how these components could work together:

1. User Interaction: A user asks a question through the chatbot interface, such as "How does the actuator perform in the real world compared to the simulation?"
2. NLP Processing: The chatbot uses NLP to interpret the question and identify relevant data sources.
3. Data Retrieval: The system queries the centralized database to retrieve data on the actuator's performance in both the simulated and real-world environments.
4. AI Analysis: An AI agent analyzes the data, compares the performance metrics, and generates a detailed response.
5. Explanation: If the user asks about the AI agent's actions, such as "What adjustments has the AI made to the simulation model?", the system uses XAI techniques to explain the AI's decisions and adjustments.
6. Response Delivery: The system delivers a clear and detailed response to the user through the chatbot interface.

This Gen-AI system may enable, for example, seamless interaction and understanding between the human user, the simulated model, the real-world system, and the AI agents, fostering a more intuitive and efective use of the technology. The GenAI system may be adapted to facilitate user/system in other ways in according to the present invention.

Multi-Modal User Input/System Output

In one embodiment, a Gen-AI system according to the invention allows users to input various types of data (text, voice, images, video) and receive responses in multiple formats (text, voice, video, images, and/or other). This may be done with, for example, a modular approach:

Input

Text Input: Use an NLP model to process and understand textual queries.

Voice Input: Use speech-to-text (STT) technology, such as Google's Speech-to-Text API or Amazon Transcribe, to convert voice input into text.

Image Input: Use computer vision models, like those provided by OpenCV or TensorFlow, to analyze and interpret images.

Video Input: Use video analysis tools to process video inputs, extracting frames and analyzing them with computer vision models.

Other Inputs: If other types of inputs are needed, such as sensor data or IoT device inputs, ensure the system can handle and process these appropriately.

Processing and AI

NLP Processing: Utilize NLP models to understand and process the converted text from voice or directly input text.

Machine Learning and AI: Implement machine learning models to analyze the input data, compare it with the simulation and real-world data, and determine the appropriate response.

Explainable AI: Use XAI techniques to provide understandable explanations of the AI's decisions and actions.

Output Generation

Text Output: Generate and deliver textual responses using NLP models.

Voice Output: Use text-to-speech (TTS) technology, such as Google's Text-to-Speech API or Amazon Polly, to convert text responses into voice.

Image Output: Generate images using AI models like DALL-E for creating new images or annotations.

Video Output: Use video generation tools to create or edit videos as responses.

Other Outputs: Ensure the system can generate and handle other types of outputs as required.

Integration

Developing the Interface

Multimodal User Interface: Design an interface that can handle multiple input types. For example, a web application with text boxes, voice recording buttons, image and video upload capabilities.

API Integration: Use APIs to integrate STT, TTS, computer vision, and video processing services into your system.

Backend Processing

Text and Voice Processing: Implement NLP models for text understanding and use STT for voice input conversion.

Image and Video Processing: Use pre-trained computer vision models for image and video analysis. Employ models like YOLO, ResNet, or custom-trained models depending on your specific needs.

Data Handling: Ensure eficient data handling and storage for real-time processing and historical analysis.

Response Generation and Delivery

Dynamic Response Creation: Based on the processed input, dynamically generate the appropriate response using the AI models.

Multimodal Output Delivery: Provide responses in the format preferred by the user. For example, if the input was an image, the system could return annotated images or a video explanation.

User Interaction:

Interactive Interface: Implement a user-friendly interface where users can choose their input and output formats. Ensure the interface is intuitive and responsive.

Real-Time Feedback: Provide real-time feedback and responses to ensure a seamless user experience.

Example: User Input

A user inputs a voice query asking, "How does the actuator's performance compare between the simulation and the real-world model?"

Another user uploads a video showing the actuator in action and asks for an analysis.

System Processing:

The voice input is converted to text using STT.

The video input is processed to extract relevant frames and analyze them using computer vision models.

AI Analysis

The NLP model interprets the text query.

The AI models compare the actuator's performance data from the simulation and real-world system.

The system analyzes the video to provide insights about the actuator's behavior.

Response Generation

The system generates a text report comparing the actuator's performance.

It creates an annotated video highlighting the diferences observed in the real-world operation.

User Output

The text response is converted to voice using TTS and delivered as an audio response.

The annotated video is provided as the output.

A Gen-AI system capable of handling diverse input types and generating multi-format responses may thereby enhance user interaction and system versatility.

What is claimed is:

1. A structural-health-monitoring system for a physical structure, comprising:

(a) a sensor network mounted on the structure and configured to output time-stamped sensor signals reflecting one or more of strain, vibration, acceleration, and temperature of the structure;

(b) a processing device having at least one processor and a non-transitory memory storing instructions that, when executed by the processor, cause the processor to:

(i) preprocess the sensor signals by applying noise filtering and statistical normalization, and extract a frequency-domain feature vector therefrom;

(ii) input the feature vector to a neural-network surrogate structural model and retrain the surrogate in real time using back-propagation on incoming feature vectors to minimize residual error between the surrogate's predicted output and the feature vector;

(iii) compute an anomaly score as a residual between the surrogate's predicted output and the current feature vector, and compare the anomaly score to a detection threshold;

(iv) adaptively adjust, using a reinforcement-learning policy trained on feedback from subsequent inspections, at least one of the detection threshold or a frequency of data collection by the sensor network; and (v) generate a machine-readable control signal and transmit to an autonomous device to perform an autonomous inspection action, an autonomous repair action, and a maintenance schedule based on the anomaly score.

2. The system of claim 1, wherein the neural-network surrogate structural model is physics-informed and is constrained by one or more of governing equations, material properties, and boundary conditions of the physical structure.

3. The system of claim 1, wherein preprocessing the sensor signals comprises applying a Gaussian filter, performing z-score normalization, and computing a fast Fourier transform to obtain the frequency-domain feature vector.

4. The system of claim 1, wherein the instructions further cause the processor to maintain a finite-element digital-twin model of the structure that updates material properties and mesh density in response to observed changes in the anomaly score, and when the anomaly score exceeds the detection threshold, computes stress fields for the region corresponding to the anomaly.

5. The system of claim 4, wherein the stress fields computed by the digital-twin model are encoded into a machine-readable control signal transmitted to one or more autonomous aerial drones or ground robots to direct inspection of the region.

6. The system of claim 1, wherein the autonomous inspection action comprises transmitting a machine-readable control signal to an autonomous aerial drone carrying non-destructive-evaluation sensors, directing the drone to inspect a candidate anomaly location.

7. The system of claim 6, wherein the machine-readable control signal comprises distinct navigation instructions automatically generated for each of a plurality of autonomous aerial drones so that the drones concurrently inspect mutually exclusive sub-regions of the candidate anomaly location.

8. The system of claim 1, wherein the reinforcement-learning policy adaptively adjusts both the detection threshold and the frequency of data collection simultaneously, based on a history of inspection results stored in a historical database.

9. The system of claim 1, wherein the sensor network further comprises at least one temperature sensor, and the instructions further cause the processor to provide temperature sensor data as a boundary-condition input to the neural-network surrogate structural model.

10. The system of claim 1, wherein the maintenance schedule includes, for each candidate anomaly location, a predicted remaining-useful-life value and a maintenance priority score computed based on the severity of the anomaly score and the predicted remaining-useful-life value.

11. The system of claim 1, wherein the processing device comprises an edge gateway disposed on or near the structure that preprocesses the sensor signals, communicatively coupled to a cloud-based processor that stores a historical database of feature vectors, anomaly scores, and inspection results, and periodically retrains the surrogate using the historical database.

12. The system of claim 1, wherein the instructions further cause the processor to render a color-coded three-dimensional heat-map of anomaly-score values superimposed on a geometric model of the structure on a graphical user interface.

13. The system of claim 1, wherein the physical structure is one or more of: a bridge, a tower, an aircraft component, a building, a trailer, or an antenna.

14. The system of claim 1, wherein:

the physical structure is a building;

the sensor network further comprises at least one environmental sensor selected from the group consisting of a temperature sensor, a humidity sensor, and an acoustic emission sensor; and the instructions further cause the processor to provide data from the at least one environmental sensor as a boundary-condition input to the neural-network surrogate structural model such that the surrogate's predicted output accounts for environmental conditions of the building.

15. The system of claim 14, wherein, when the anomaly score exceeds the detection threshold, the machine-readable control signal initiates an autonomous inspection action comprising transmitting navigation instructions to at least one of an autonomous aerial drone or an autonomous ground robot carrying non-destructive-evaluation sensors to inspect a designated region of the building corresponding to the anomaly score.

16. The system of claim 14, wherein the sensor network further comprises an optical camera mounted on the building, and the instructions further cause the processor to fuse, with the feature vector, image frames captured by the optical camera to improve anomaly classification accuracy.

17. A structural-health-monitoring and autonomous-maintenance system for a physical structure, comprising:

(a) a sensor network mounted on the structure and configured to output time-stamped signals from at least one strain gauge and at least one accelerometer;

(b) a processing device having at least one processor and a non-transitory memory storing instructions that, when executed by the processor, cause the processor to:

(i) preprocess the sensor signals and extract a feature vector representing a current structural state;

(ii) input the feature vector to a neural-network surrogate structural model and compute an anomaly score as a residual between the surrogate's predicted output and the feature vector;

(iii) identify a designated inspection location from the anomaly score, and generate a machine-readable control signal based on the designated inspection location;

(iv) maintain a digital-twin model of the structure that updates one or more model parameters in response to observed changes in the anomaly score, and based on the anomaly score, compute stress fields for the designated inspection location from the digital-twin model, wherein the machine-readable control signal encodes the stress fields to prioritize a non-destructive inspection action or a repair action at the designated inspection location;

(v) transmit the machine-readable control signal to an autonomous device configured to perform at least one of the non-destructive inspection action or the repair action at the designated inspection location; and (vi) adaptively adjust one or more parameters of the neural-network surrogate structural model based on feedback from subsequent inspection actions or repair actions received from the autonomous device, or from the sensor network.

18. The system of claim 17, wherein the neural-network surrogate structural model is retrained in real time by stochastic-gradient-descent back-propagation on incoming feature vectors.

19. The system of claim 17, wherein the repair action is one or more of: material deposition or crack sealing.

20. The system of claim 17, wherein the autonomous device is an autonomous aerial drone or an autonomous ground robot equipped with non-destructive-evaluation sensors.

21. The system of claim 17, wherein the digital-twin model is a finite-element model that updates material properties and mesh density in response to changes in the anomaly score.

22. The system of claim 17, wherein the physical structure is one or more of: a bridge, a tower, an aircraft component, a pipeline, a trailer, or an antenna.

23. A non-transitory computer-implemented method for autonomous structural monitoring of a physical structure, the method comprising:

receiving, at a processing device, time-stamped sensor signals from a sensor network mounted on the structure; preprocessing the sensor signals to extract a feature vector;

inputting the feature vector to a neural-network surrogate structural model and computing an anomaly score as a residual between the surrogate's predicted output and the feature vector;

retraining the surrogate in real time using back-propagation on incoming feature vectors;

adaptively adjusting, using a reinforcement-learning policy trained on feedback from subsequent inspections, at least one of (i) a detection threshold applied to the anomaly score or (ii) a frequency of data collection by the sensor network; and generating a machine-readable control signal that direct an autonomous device to perform an inspection action and a maintenance action at a designated inspection location identified from the anomaly score.

24. The method of claim 23, further comprising maintaining a finite-element digital-twin model of the structure that updates material properties and mesh density in response to changes in the anomaly score, and when the anomaly score exceeds the detection threshold, computing stress fields for the region corresponding to the anomaly.

25. The method of claim 23, wherein the autonomous device is a plurality of autonomous aerial drones, and generating the machine-readable control signal comprises generating distinct navigation instructions for each drone so that the drones concurrently inspect mutually exclusive sub-regions of the designated inspection location.

26. The method of claim 23, wherein the physical structure is one or more of: a bridge, a tower, an aircraft component, a pipeline, a trailer, or an antenna.

* * * * *